(12) United States Patent
Brewster et al.

(10) Patent No.: US 7,105,973 B2
(45) Date of Patent: Sep. 12, 2006

(54) HIGHLY EFFICIENT PERMANENT MAGNET BRUSHLESS MOTOR

(75) Inventors: Jeffery T. Brewster, Dublin, VA (US); Gerald W. Brown, Radford, VA (US)

(73) Assignee: Kollmorgen Corporation, Simsbury, CT (US)

( * ) Notice: Subject to any disclaimer, the term of this patent is extended or adjusted under 35 U.S.C. 154(b) by 0 days.

(21) Appl. No.: 10/624,258

(22) Filed: Jul. 21, 2003

(65) Prior Publication Data

US 2005/0017591 A1  Jan. 27, 2005

(51) Int. Cl.
*H02K 1/00* (2006.01)
(52) U.S. Cl. .................. 310/179; 310/184; 310/254; 310/261
(58) Field of Classification Search ........ 310/179–181, 310/51, 254, 261, 177, 67 R, 184–198
See application file for complete search history.

(56) References Cited

U.S. PATENT DOCUMENTS

| 3,860,843 | A | * | 1/1975 | Kawasaki et al. | 310/67 R |
| 5,006,745 | A | * | 4/1991 | Nishio et al. | 310/177 |
| 5,723,931 | A | * | 3/1998 | Andrey | 310/179 |
| 2004/0155537 | A1 | * | 8/2004 | Nakano et al. | 310/51 |

\* cited by examiner

*Primary Examiner*—Thanh Lam
(74) *Attorney, Agent, or Firm*—Morgan & Finnegan, LLP

(57) ABSTRACT

The present invention provides a highly optimized motor design enabling an increase in torque compared to a similarly sized motor of traditional design. Additionally, the present invention enables motors that provide smooth, ripple free, operation at low speeds. These advances are provided through disclosure of slot/pole ratios that provide the stated benefits.

14 Claims, 6 Drawing Sheets

Slot – Pole Combination Comparison chart for Coil span of 1 Tooth

| Poles | Slots | Slot/Pole Ratio | Balanced Winding All Slots Filled | Balanced Winding | Ct | Maximum Parallel Paths | Kp | THD – Total Harmonic Distortion |
|---|---|---|---|---|---|---|---|---|
| 30 | 18 | 0.6 | 0 | 2 | 6 | 6 | 0.5 | 0.249604232 |
| 30 | 19 | 0.633333333 | 1 | 2 | 1 | 6 | 0.614212713 | 0.190971274 |
| 30 | 20 | 0.666666667 | 2 | 2 | 10 | 6 | 0.707106781 | 0.249604232 |
| 30 | 27 | 0.9 | 0 | 1 | 3 | 3 | 0.984807753 | 0.166114912 |
| 30 | 28 | 0.933333333 | 1 | 1 | 2 | 3 | 0.99371221 | 0.180495453 |
| 30 | 29 | 0.966666667 | 2 | 1 | 1 | 3 | 0.998533414 | 0.220396749 |
| 32 | 18 | 0.5625 | 0 | 1 | 2 | 2 | 0.342020143 | 0.657104652 |
| 32 | 19 | 0.59375 | 1 | 1 | 1 | 2 | 0.475947393 | 0.323691168 |
| 32 | 20 | 0.625 | 2 | 1 | 4 | 2 | 0.587785252 | 0.201330169 |
| 32 | 21 | 0.65625 | 0 | 2 | 1 | 1 | 0.680172738 | 0.232832619 |
| 32 | 22 | 0.6875 | 1 | 2 | 2 | 1 | 0.755749574 | 0.276438918 |
| 32 | 23 | 0.71875 | 2 | 2 | 1 | 1 | 0.816969893 | 0.269499191 |
| 32 | 24 | 0.75 | 0 | 1 | 8 | 8 | 0.866025404 | 0.249604232 |
| 32 | 25 | 0.78125 | 1 | 1 | 1 | 8 | 0.904827052 | 0.157858999 |
| 32 | 26 | 0.8125 | 2 | 1 | 2 | 8 | 0.935016243 | 0.11528497 |
| 32 | 27 | 0.84375 | 0 | 2 | 1 | 1 | 0.957989512 | 0.13131874 |
| 32 | 28 | 0.875 | 1 | 2 | 4 | 1 | 0.974927912 | 0.149341528 |
| 32 | 29 | 0.90625 | 2 | 2 | 1 | 1 | 0.986826523 | 0.169308324 |
| 32 | 30 | 0.9375 | 0 | 1 | 2 | 2 | 0.994521895 | 0.183418691 |
| 32 | 31 | 0.96875 | 1 | 1 | 1 | 2 | 0.998716507 | 0.223457681 |
| 34 | 18 | 0.529411765 | 0 | 2 | 2 | 2 | 0.173648178 | 1.085649275 |
| 34 | 19 | 0.558823529 | 1 | 2 | 1 | 2 | 0.324699469 | 0.686198554 |
| 34 | 20 | 0.588235294 | 2 | 2 | 2 | 2 | 0.4539905 | 0.397073845 |
| 34 | 21 | 0.617647059 | 0 | 1 | 1 | 1 | 0.563320058 | 0.203411399 |
| 34 | 22 | 0.647058824 | 1 | 1 | 2 | 1 | 0.654860734 | 0.208570119 |
| 34 | 23 | 0.676470588 | 2 | 1 | 1 | 1 | 0.730835964 | 0.261882278 |
| 34 | 24 | 0.705882353 | 0 | 2 | 2 | 2 | 0.79335334 | 0.277721125 |
| 34 | 25 | 0.735294118 | 1 | 2 | 1 | 2 | 0.844327926 | 0.267057827 |
| 34 | 26 | 0.764705882 | 2 | 2 | 2 | 2 | 0.885456026 | 0.208454625 |
| 34 | 27 | 0.794117647 | 0 | 1 | 1 | 1 | 0.918216107 | 0.13082749 |
| 34 | 28 | 0.823529412 | 1 | 1 | 2 | 1 | 0.94388333 | 0.117555714 |
| 34 | 29 | 0.852941176 | 2 | 1 | 1 | 1 | 0.963549993 | 0.136965075 |
| 34 | 30 | 0.882352941 | 0 | 2 | 2 | 2 | 0.978147601 | 0.154326845 |
| 34 | 31 | 0.911764706 | 1 | 2 | 1 | 2 | 0.988468324 | 0.171590662 |
| 34 | 32 | 0.941176471 | 2 | 2 | 2 | 2 | 0.995184727 | 0.186570007 |
| 34 | 33 | 0.970588235 | 0 | 1 | 1 | 1 | 0.998867339 | 0.226097856 |

Figure 2A

Slot – Pole Combination Comparision chart for Coil span of 1 Tooth

| Poles | Slots | Slot/Pole Ratio | Balanced Winding All Slots Filled | Balanced Winding | Ct | Maximum Parallel Paths | Kp | THD – Total Harmonic Distortion |
|---|---|---|---|---|---|---|---|---|
| 36 | 27 | 0.75 | 0 | 1 | 9 | 9 | 0.866025404 | 0.249604232 |
| 36 | 28 | 0.777777778 | 1 | 1 | 4 | 9 | 0.900968868 | 0.167391628 |
| 36 | 29 | 0.805555556 | 2 | 1 | 1 | 9 | 0.92897672 | 0.118069217 |
|  |  |  |  |  |  |  |  |  |
| 38 | 21 | 0.552631579 | 0 | 2 | 1 | 1 | 0.294755174 | 0.736875711 |
| 38 | 22 | 0.578947368 | 1 | 2 | 2 | 1 | 0.415415013 | 0.507438062 |
| 38 | 23 | 0.605263158 | 2 | 2 | 1 | 1 | 0.51958395 | 0.21104203 |
| 38 | 24 | 0.631578947 | 0 | 1 | 2 | 2 | 0.608761429 | 0.192667 |
| 38 | 25 | 0.657894737 | 1 | 1 | 1 | 2 | 0.684547106 | 0.236262364 |
| 38 | 26 | 0.684210526 | 2 | 1 | 2 | 2 | 0.748510748 | 0.272550678 |
| 38 | 27 | 0.710526316 | 0 | 2 | 1 | 1 | 0.802123193 | 0.274221271 |
| 38 | 28 | 0.736842105 | 1 | 2 | 2 | 1 | 0.846724199 | 0.26638671 |
| 38 | 29 | 0.763157895 | 2 | 2 | 1 | 1 | 0.883512044 | 0.213427941 |
| 38 | 30 | 0.789473684 | 0 | 1 | 2 | 2 | 0.913545458 | 0.139013604 |
| 38 | 31 | 0.815789474 | 1 | 1 | 1 | 2 | 0.937752132 | 0.115188724 |
| 38 | 32 | 0.842105263 | 2 | 1 | 2 | 2 | 0.956940336 | 0.130194434 |
| 38 | 33 | 0.868421053 | 0 | 2 | 1 | 1 | 0.971811568 | 0.145338011 |
| 38 | 34 | 0.894736842 | 1 | 2 | 2 | 1 | 0.9829731 | 0.162913532 |
| 38 | 35 | 0.921052632 | 2 | 2 | 1 | 1 | 0.990949762 | 0.174843151 |
| 38 | 36 | 0.947368421 | 0 | 1 | 2 | 2 | 0.996194698 | 0.193131583 |
| 38 | 37 | 0.973684211 | 1 | 1 | 1 | 2 | 0.999098966 | 0.230367049 |
|  |  |  |  |  |  |  |  |  |
| 40 | 21 | 0.525 | 0 | 1 | 1 | 1 | 0.149042266 | 1.225362448 |
| 40 | 22 | 0.55 | 1 | 1 | 2 | 1 | 0.281732557 | 0.761620727 |
| 40 | 23 | 0.575 | 2 | 1 | 1 | 1 | 0.39840109 | 0.547282825 |
| 40 | 24 | 0.6 | 0 | 2 | 8 | 8 | 0.5 | 0.249604232 |
| 40 | 25 | 0.625 | 1 | 2 | 5 | 8 | 0.587785252 | 0.201330169 |
| 40 | 26 | 0.65 | 2 | 2 | 2 | 8 | 0.663122658 | 0.216878644 |
| 40 | 27 | 0.675 | 0 | 1 | 1 | 1 | 0.727373642 | 0.259900638 |
| 40 | 28 | 0.7 | 1 | 1 | 4 | 1 | 0.781831482 | 0.281021751 |
| 40 | 29 | 0.725 | 2 | 1 | 1 | 1 | 0.827688998 | 0.268317086 |
| 40 | 30 | 0.75 | 0 | 1 | 10 | 10 | 0.866025404 | 0.249604232 |
| 40 | 31 | 0.775 | 1 | 1 | 1 | 10 | 0.89780454 | 0.175587301 |
| 40 | 32 | 0.8 | 2 | 1 | 8 | 10 | 0.923879533 | 0.122971276 |
| 40 | 33 | 0.825 | 0 | 1 | 1 | 1 | 0.945000819 | 0.118332187 |
| 40 | 34 | 0.85 | 1 | 1 | 2 | 1 | 0.961825643 | 0.135272043 |
| 40 | 35 | 0.875 | 2 | 1 | 5 | 1 | 0.974927912 | 0.149341528 |
| 40 | 36 | 0.9 | 0 | 1 | 4 | 4 | 0.984807753 | 0.166114912 |
| 40 | 37 | 0.925 | 1 | 1 | 1 | 4 | 0.991900435 | 0.176320946 |
| 40 | 38 | 0.95 | 2 | 1 | 2 | 4 | 0.996584493 | 0.196366609 |
| 40 | 39 | 0.975 | 0 | 1 | 1 | 1 | 0.999188998 | 0.232098334 |

Figure 2B

Slot – Pole Combination Comparision chart for Coil span of 1 Tooth

| Poles | Slots | Slot/Pole Ratio | Balanced Winding All Slots Filled | Balanced Winding | Ct | Maximum Parallel Paths | Kp | THD – Total Harmonic Distortion |
|---|---|---|---|---|---|---|---|---|
| 42 | 27 | 0.642857143 | 0 | 2 | 3 | 3 | 0.64278761 | 0.197900559 |
| 42 | 28 | 0.666666667 | 1 | 2 | 14 | 3 | 0.707106781 | 0.249604232 |
| 42 | 29 | 0.69047619 | 2 | 2 | 1 | 3 | 0.762162055 | 0.279151695 |
| 42 | 36 | 0.857142857 | 0 | 1 | 6 | 6 | 0.965925826 | 0.139252172 |
| 42 | 37 | 0.880952381 | 1 | 1 | 1 | 6 | 0.977555239 | 0.15334635 |
| 42 | 38 | 0.904761905 | 2 | 1 | 2 | 6 | 0.986361303 | 0.16861041 |
| 44 | 24 | 0.545454545 | 0 | 2 | 4 | 4 | 0.258819045 | 0.812389602 |
| 44 | 25 | 0.568181818 | 1 | 2 | 1 | 4 | 0.368124553 | 0.609641573 |
| 44 | 26 | 0.590909091 | 2 | 2 | 2 | 4 | 0.464723172 | 0.361566081 |
| 44 | 27 | 0.613636364 | 0 | 2 | 1 | 1 | 0.549508978 | 0.200401777 |
| 44 | 28 | 0.636363636 | 1 | 2 | 4 | 1 | 0.623489802 | 0.189969977 |
| 44 | 29 | 0.659090909 | 2 | 2 | 1 | 1 | 0.687699459 | 0.238535408 |
| 44 | 30 | 0.681818182 | 0 | 1 | 2 | 2 | 0.743144825 | 0.269343888 |
| 44 | 31 | 0.704545455 | 1 | 1 | 1 | 2 | 0.790775737 | 0.278653118 |
| 44 | 32 | 0.727272727 | 2 | 1 | 4 | 2 | 0.831469612 | 0.268212778 |
| 44 | 33 | 0.75 | 0 | 1 | 11 | 11 | 0.866025404 | 0.249604232 |
| 44 | 34 | 0.772727273 | 1 | 1 | 2 | 11 | 0.895163291 | 0.182599153 |
| 44 | 35 | 0.795454545 | 2 | 1 | 1 | 11 | 0.919527773 | 0.12879784 |
| 44 | 36 | 0.818181818 | 0 | 2 | 4 | 4 | 0.939692621 | 0.115564239 |
| 44 | 37 | 0.840909091 | 1 | 2 | 1 | 4 | 0.956166735 | 0.129357338 |
| 44 | 38 | 0.863636364 | 2 | 2 | 2 | 4 | 0.969400266 | 0.142690529 |
| 44 | 39 | 0.886363636 | 0 | 2 | 1 | 1 | 0.979790652 | 0.157167442 |
| 44 | 40 | 0.909090909 | 1 | 2 | 4 | 1 | 0.987688341 | 0.170539182 |
| 44 | 41 | 0.931818182 | 2 | 2 | 1 | 1 | 0.99340209 | 0.179588252 |
| 44 | 42 | 0.954545455 | 0 | 1 | 2 | 2 | 0.997203797 | 0.202472832 |
| 44 | 43 | 0.977272727 | 1 | 1 | 1 | 2 | 0.999332848 | 0.234949902 |

Figure 2C

Slot – Pole Combination Comparision chart for Coil span of 1 Tooth

| Poles | Slots | Slot/Pole Ratio | Balanced Winding All Slots Filled | Balanced Winding | Ct | Maximum Parallel Paths | Kp | THD – Total Harmonic Distortion |
|---|---|---|---|---|---|---|---|---|
| 46 | 24 | 0.52173913 | 0 | 2 | 2 | 2 | 0.130526192 | 1.37050075 |
| 46 | 25 | 0.543478261 | 1 | 2 | 1 | 2 | 0.248689887 | 0.8379287 |
| 46 | 26 | 0.565217391 | 2 | 2 | 2 | 2 | 0.354604887 | 0.634871592 |
| 46 | 27 | 0.586956522 | 0 | 1 | 1 | 1 | 0.44879918 | 0.413656044 |
| 46 | 28 | 0.608695652 | 1 | 1 | 2 | 1 | 0.532032077 | 0.200919998 |
| 46 | 29 | 0.630434783 | 2 | 1 | 1 | 1 | 0.605174215 | 0.194073445 |
| 46 | 30 | 0.652173913 | 0 | 2 | 2 | 2 | 0.669130606 | 0.222860679 |
| 46 | 31 | 0.673913043 | 1 | 2 | 1 | 2 | 0.724792787 | 0.258475468 |
| 46 | 32 | 0.695652174 | 2 | 2 | 2 | 2 | 0.773010453 | 0.281489772 |
| 46 | 33 | 0.717391304 | 0 | 1 | 1 | 1 | 0.814575952 | 0.270030285 |
| 46 | 34 | 0.739130435 | 1 | 1 | 2 | 1 | 0.850217136 | 0.264969061 |
| 46 | 35 | 0.760869565 | 2 | 1 | 1 | 1 | 0.880595532 | 0.220629124 |
| 46 | 36 | 0.782608696 | 0 | 2 | 2 | 2 | 0.906307787 | 0.154370684 |
| 46 | 37 | 0.804347826 | 1 | 2 | 1 | 2 | 0.927889027 | 0.118929404 |
| 46 | 38 | 0.826086957 | 2 | 2 | 2 | 2 | 0.945817242 | 0.118956414 |
| 46 | 39 | 0.847826087 | 0 | 1 | 1 | 1 | 0.960518112 | 0.133955165 |
| 46 | 40 | 0.869565217 | 1 | 1 | 2 | 1 | 0.97236992 | 0.146000776 |
| 46 | 41 | 0.891304348 | 2 | 1 | 1 | 1 | 0.98170832 | 0.160624769 |
| 46 | 42 | 0.913043478 | 0 | 2 | 2 | 2 | 0.988830826 | 0.172063705 |
| 46 | 43 | 0.934782609 | 1 | 2 | 1 | 2 | 0.994000975 | 0.181438187 |
| 46 | 44 | 0.956521739 | 2 | 2 | 2 | 2 | 0.997452115 | 0.205290332 |
| 46 | 45 | 0.97826087 | 0 | 1 | 1 | 1 | 0.999390827 | 0.236129319 |
| 48 | 27 | 0.5625 | 0 | 1 | 3 | 3 | 0.342020143 | 0.657104652 |
| 48 | 28 | 0.583333333 | 1 | 1 | 4 | 3 | 0.433883739 | 0.458394586 |
| 48 | 29 | 0.604166667 | 2 | 1 | 1 | 3 | 0.515553857 | 0.216725294 |
| 48 | 36 | 0.75 | 0 | 1 | 12 | 12 | 0.866025404 | 0.249604232 |
| 48 | 37 | 0.770833333 | 1 | 1 | 1 | 12 | 0.892925858 | 0.188602834 |
| 48 | 38 | 0.791666667 | 2 | 1 | 2 | 12 | 0.915773327 | 0.134926839 |
| 48 | 45 | 0.9375 | 0 | 1 | 3 | 3 | 0.994521895 | 0.183418691 |

Figure 2D

| Slot/Pole Combination | Ct Value | Cogging - Ideal Magnet Location and Ideal Form of Parts | One Magnet Pole shifted .005" into the airgap | One Magnet shifted .005" into the airgap | Magnet OD ground .007" per side | Magnet OD ground .007" |
|---|---|---|---|---|---|---|
| | | % Pk-pk of Motors Tc | % Pk-pk of Motors Tc | Normalized to Ideal | % Pk-pk of Motors Tc | Normalized to Ideal |
| 36/46 | 2 | 0.36 | 0.57 | 1.59 | <.36 | <1.0 |
| 30/40 | 10 | .66 | 1.24 | 1.90 | 6.11 | 9.26 |

HIGHLY EFFICIENT PERMANENT MAGNET BRUSHLESS MOTOR

FIELD OF THE INVENTION

The present invention relates generally to permanent magnet motors, and more particularly, to servomotors capable of efficiently producing high torque with low torque ripple including both low cogging torque components and low MMF harmonic torque components.

BACKGROUND OF THE INVENTION

Efficiency is always a major goal of any motor design. Ideally, motors would be small, powerful with low torque ripple, inexpensive, and energy efficient. This ideal, however, cannot be met. For real world designs tradeoffs must be made and goals must be prioritized.

When designing high performance servomotors cost, energy efficiency, and size are often of lower priority than power and performance quality. Servomotors, generally, must produce smooth and powerful torque over a range of speeds on a continuous basis over time and on a peak short term basis, without cogging, torque ripple, or speed ripple. Furthermore, many servo applications particularly require high torque at low speed with smooth performance.

The torque ripple produced from a servomotor in a servosystem, consisting of a servomotor and servodrive electronics, has many sources. Generally, the principal sources are cogging torques, MMF harmonic torques, and current harmonic torques. The cogging torque is due to the variations in permeance as seen by the rotor magnets as the rotor is turned with no current applied to the motor. The MMF harmonic torques are a result of the nonsinusoidal distribution of the winding turns around the stator, since they are typically placed in distinct slots. The current harmonic torques are a result of the drive producing unequal and/or nonsinusoidal three phase currents.

Traditional servomotors solve the above identified problems by employing high speed motors in combination with gearboxes to provide the correct torque speed combination for the particular drive application. These motors are designed to run efficiently at high speed where cogging, speed ripple, and torque ripple are not a serious issue. A gearbox is used to transform the high speed motion of the motor into the low speed/high torque operation required by the driven device.

This solution, however, creates inefficiencies of its own, mainly due to the need for a gearbox. Gearboxes are expensive, inefficient, noisy, producers of torque ripple which are prone to wear requiring additional maintenance expense. The use of a gearbox also prevents the tight integration of the motor and the driven device due to the backlash of the gears and due to the lower torsional resonances in the required couplings and the gearbox itself. This results in lower system bandwidths, reducing the system performance in an overall physically larger system with extra room required to house the gearbox.

The inefficiencies of a gearbox are avoided by employing a direct drive/cartridge motor, see e.g., U.S. Pat. No. 6,577, 036. Direct drive motors can be bolted directly to the driven machine. Thereby, achieving a high degree of mechanical simplicity, mechanical stiffness and efficiency. Accordingly, direct drive systems do away with the gearbox, its system limitations, and its associated expense. Loss of the gearbox, however, also results in the loss of its functional benefits, namely, the ability to run the motor at its most efficient speed and then use gearing to provide the required torque at the required speed. As a result, direct drive motors must be designed to run optimally at the required speed of the driven device. The low speed/high torque applications described above, therefore, require relatively larger motors compared to the geared solutions. Also, with the motors running at lower speeds cogging, speed ripple, and torque ripple become more significant issues. Of course, the need for a relatively larger, more expensive, motor at least partially negates the cost benefit attained by removing the gearbox.

SUMMARY OF THE INVENTION

The preceding problems are solved and an advance is achieved in the art by providing highly efficient motor designs employing optimum slot/pole ratios in the design of permanent magnet brushless motors.

The unique advantages of the present invention are achieved by providing slot/pole ratios that are less than one, but greater than 0.5. These slot/pole ratios enable high torque efficiencies.

A further aspect of the present invention provides slot/pole combinations that will provide superior cogging performance.

A further aspect of the present invention provides slot/pole combinations that will provide balanced windings.

A further aspect of the present invention provides slot/pole combinations that will provide low total harmonic distortion.

A still further aspect of the present identifies slot/pole combinations that will result in motors that are easy to manufacture with automatic winding machines.

BRIEF DESCRIPTION OF THE FIGURES

FIGS. 2A–2D are portions of a chart showing various parameters for exemplary slot/pole designs in accordance with the present invention. A chart showing more exemplary embodiments is attached as Appendix 1.

FIG. 3 is a chart comparing cogging for different slot/pole combinations with varying manufacturing tolerances.

DETAILED DESCRIPTION

Figure 1:
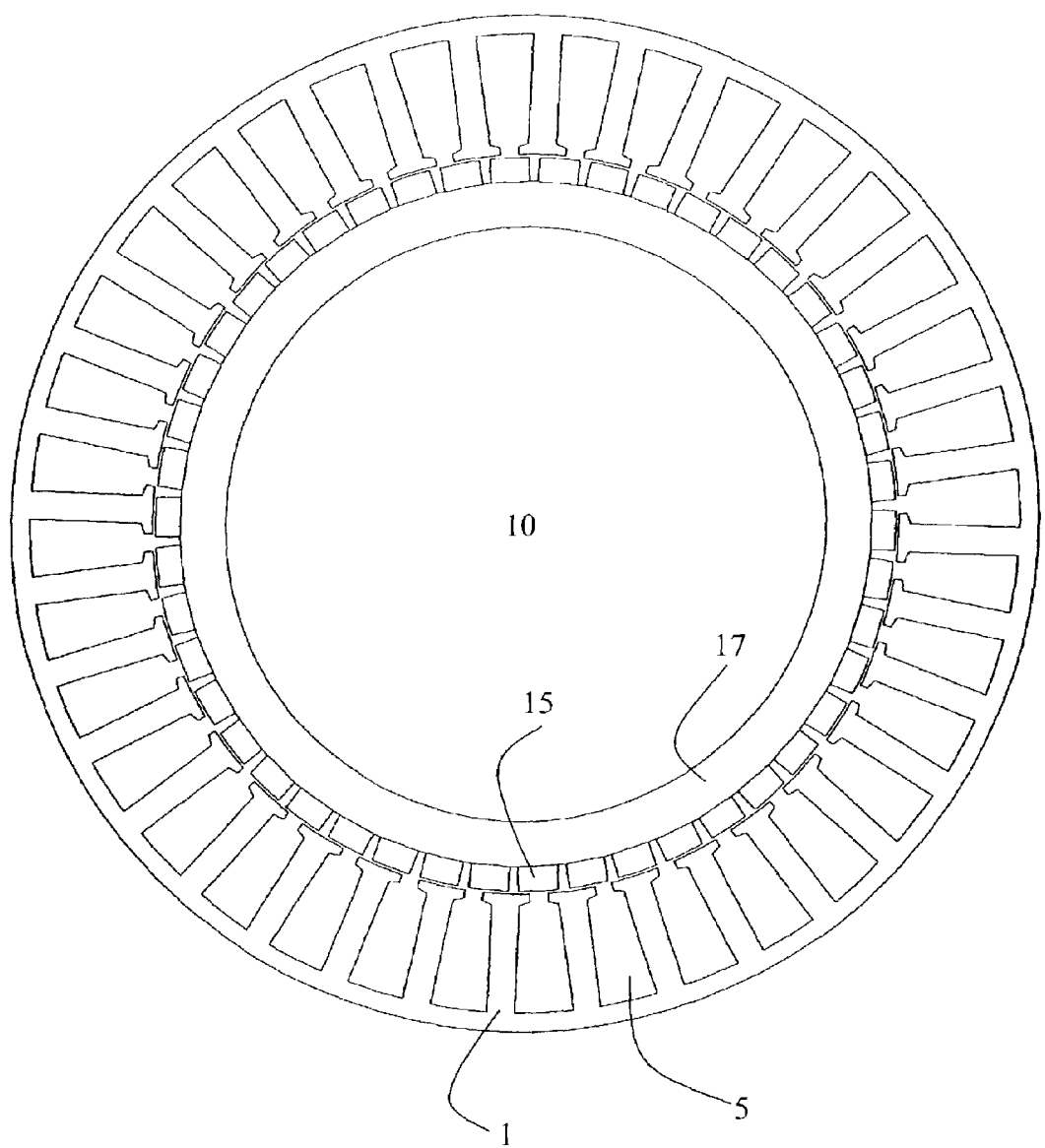
FIG. 1 depicts the cross section of a motor in accordance with an advantageous embodiment of the present invention.

The present invention provides a highly optimized motor design enabling an increase in torque compared to a similarly sized motor of traditional design. Additionally, the present invention enables motors that provide smooth, ripple free, torque operation at low speeds. These advances are provided through unique efficient motor design topologies not found in the prior art.

The unique aspects of the present invention are best described through reference to the attached figures. An exemplary embodiment of the present invention is shown in FIG. 1. This motor shares many of the features of a conventional permanent magnet brushless motor. The wound assembly 1 has permeable laminations with slots 5 and insulated copper wire wound in the slots. The insulated wire is wound into coils with a span of 1 tooth, i.e. each coil is wound around one tooth. The field assembly 10 has magnetic poles 15 arranged on a permeable structure 17.

The present invention achieves its surprisingly advantageous results by enabling an optimum design through the informed selection of slot number and pole number combinations. In traditional permanent magnet motor designs the number of slots in the machine is always greater than the number of magnet poles. This historical result stems from the fact that almost all three phase windings were created for induction motors. It is not feasible to create induction motors with more poles than slots because the poles are a result of coupling between the stator and rotor windings. The development of three phase brushless motor windings followed in the induction motor tradition.

The present invention achieves its advantageous increase in torque efficiency by reversing this long accepted practice. Specifically, it has been found that motors designed with more magnet poles than slots will provide an increased motor torque for a given amount of dissipated power. This is a result of the fewer slots yielding larger slot areas for a given number of poles. The larger slot area means that the required slot wall insulation and the phase insulation take up a lower percentage of the available slot area, leaving more room in which to put copper. It has been found, therefore, that beginning a design with an informed choice of slot/pole combinations results in inherently better motors. Furthermore, the benefits stem purely from the geometry provided by the slot/pole ratio and its effect on the relationship between the motor's wound assembly and field assembly.

The slot/pole ratios of the present invention result in additional benefits by providing more design freedom in several respects: (1) It allows higher numbers of poles to be used, since the tooth length/tooth width is lessened relative to the slot width which is increased. The tooth length/tooth width ratio is ultimately limited however due to increasing cross slot leakage of magnetic flux causing increasing torque rolloff and inductance, which is also exacerbated by the accompanying decrease in slot width. (2) The greater number of poles provides more torque due to the shorter end turn length and hence less coil resistance. In addition with the shorter end turns more stack can be added within the same overall length including the end turn length (3) The wider tooth allows for a wider range of stator Inner Diameters/Outer Diameters (ID/OD's) again because the tooth length/tooth width is lessened The benefits of the present invention are provided by identifying superior slot/pole combinations. The particular slot/pole combination best suited for a particular motor will, of course, depend on the specific parameters for a given design such as the outside diameter of the permeable laminations and the length of the stack of the permeable laminations, etc. In other words, using the slot/pole combinations identified by the present invention will enable benefits for the particular size or speed motor required. The combinations identified will readily lead to the best slot/pole combination for the particular motor parameters required. Using the identified slot/pole combinations, for example, results in high torque efficiency. The present invention also identifies a range of other characteristics that will enable a motor design in accordance with the present invention to be tailored to other particular requirements of a given application.

FIGS. 2A–2D is a chart showing various parameters for exemplary slot/pole designs in accordance with the present invention (a chart showing more exemplary embodiments is attached as Appendix 1). The slot/pole combinations depicted on the chart represent advantageous starting points that can be used in the design of motors to suit the particular application desired. Given that the advantageous slot/pole ratios are less than 1, these combinations assume a coil span of one tooth. For a final motor design, however, the specific characteristics which are most important will be dictated by the requirements of the particular application. For example, a particular application might require slightly more torque at the cost of slightly poorer cogging performance. FIGS. 2A–2D, and accompanying Appendix 1, guide a designer in picking a slot/pole combination to suit a number of design characteristics such as, winding balance, cogging, torque, and total harmonic distortion. It not only presents the most advantageous slot/pole combinations for a particular design, but also identifies poor slot/pole combinations that should be avoided.

For a particular motor design, for example, one might choose a pole count to suit a desired speed performance characteristic. The choice of a particular number of poles is one of the fundamental decisions in any motor design. The choice principally depends on the maximum speed at which the motor will be required to operate and the maximum frequency the source of power can provide. In general, for otherwise similarly designed motors, the greater the number of poles the greater the torque that can be produced, both on a continuous and peak basis. However, the greater number of poles, the lower the maximum speed of the motor for a given maximum frequency of the power source. For example, direct drive motors, generally being used at lower maximum speeds, will benefit from higher pole counts.

With a pole count selected the designer can then use FIGS. 2A–2D, or Appendix 1, to choose slot/pole combinations to match other required parameters. The designs according to the present invention are, therefore, particularly advantageous as the number of poles increases, for example 20 or more poles, because larger pole counts provide more slot/pole combinations from which to choose.

As noted above, optimum torque efficiency is achieved with motors having a slot/pole ratio less than 1. The performance of a motor with a slot/pole ratio less than 1 is much better than what is achievable with traditional motor topologies having slot/pole ratios greater than one. For example, a 45 slot 40 pole motor, which has a slot/pole ratio of 1.125, was tested and represents one of the best torque efficiency performances currently available. However a 36 slot/46 pole motor of comparable size designed in accordance with the present invention produces a torque efficiency 36% higher than the known 45 slot/40 pole motor. The benefits of smaller slot/pole ratios do not continue indefinitely, as the ratio approaches 0.5 many of the benefits of reducing the slot/pole ratio have been eroded by countervailing properties. For example, the 36 slot/46 pole motor also has a torque 2.3 times higher than the 24 slot/46 pole motor.

A number of factors contribute to the optimum torque achievable through designs according to the present invention. These factors may cause the ratio that will provide the maximum torque to vary from one design to another, however, the maximum torque should occur for a design with a slot/pole ratio greater than 0.5 but less than 1. This optimum occurs for the following reasons.

First, lowering the number of slots creates more open slot area per pole because the required insulation used on the slot walls and between coils of different phases within a slot has a fixed thickness. Therefore, in a design with fewer slots the insulation takes up a lower percentage of the total slot area. This leaves considerably more area for torque producing copper wire to be carried in the wound assembly. This effect is particularly beneficial in designs where the wound assembly is carried on the rotor because the space available for copper wire in the wound assembly is reduced. The benefits of reducing the number of slots for a given number of poles are eventually outweighed by the increase of resistance caused by the longer slot to slot distances spanned by the coil and the associated increase in wire length required for the windings' end turns. Effectively, the larger percentage of wire used in the end turns decreases the motor's torque because the end turn wire only adds extra resistance to the motor's phases without contributing to the motor's torque and limits the stack length of the torque producing laminations that can be used.

Second, as the slot/pole ratio is reduced the motor winding becomes more and more over pitched. In other words, as the slot/pole ratio is reduced, the spanned pitch of each coil remains the same at one tooth, while the pole pitch is reduced and therefore the pitch factor, Kp, is also reduced. Kp is equal to the sin(1−(pitch pu−1)*90.0) and is directly proportional to output torque, where pitch pu (span pitch/pole pitch). The torque of a brushless motor can be shown to be as follows:

$$T=m*(d\Psi/dt)*I$$

Where m=a constant of proportionality
$\psi$=Kp*f(geometry, material properties)
I=rms phase current Therefore, the motor torque is directly proportional to the Kp factor. FIGS. 2A–2D, and Appendix 1, list the Kp for each slot/pole combination. However, just like the increase in resistive losses discussed above, the benefits of reducing a motor's slot/pole ratio is tempered by the countervailing torque loss caused by the increased motor pitch.

Beyond the maximum achievable torque, a number of other considerations may dictate whether a particular slot/pole design is, or is not, suitable as a servomotor. One of the most important factors in designing a high performance servomotor is ensuring that cogging is reduced to a minimum. The cogging issue is somewhat more troublesome for direct drive motors since the electrical frequency at which they operate is somewhat lower. Motors designed in accordance with the present invention can compensate for this by screening possible slot/pole combinations for cogging performance. A first approach for determining the cogging performance of a motor is whether the ratio between the slots and the poles is a non-repeating decimal. Non-repeating decimal ratios have better cogging performance than those in which the ratio ends or repeats. For example, a 36 slot 48 pole motor, which has a ratio of 0.750, will have poorer cogging performance than a 36 slot 46 pole motor, which has a ratio of 0.7826086957 . . .

Another approach provides a quantitative result for determining the performance of a particular slot/pole design, using an equation to generate a cogging value ($C_T$). FIGS. 2A–2D, and Appendix 1, list the $C_T$ for each slot/pole combination. $C_T$ is an objective figure of merit that can be used to determine the relative cogging performance of various slot/pole combinations. $C_T$ is determined by using the equation $C_T$=p $Q_s/N_c$. The variables are, (1) p=the number of motor poles, (2) $Q_s$=the number of slots, and (3) $N_c$=the least common multiple between the slot number and the pole number (i.e. the smallest non-zero number that is a multiple of both the slot number and the pole number). For a given number of poles the $C_T$ value can be determined for various slot number choices. The lower the $C_T$ value for a given slot/pole combination the better the final motor's cogging performance.

The $C_T$ can be determined for various slot/pole combinations incorporating the desired pole count. Surprisingly, it has been found that motors with a slot/pole ratio of exactly 0.75 will have significantly higher $C_T$ values compared to other available slot/pole combinations with ratios less than 1. For example, as shown in Appendix 1, the 16 pole 12 slot (0.75 ratio) design has a $C_T$=4 which is the highest $C_T$ for the 16 pole motors with slot/pole ratios less than 1. This trend continues with the 32 pole/24 slot $C_T$=8; 40 pole/30 slot $C_T$=10; 44 pole/33 slot $C_T$=11; 48 pole/36 slot $C_T$=12; and 52 pole/39 slot $C_T$=13. In each of these cases design with ratios near 0.75, but hot exactly 0.75, have much better cogging performance. While 0.75 slot/pole ratio designs can employ other techniques to reduce cogging, such as skewing, they will always require more effort and more extensive cogging reduction techniques to achieve the low cogging torques achieved by similar motors having a slot/pole ratio that results in a lower $C_T$ value.

FIG. 3 depicts the effect of manufacturing tolerances on the cogging of the motors. As can be seen, the 0.75 slot/pole ratio motor not only has inherently poor cogging it also requires a high degree of manufacturing precision because any slight imperfection in the construction of the 0.75 motor will result in vastly higher cogging torques compared to the same changes in a low $C_T$ motor. Thus, it is inherently more difficult to achieve a given level of cogging in a design with a 0.75 slot/pole ratio than it is with the a slot/pole ratio having a lower $C_T$.

As seen in FIG. 3, it is still possible to achieve low cogging values even with the 0.75 combination. It can be achieved by using magnets with ideal magnet location within an optimized radius on a center, which is not the center of the rotor on the side of the magnet facing the airgap. This radius is smaller than the radius that will just enclose the magnet from the rotor center. Radiusing the magnets in this way, reduces the total rotor flux since the average airgap has been increased. This means the motor torque efficiency has been reduced with other parameters being held constant.

As can be seen from FIG. 3, however, the cogging of the 30 slot/40 pole combination is more sensitive to variation of the machine geometry. In this case if one of the magnet poles is shifted into the air gap by 0.005" the cogging of the 36 slot/46 pole combination increases by 1.59 times which is less than the 1.9 times increase of the 30 slot/40 pole. In addition if the rotor OD were to be ground to reduce the variation in geometry (remove the 0.005" high magnet), it would increase the cogging by more than 9 times, whereas in the already round rotor, the cogging would decrease.

Skewing is another option to reduce the cogging of the 0.75 combination (as well as the 36/46 combination). Skewing has two disadvantages: (1) It reduces the torque efficiency of the motor with other parameters being held constant; (2) It can be much more difficult to machine wind.

The inherently poorer cogging and higher sensitivity to parameter variation of the 0.75 design makes it a much less desirable slot/pole combination as compared to approximately equal ratios which have lower $C_T$'S.

Still, further design considerations must be addressed to achieve a desirable motor. The slot/pole combinations depicted in FIGS. 2A–2D also identify motors with maximum parallel paths. Slot pole combinations with a maximum parallel path of 1 will have fewer turns per coil and require larger wire size to fill the slot to a given percentage with wire than a winding with 2 or more parallel paths. This can result in motors that are more difficult to wind with an automated winding machine depending on the type of machine, since it must pull larger wire and it requires larger slot opening through which to place the wire reducing the torque efficiency of the machine. Thus, a designer should avoid these slot/pole combinations if that is a concern.

The slot/pole combination can, also, be preferably chosen to enable a balanced winding with the appropriate number of poles to be created. FIGS. 2A–2D, and Appendix 1, list the slot/pole combinations that give balanced windings with all slots filled, those with zero values in the chart. An unbalanced winding will result in: (1) significant torque ripple when the balanced sinusoidal currents generated by a typical drive are applied to it; (2) uneven heating of the motor during operation; and (3) circulating currents when the windings are delta connected. A three phase motor with Qs slots where Qs is a multiple of three, will have Qs/3 coils in each phase. The goal in achieving a balanced three phase winding is to place the coils of the phases in given slot locations around the stator, such that two criteria are met: (1) the total generated voltage from the series/parallel combination of coils comprising each of the three phases are equal (2) the voltages are displaced in time phase by 120 electrical degree. This can be accomplished by inspection, tabular methods or computer programs. It is also possible to create nearly balanced windings where the number of slots is not divisible by three. This may be accomplished by having one or two additional slots and teeth, but where there is not a coil wound around these additional teeth.

FIGS. 2A–2D, and Appendix 1, also list the slot/pole combinations that produce balance winding without requiring all slots to be filled. Though not theoretically perfectly balanced, they can be made close enough to be practically effective. Other slot/pole winding combinations, however, exist that would be electrically unbalanced phase to phase. These would vary from somewhat imbalanced to large phase imbalances, in either case causing less desirable to extremely poor performance. These combinations would have had a zero value in the balanced winding column, but have been screened from the list. This is why not all possible combinations greater than 0.5 and lees than 1.0 are shown on the chart.

One further consideration in the winding selection is the waveform of the MMF created by the winding when perfect three phase sin waves of current are applied to the winding. This is equivalent to looking at the waveform of the generated voltage of the winding when a perfect sinusoidal source of flux is used. The goal when using the motor with a three phase sinusoidal current source is to have a sinusoidal generated voltage waveform with no harmonics. With slotted stators and equal number of turns per coil, it is not possible to achieve the goal of zero harmonics, only to approach the goal. Total harmonic distortion, or THD is a measure of this goal. It is defined as:

$$THD = \sqrt{((V_2/V_1)^2 + (V_3/V_1)^2 + (V_4/V_1)^2 + (V_5/V_1)^2 + (V_6/V_1)^2 + (V_7/V_1)^2 \ldots )}/V_1 \%$$

Where V1, V2, V3 are the fundamental and higher order harmonics of the generated waveform. THD is shown in FIG. 2. Clearly, lower values are better. This becomes another important criterion to use when choosing desired windings.

As described above, the design according to the present invention are particularly well suited for high torque—low speed—motors. Guided by the approaches described by the present invention two exemplary motors have been designed, built and tested. The first motor is a 36 slot 46 pole design with a 12.5" stator lamination outer diameter, an 8.1" stack length, and 0.045" air gap. The second motor is a 30 slot 38 pole design with a 8.6" stator lamination outer diameter, a 5.8" stack length, and 0.040" air gap. The finished motors had a Km of 23.9 and 6.73 respectively. Km is an objective figure of merit for electric motors that represents a ratio of the torque produced by the motor to the power dissipated. Km is equivalent to the continuous torque of the motor when the heat transfer away from the motor, i.e. power dissipated, is held constant, therefore, a higher Km represents a more efficient motor. Km is defined as $(Km = T/\sqrt{(I^2)*R}(Nm/\sqrt{Watts}))$. The above stated Km performance of the motors designed in accordance with the present invention is superlative for motors of this size.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 10 | 6 | 0.6 | 0 | 2 | 2 | 2 | 0.5 | 0.249604232 |
| 10 | 7 | 0.7 | 1 | 2 | 1 | 2 | 0.781831482 | 0.281021751 |
| 10 | 8 | 0.8 | 2 | 2 | 2 | 2 | 0.923879533 | 0.122971276 |
| 10 | 9 | 0.9 | 0 | 1 | 1 | 1 | 0.984807753 | 0.166114912 |
| 12 | 9 | 0.75 | 0 | 1 | 3 | 3 | 0.866025404 | 0.249604232 |
| 12 | 10 | 0.833333333 | 1 | 1 | 2 | 3 | 0.951056516 | 0.123848433 |
| 12 | 11 | 0.916666667 | 2 | 1 | 1 | 3 | 0.989821442 | 0.173334714 |
| 14 | 9 | 0.642857143 | 0 | 2 | 1 | 1 | 0.64278761 | 0.197900559 |
| 14 | 10 | 0.714285714 | 1 | 2 | 2 | 1 | 0.809016994 | 0.271648756 |
| 14 | 11 | 0.785714286 | 2 | 2 | 1 | 1 | 0.909631995 | 0.146945689 |
| 14 | 12 | 0.857142857 | 0 | 1 | 2 | 2 | 0.965925826 | 0.139252172 |
| 14 | 13 | 0.928571429 | 1 | 1 | 1 | 2 | 0.992708874 | 0.177885384 |
| 16 | 9 | 0.5625 | 0 | 1 | 1 | 1 | 0.342020143 | 0.657104652 |
| 16 | 10 | 0.625 | 1 | 1 | 2 | 1 | 0.587785252 | 0.201330169 |
| 16 | 11 | 0.6875 | 2 | 1 | 1 | 1 | 0.755749574 | 0.276438918 |
| 16 | 12 | 0.75 | 0 | 1 | 4 | 4 | 0.866025404 | 0.249604232 |
| 16 | 13 | 0.8125 | 1 | 1 | 1 | 4 | 0.935016243 | 0.11528497 |
| 16 | 14 | 0.875 | 2 | 1 | 2 | 4 | 0.974927912 | 0.149341528 |
| 16 | 15 | 0.9375 | 0 | 1 | 1 | 1 | 0.994521895 | 0.183418691 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 20 | 12 | 0.6 | 0 | 2 | 4 | 4 | 0.5 | 0.249604232 |
| 20 | 13 | 0.65 | 1 | 2 | 1 | 4 | 0.663122658 | 0.216878644 |
| 20 | 14 | 0.7 | 2 | 2 | 2 | 4 | 0.781831482 | 0.281021751 |
| 20 | 15 | 0.75 | 0 | 1 | 5 | 5 | 0.866025404 | 0.249604232 |
| 20 | 16 | 0.8 | 1 | 1 | 4 | 5 | 0.923879533 | 0.122971276 |
| 20 | 17 | 0.85 | 2 | 1 | 1 | 5 | 0.961825643 | 0.135272043 |
| 20 | 18 | 0.9 | 0 | 1 | 2 | 2 | 0.984807753 | 0.166114912 |
| 22 | 12 | 0.545454545 | 0 | 2 | 2 | 2 | 0.258819045 | 0.812389602 |
| 22 | 13 | 0.590909091 | 1 | 2 | 1 | 2 | 0.464723172 | 0.361566081 |
| 22 | 14 | 0.636363636 | 2 | 1 | 2 | 22 | 0.623489802 | 0.189969977 |
| 22 | 15 | 0.681818182 | 0 | 1 | 1 | 1 | 0.743144825 | 0.269343888 |
| 22 | 16 | 0.727272727 | 1 | 1 | 2 | 22 | 0.831469612 | 0.268212778 |
| 22 | 17 | 0.772727273 | 2 | 1 | 1 | 22 | 0.895163291 | 0.182599153 |
| 22 | 18 | 0.818181818 | 0 | 2 | 2 | 2 | 0.939692621 | 0.115564239 |
| 22 | 19 | 0.863636364 | 1 | 1 | 1 | 22 | 0.969400266 | 0.142690529 |
| 22 | 20 | 0.909090909 | 2 | 1 | 2 | 22 | 0.987688341 | 0.170539182 |
| 22 | 21 | 0.954545455 | 0 | 1 | 1 | 1 | 0.997203797 | 0.202472832 |
| 24 | 18 | 0.75 | 0 | 1 | 6 | 6 | 0.866025404 | 0.249604232 |
| 24 | 19 | 0.791666667 | 1 | 1 | 1 | 6 | 0.915773327 | 0.134926839 |
| 24 | 20 | 0.833333333 | 2 | 1 | 4 | 6 | 0.951056516 | 0.123848433 |
| 26 | 15 | 0.576923077 | 0 | 2 | 1 | 1 | 0.406736643 | 0.528308632 |
| 26 | 16 | 0.615384615 | 1 | 2 | 2 | 1 | 0.555570233 | 0.201791183 |
| 26 | 17 | 0.653846154 | 2 | 2 | 1 | 1 | 0.673695604 | 0.227187156 |
| 26 | 18 | 0.692307692 | 0 | 1 | 2 | 2 | 0.766044443 | 0.28034481 |
| 26 | 19 | 0.730769231 | 1 | 1 | 1 | 2 | 0.837166478 | 0.268023535 |
| 26 | 20 | 0.769230769 | 2 | 1 | 2 | 2 | 0.891006524 | 0.193762432 |
| 26 | 21 | 0.807692308 | 0 | 2 | 1 | 1 | 0.930873749 | 0.116823889 |
| 26 | 22 | 0.846153846 | 1 | 2 | 2 | 1 | 0.959492974 | 0.132900247 |
| 26 | 23 | 0.884615385 | 2 | 2 | 1 | 1 | 0.979084088 | 0.155926545 |
| 26 | 24 | 0.923076923 | 0 | 1 | 2 | 2 | 0.991444861 | 0.175576734 |
| 26 | 25 | 0.961538462 | 1 | 1 | 1 | 2 | 0.998026728 | 0.212711602 |
| 28 | 15 | 0.535714286 | 0 | 1 | 1 | 1 | 0.207911691 | 0.956097664 |
| 28 | 16 | 0.571428571 | 1 | 1 | 4 | 1 | 0.382683432 | 0.580766246 |
| 28 | 17 | 0.607142857 | 2 | 1 | 1 | 1 | 0.526432163 | 0.204155251 |
| 28 | 18 | 0.642857143 | 0 | 2 | 2 | 2 | 0.64278761 | 0.197900559 |
| 28 | 19 | 0.678571429 | 1 | 2 | 1 | 2 | 0.735723911 | 0.26479621 |
| 28 | 20 | 0.714285714 | 2 | 2 | 4 | 2 | 0.809016994 | 0.271648756 |
| 28 | 21 | 0.75 | 0 | 1 | 7 | 7 | 0.866025404 | 0.249604232 |
| 28 | 22 | 0.785714286 | 1 | 1 | 2 | 7 | 0.909631995 | 0.146945689 |
| 28 | 23 | 0.821428571 | 2 | 1 | 1 | 7 | 0.942260922 | 0.116603578 |
| 28 | 24 | 0.857142857 | 0 | 1 | 4 | 4 | 0.965925826 | 0.139252172 |
| 28 | 25 | 0.892857143 | 1 | 1 | 1 | 4 | 0.982287251 | 0.161675982 |
| 28 | 26 | 0.928571429 | 2 | 1 | 2 | 4 | 0.992708874 | 0.177885384 |
| 28 | 27 | 0.964285714 | 0 | 1 | 1 | 1 | 0.998308158 | 0.216841025 |
| 30 | 18 | 0.6 | 0 | 2 | 6 | 6 | 0.5 | 0.249604232 |
| 30 | 19 | 0.633333333 | 1 | 2 | 1 | 6 | 0.614212713 | 0.190971274 |
| 30 | 20 | 0.666666667 | 2 | 2 | 10 | 6 | 0.707106781 | 0.249604232 |
| 30 | 27 | 0.9 | 0 | 1 | 3 | 3 | 0.984807753 | 0.166114912 |
| 30 | 28 | 0.933333333 | 1 | 2 | 2 | 3 | 0.99371221 | 0.180495453 |
| 30 | 29 | 0.966666667 | 2 | 1 | 1 | 3 | 0.998533414 | 0.220396749 |
| 32 | 18 | 0.5625 | 0 | 1 | 2 | 2 | 0.342020143 | 0.657104652 |
| 32 | 19 | 0.59375 | 1 | 1 | 1 | 2 | 0.475947393 | 0.323691168 |
| 32 | 20 | 0.625 | 2 | 1 | 4 | 2 | 0.587785252 | 0.201330169 |
| 32 | 21 | 0.65625 | 0 | 2 | 1 | 1 | 0.680172738 | 0.232832619 |
| 32 | 22 | 0.6875 | 1 | 2 | 2 | 1 | 0.755749574 | 0.276438918 |
| 32 | 23 | 0.71875 | 2 | 2 | 1 | 1 | 0.816969893 | 0.269499191 |
| 32 | 24 | 0.75 | 0 | 1 | 8 | 8 | 0.866025404 | 0.249604232 |
| 32 | 25 | 0.78125 | 1 | 1 | 1 | 8 | 0.904827052 | 0.157858999 |
| 32 | 26 | 0.8125 | 2 | 1 | 2 | 8 | 0.935016243 | 0.11528497 |
| 32 | 27 | 0.84375 | 0 | 2 | 1 | 1 | 0.957989512 | 0.13131874 |
| 32 | 28 | 0.875 | 1 | 1 | 4 | 1 | 0.974927912 | 0.149341528 |
| 32 | 29 | 0.90625 | 2 | 2 | 1 | 1 | 0.986826523 | 0.169308324 |
| 32 | 30 | 0.9375 | 0 | 1 | 2 | 2 | 0.994521895 | 0.183418691 |
| 32 | 31 | 0.96875 | 1 | 1 | 1 | 2 | 0.998716507 | 0.223457681 |
| 34 | 18 | 0.529411765 | 0 | 2 | 2 | 2 | 0.173648178 | 1.085649275 |
| 34 | 19 | 0.558823529 | 1 | 2 | 1 | 2 | 0.324699469 | 0.686198554 |
| 34 | 20 | 0.588235294 | 2 | 2 | 2 | 2 | 0.4539905 | 0.397073845 |
| 34 | 21 | 0.617647059 | 0 | 1 | 1 | 1 | 0.563320058 | 0.203411399 |
| 34 | 22 | 0.647058824 | 1 | 2 | 2 | 1 | 0.654860734 | 0.208570119 |
| 34 | 23 | 0.676470588 | 2 | 1 | 1 | 1 | 0.730835964 | 0.261882278 |
| 34 | 24 | 0.705882353 | 0 | 2 | 2 | 2 | 0.79335334 | 0.277721125 |
| 34 | 25 | 0.735294118 | 1 | 2 | 1 | 2 | 0.844327926 | 0.267057827 |
| 34 | 26 | 0.764705882 | 2 | 2 | 2 | 2 | 0.885456026 | 0.208454625 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 34 | 27 | 0.794117647 | 0 | 1 | 1 | 1 | 0.918216107 | 0.13082749 |
| 34 | 28 | 0.823529412 | 1 | 1 | 2 | 1 | 0.94388333 | 0.117555714 |
| 34 | 29 | 0.852941176 | 2 | 1 | 1 | 1 | 0.963549993 | 0.136965075 |
| 34 | 30 | 0.882352941 | 0 | 2 | 2 | 2 | 0.978147601 | 0.154326845 |
| 34 | 31 | 0.911764706 | 1 | 2 | 1 | 2 | 0.988468324 | 0.171590662 |
| 34 | 32 | 0.941176471 | 2 | 2 | 2 | 2 | 0.995184727 | 0.186570007 |
| 34 | 33 | 0.970588235 | 0 | 1 | 1 | 1 | 0.998867339 | 0.226097856 |
| 36 | 27 | 0.75 | 0 | 1 | 9 | 9 | 0.866025404 | 0.249604232 |
| 36 | 28 | 0.777777778 | 1 | 1 | 4 | 9 | 0.900968868 | 0.167391628 |
| 36 | 29 | 0.805555556 | 2 | 1 | 1 | 9 | 0.92897672 | 0.118069217 |
| 38 | 21 | 0.552631579 | 0 | 2 | 1 | 1 | 0.294755174 | 0.736875711 |
| 38 | 22 | 0.578947368 | 1 | 2 | 2 | 1 | 0.415415013 | 0.507438062 |
| 38 | 23 | 0.605263158 | 2 | 2 | 1 | 1 | 0.51958395 | 0.21104203 |
| 38 | 24 | 0.631578947 | 0 | 1 | 2 | 2 | 0.608761429 | 0.192667 |
| 38 | 25 | 0.657894737 | 1 | 1 | 1 | 2 | 0.684547106 | 0.236262364 |
| 38 | 26 | 0.684210526 | 2 | 1 | 2 | 2 | 0.748510748 | 0.272550678 |
| 38 | 27 | 0.710526316 | 0 | 2 | 1 | 1 | 0.802123193 | 0.274221271 |
| 38 | 28 | 0.736842105 | 1 | 2 | 2 | 1 | 0.846724199 | 0.26638671 |
| 38 | 29 | 0.763157895 | 2 | 2 | 1 | 1 | 0.883512044 | 0.213427941 |
| 38 | 30 | 0.789473684 | 0 | 1 | 2 | 2 | 0.913545458 | 0.139013604 |
| 38 | 31 | 0.815789474 | 1 | 1 | 1 | 2 | 0.937752132 | 0.115188724 |
| 38 | 32 | 0.842105263 | 2 | 1 | 2 | 2 | 0.956940336 | 0.130194434 |
| 38 | 33 | 0.868421053 | 0 | 2 | 1 | 1 | 0.971811568 | 0.145338011 |
| 38 | 34 | 0.894736842 | 1 | 2 | 2 | 1 | 0.9829731 | 0.162913532 |
| 38 | 35 | 0.921052632 | 2 | 2 | 1 | 1 | 0.990949762 | 0.174843151 |
| 38 | 36 | 0.947368421 | 0 | 1 | 2 | 2 | 0.996194698 | 0.193131583 |
| 38 | 37 | 0.973684211 | 1 | 1 | 1 | 2 | 0.999098966 | 0.230367049 |
| 40 | 21 | 0.525 | 0 | 1 | 1 | 1 | 0.149042266 | 1.225362448 |
| 40 | 22 | 0.55 | 1 | 1 | 2 | 1 | 0.281732557 | 0.761620727 |
| 40 | 23 | 0.575 | 2 | 1 | 1 | 1 | 0.39840109 | 0.547282825 |
| 40 | 24 | 0.6 | 0 | 2 | 8 | 8 | 0.5 | 0.249604232 |
| 40 | 25 | 0.625 | 1 | 2 | 5 | 8 | 0.587785252 | 0.201330169 |
| 40 | 26 | 0.65 | 2 | 2 | 2 | 8 | 0.663122658 | 0.216878644 |
| 40 | 27 | 0.675 | 0 | 1 | 1 | 1 | 0.727373642 | 0.259900638 |
| 40 | 28 | 0.7 | 1 | 1 | 4 | 1 | 0.781831482 | 0.281021071 |
| 40 | 29 | 0.725 | 2 | 1 | 1 | 1 | 0.827688998 | 0.268317086 |
| 40 | 30 | 0.75 | 0 | 1 | 10 | 10 | 0.866025404 | 0.249604232 |
| 40 | 31 | 0.775 | 1 | 1 | 1 | 10 | 0.89780454 | 0.175587301 |
| 40 | 32 | 0.8 | 2 | 1 | 8 | 10 | 0.923879533 | 0.122971276 |
| 40 | 33 | 0.825 | 0 | 1 | 1 | 1 | 0.945000819 | 0.118332187 |
| 40 | 34 | 0.85 | 1 | 1 | 2 | 1 | 0.961825643 | 0.135272043 |
| 40 | 35 | 0.875 | 2 | 1 | 5 | 1 | 0.974927912 | 0.149341528 |
| 40 | 36 | 0.9 | 0 | 1 | 4 | 4 | 0.984807753 | 0.166114912 |
| 40 | 37 | 0.925 | 1 | 1 | 1 | 4 | 0.991900435 | 0.176320946 |
| 40 | 38 | 0.95 | 2 | 1 | 2 | 4 | 0.996584493 | 0.196366609 |
| 40 | 39 | 0.975 | 0 | 1 | 1 | 1 | 0.999188998 | 0.232098334 |
| 42 | 27 | 0.642857143 | 0 | 2 | 3 | 3 | 0.64278761 | 0.197900559 |
| 42 | 28 | 0.666666667 | 1 | 2 | 14 | 3 | 0.707106781 | 0.249604232 |
| 42 | 29 | 0.69047619 | 2 | 2 | 1 | 3 | 0.762162055 | 0.279151695 |
| 42 | 36 | 0.857142857 | 0 | 1 | 6 | 6 | 0.965925826 | 0.139252172 |
| 42 | 37 | 0.880952381 | 1 | 1 | 1 | 6 | 0.977555239 | 0.15334635 |
| 42 | 38 | 0.904761905 | 2 | 1 | 2 | 6 | 0.986361303 | 0.16861041 |
| 44 | 24 | 0.545454545 | 0 | 2 | 4 | 4 | 0.258819045 | 0.812389602 |
| 44 | 25 | 0.568181818 | 1 | 2 | 1 | 4 | 0.368124553 | 0.609641573 |
| 44 | 26 | 0.590909091 | 2 | 2 | 2 | 4 | 0.464723172 | 0.361566081 |
| 44 | 27 | 0.613636364 | 0 | 2 | 1 | 1 | 0.549508978 | 0.200401777 |
| 44 | 28 | 0.636363636 | 1 | 2 | 4 | 1 | 0.623489802 | 0.189969977 |
| 44 | 29 | 0.659090909 | 2 | 2 | 1 | 1 | 0.687699459 | 0.238535408 |
| 44 | 30 | 0.681818182 | 0 | 1 | 2 | 2 | 0.743144825 | 0.269343888 |
| 44 | 31 | 0.704545455 | 1 | 1 | 1 | 2 | 0.790775737 | 0.278653118 |
| 44 | 32 | 0.727272727 | 2 | 1 | 4 | 2 | 0.831469612 | 0.268212778 |
| 44 | 33 | 0.75 | 0 | 1 | 11 | 11 | 0.866025404 | 0.249604232 |
| 44 | 34 | 0.772727273 | 1 | 1 | 2 | 11 | 0.895163291 | 0.182599153 |
| 44 | 35 | 0.795454545 | 2 | 1 | 1 | 11 | 0.919527773 | 0.12879784 |
| 44 | 36 | 0.818181818 | 0 | 1 | 4 | 4 | 0.939692621 | 0.115564239 |
| 44 | 37 | 0.840909091 | 1 | 1 | 1 | 4 | 0.956166735 | 0.129357338 |
| 44 | 38 | 0.863636364 | 2 | 1 | 2 | 4 | 0.969400266 | 0.142690529 |
| 44 | 39 | 0.886363636 | 0 | 1 | 1 | 1 | 0.979790652 | 0.157167442 |
| 44 | 40 | 0.909090909 | 1 | 1 | 4 | 1 | 0.987688341 | 0.170539182 |
| 44 | 41 | 0.931818182 | 2 | 1 | 1 | 1 | 0.99340209 | 0.179588252 |
| 44 | 42 | 0.954545455 | 0 | 1 | 2 | 2 | 0.997203797 | 0.202472832 |
| 44 | 43 | 0.977272727 | 1 | 1 | 1 | 2 | 0.999332848 | 0.234949902 |
| 46 | 24 | 0.52173913 | 0 | 2 | 2 | 2 | 0.130526192 | 1.37050075 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 46 | 25 | 0.543478261 | 1 | 2 | 1 | 2 | 0.248689887 | 0.8379287 |
| 46 | 26 | 0.565217391 | 2 | 2 | 2 | 2 | 0.354604887 | 0.634871592 |
| 46 | 27 | 0.586956522 | 0 | 1 | 1 | 1 | 0.44879918 | 0.413656044 |
| 46 | 28 | 0.608695652 | 1 | 1 | 2 | 1 | 0.532032077 | 0.200919998 |
| 46 | 29 | 0.630434783 | 2 | 1 | 1 | 1 | 0.605174215 | 0.194073445 |
| 46 | 30 | 0.652173913 | 0 | 2 | 2 | 2 | 0.669130606 | 0.222860679 |
| 46 | 31 | 0.673913043 | 1 | 2 | 1 | 2 | 0.724792787 | 0.258475468 |
| 46 | 32 | 0.695652174 | 2 | 2 | 2 | 2 | 0.773010453 | 0.281489772 |
| 46 | 33 | 0.717391304 | 0 | 1 | 1 | 1 | 0.814575952 | 0.270030285 |
| 46 | 34 | 0.739130435 | 1 | 1 | 2 | 1 | 0.850217136 | 0.264969061 |
| 46 | 35 | 0.760869565 | 2 | 1 | 1 | 1 | 0.880595532 | 0.220629124 |
| 46 | 36 | 0.782608696 | 0 | 2 | 2 | 2 | 0.906307787 | 0.154370684 |
| 46 | 37 | 0.804347826 | 1 | 2 | 1 | 2 | 0.927889027 | 0.118929404 |
| 46 | 38 | 0.826086957 | 2 | 2 | 2 | 2 | 0.945817242 | 0.118956414 |
| 46 | 39 | 0.847826087 | 0 | 1 | 1 | 1 | 0.960518112 | 0.133955165 |
| 46 | 40 | 0.869565217 | 1 | 1 | 2 | 1 | 0.97236992 | 0.146000776 |
| 46 | 41 | 0.891304348 | 2 | 1 | 1 | 1 | 0.98170832 | 0.160624769 |
| 46 | 42 | 0.913043478 | 0 | 2 | 2 | 2 | 0.988830826 | 0.172063705 |
| 46 | 43 | 0.934782609 | 1 | 2 | 1 | 2 | 0.994000975 | 0.181438187 |
| 46 | 44 | 0.956521739 | 2 | 2 | 2 | 2 | 0.997452115 | 0.205290332 |
| 46 | 45 | 0.97826087 | 0 | 1 | 1 | 1 | 0.999390827 | 0.236129319 |
| 48 | 27 | 0.5625 | 0 | 1 | 3 | 3 | 0.342020143 | 0.657104652 |
| 48 | 28 | 0.583333333 | 1 | 1 | 4 | 3 | 0.433833739 | 0.458394586 |
| 48 | 29 | 0.604166667 | 2 | 1 | 1 | 3 | 0.515553857 | 0.216725294 |
| 48 | 36 | 0.75 | 0 | 1 | 12 | 12 | 0.866025404 | 0.249604232 |
| 48 | 37 | 0.770833333 | 1 | 1 | 1 | 12 | 0.892925858 | 0.188602834 |
| 48 | 38 | 0.791666667 | 2 | 1 | 2 | 12 | 0.915773327 | 0.134926839 |
| 48 | 45 | 0.9375 | 0 | 1 | 3 | 3 | 0.994521895 | 0.183418691 |
| 50 | 27 | 0.54 | 0 | 2 | 1 | 1 | 0.230615871 | 0.887487812 |
| 50 | 28 | 0.56 | 1 | 2 | 2 | 1 | 0.330279062 | 0.676958838 |
| 50 | 29 | 0.58 | 2 | 2 | 1 | 1 | 0.419889102 | 0.496170422 |
| 50 | 30 | 0.6 | 0 | 2 | 10 | 10 | 0.5 | 0.249604232 |
| 50 | 31 | 0.62 | 1 | 2 | 1 | 10 | 0.571268215 | 0.204158758 |
| 50 | 32 | 0.64 | 2 | 2 | 2 | 10 | 0.634393284 | 0.192767156 |
| 50 | 33 | 0.66 | 0 | 2 | 1 | 1 | 0.690079011 | 0.24014423 |
| 50 | 34 | 0.68 | 1 | 2 | 2 | 1 | 0.739008917 | 0.266804756 |
| 50 | 35 | 0.7 | 2 | 2 | 5 | 1 | 0.781831482 | 0.281021751 |
| 50 | 36 | 0.72 | 0 | 1 | 2 | 2 | 0.819152044 | 0.269106858 |
| 50 | 37 | 0.74 | 1 | 1 | 1 | 2 | 0.851529138 | 0.26428199 |
| 50 | 38 | 0.76 | 2 | 1 | 2 | 2 | 0.879473751 | 0.223300423 |
| 50 | 39 | 0.78 | 0 | 2 | 1 | 1 | 0.903450435 | 0.16119157 |
| 50 | 40 | 0.8 | 1 | 2 | 10 | 1 | 0.923879533 | 0.122971276 |
| 50 | 41 | 0.82 | 2 | 2 | 1 | 1 | 0.941140048 | 0.116076553 |
| 50 | 42 | 0.84 | 0 | 1 | 2 | 2 | 0.955572806 | 0.128711511 |
| 50 | 43 | 0.86 | 1 | 1 | 1 | 2 | 0.967483697 | 0.140762094 |
| 50 | 44 | 0.88 | 2 | 1 | 2 | 2 | 0.977146866 | 0.152686048 |
| 50 | 45 | 0.9 | 0 | 1 | 5 | 5 | 0.984807753 | 0.166114912 |
| 50 | 46 | 0.92 | 1 | 1 | 2 | 5 | 0.990685946 | 0.174475274 |
| 50 | 47 | 0.94 | 2 | 1 | 1 | 5 | 0.994977815 | 0.185500958 |
| 50 | 48 | 0.96 | 0 | 1 | 2 | 2 | 0.997858923 | 0.210408244 |
| 50 | 49 | 0.98 | 1 | 1 | 1 | 2 | 0.999486216 | 0.238107884 |
| 52 | 27 | 0.519230769 | 0 | 1 | 1 | 1 | 0.116092914 | 1.507797807 |
| 52 | 28 | 0.538461538 | 1 | 1 | 4 | 1 | 0.222520934 | 0.911107652 |
| 52 | 29 | 0.557692308 | 2 | 1 | 1 | 1 | 0.31930153 | 0.695090731 |
| 52 | 30 | 0.576923077 | 0 | 2 | 2 | 2 | 0.406736643 | 0.528308632 |
| 52 | 31 | 0.596153846 | 1 | 2 | 1 | 2 | 0.485301963 | 0.29288233 |
| 52 | 32 | 0.615384615 | 2 | 2 | 4 | 2 | 0.555570233 | 0.201791183 |
| 52 | 33 | 0.634615385 | 0 | 1 | 1 | 1 | 0.618158986 | 0.190209586 |
| 52 | 34 | 0.653846154 | 1 | 1 | 2 | 1 | 0.673695644 | 0.227187156 |
| 52 | 35 | 0.673076923 | 2 | 1 | 1 | 1 | 0.722794864 | 0.257403142 |
| 52 | 36 | 0.692307692 | 0 | 1 | 4 | 4 | 0.766044443 | 0.28034481 |
| 52 | 37 | 0.711538462 | 1 | 1 | 1 | 4 | 0.80399713 | 0.273480257 |
| 52 | 38 | 0.730769231 | 2 | 1 | 2 | 4 | 0.837166478 | 0.268023535 |
| 52 | 39 | 0.75 | 0 | 1 | 13 | 13 | 0.866025404 | 0.249604232 |
| 52 | 40 | 0.769230769 | 1 | 1 | 4 | 13 | 0.891006524 | 0.193762432 |
| 52 | 41 | 0.788461538 | 2 | 1 | 1 | 13 | 0.912503616 | 0.141034076 |
| 52 | 42 | 0.807692308 | 0 | 2 | 2 | 2 | 0.930873749 | 0.116823889 |
| 52 | 43 | 0.826923077 | 1 | 2 | 1 | 2 | 0.946439773 | 0.119462306 |
| 52 | 44 | 0.846153846 | 2 | 2 | 4 | 2 | 0.959492974 | 0.132900247 |
| 52 | 45 | 0.865384615 | 0 | 1 | 1 | 1 | 0.970295726 | 0.143637911 |
| 52 | 46 | 0.884615385 | 1 | 1 | 2 | 1 | 0.979084088 | 0.155926545 |
| 52 | 47 | 0.903846154 | 2 | 1 | 1 | 1 | 0.986070254 | 0.168161739 |
| 52 | 48 | 0.923076923 | 0 | 1 | 4 | 4 | 0.991444861 | 0.175576734 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 52 | 49 | 0.942307692 | 1 | 1 | 1 | 4 | 0.995379113 | 0.187652192 |
| 52 | 50 | 0.961538462 | 2 | 1 | 2 | 4 | 0.998026728 | 0.212711602 |
| 52 | 51 | 0.980769231 | 0 | 1 | 1 | 1 | 0.99952572 | 0.238941275 |
| 54 | 53 | 0.981481481 | 2 | 1 | 1 | 54 | 0.999560837 | 0.23968906 |
| 56 | 29 | 0.517857143 | 2 | 2 | 1 | 1 | 0.108119018 | 1.591095215 |
| 56 | 30 | 0.535714286 | 0 | 1 | 2 | 2 | 0.207911691 | 0.956097664 |
| 56 | 31 | 0.553571429 | 1 | 1 | 1 | 2 | 0.299363123 | 0.728674215 |
| 56 | 32 | 0.571428571 | 2 | 1 | 8 | 2 | 0.382683432 | 0.580766246 |
| 56 | 33 | 0.589285714 | 0 | 2 | 1 | 1 | 0.458226522 | 0.38322537 |
| 56 | 34 | 0.607142857 | 1 | 2 | 2 | 1 | 0.526432163 | 0.204155251 |
| 56 | 35 | 0.625 | 2 | 2 | 7 | 1 | 0.587785252 | 0.201330169 |
| 56 | 36 | 0.642857143 | 0 | 2 | 4 | 4 | 0.64278761 | 0.197900559 |
| 56 | 37 | 0.660714286 | 1 | 2 | 1 | 4 | 0.691938869 | 0.241340786 |
| 56 | 38 | 0.678571429 | 2 | 2 | 2 | 4 | 0.735723911 | 0.26479621 |
| 56 | 39 | 0.696428571 | 0 | 2 | 1 | 1 | 0.774604962 | 0.281562485 |
| 56 | 40 | 0.714285714 | 1 | 2 | 8 | 1 | 0.809016994 | 0.271648756 |
| 56 | 41 | 0.732142857 | 2 | 2 | 1 | 1 | 0.839365426 | 0.2678539 |
| 56 | 42 | 0.75 | 0 | 1 | 14 | 14 | 0.866025404 | 0.249604232 |
| 56 | 43 | 0.767857143 | 1 | 1 | 1 | 14 | 0.889342149 | 0.198219622 |
| 56 | 44 | 0.785714286 | 2 | 1 | 4 | 14 | 0.909631995 | 0.146945689 |
| 56 | 45 | 0.803571429 | 0 | 2 | 1 | 1 | 0.927183855 | 0.1195424 |
| 56 | 46 | 0.821428571 | 1 | 2 | 2 | 1 | 0.942260922 | 0.116603578 |
| 56 | 47 | 0.839285714 | 2 | 2 | 1 | 1 | 0.955102497 | 0.128198982 |
| 56 | 48 | 0.857142857 | 0 | 1 | 8 | 8 | 0.965925826 | 0.139252172 |
| 56 | 49 | 0.875 | 1 | 1 | 7 | 8 | 0.974927912 | 0.149341528 |
| 56 | 50 | 0.892857143 | 2 | 1 | 2 | 8 | 0.982287251 | 0.161675982 |
| 56 | 51 | 0.910714286 | 0 | 2 | 1 | 1 | 0.988165472 | 0.171188554 |
| 56 | 52 | 0.928571429 | 1 | 2 | 4 | 1 | 0.992708874 | 0.177885384 |
| 56 | 53 | 0.946428571 | 2 | 2 | 1 | 1 | 0.996049843 | 0.192037492 |
| 56 | 54 | 0.964285714 | 0 | 1 | 2 | 2 | 0.998308158 | 0.216841025 |
| 56 | 55 | 0.982142857 | 1 | 1 | 1 | 2 | 0.999592193 | 0.240362313 |
| 58 | 30 | 0.517241379 | 0 | 2 | 2 | 2 | 0.104528463 | 1.629933185 |
| 58 | 31 | 0.534482759 | 1 | 2 | 1 | 2 | 0.20129852 | 0.977780486 |
| 58 | 32 | 0.551724138 | 2 | 2 | 2 | 2 | 0.290284677 | 0.745085515 |
| 58 | 33 | 0.568965517 | 0 | 1 | 1 | 1 | 0.371662456 | 0.602793496 |
| 58 | 34 | 0.586206897 | 1 | 1 | 2 | 1 | 0.445738356 | 0.423203988 |
| 58 | 35 | 0.603448276 | 2 | 1 | 1 | 1 | 0.512899277 | 0.221137291 |
| 58 | 36 | 0.620689655 | 0 | 2 | 2 | 2 | 0.573576436 | 0.204130216 |
| 58 | 37 | 0.637931034 | 1 | 2 | 1 | 2 | 0.628219997 | 0.190622316 |
| 58 | 38 | 0.655172414 | 2 | 2 | 2 | 2 | 0.677281572 | 0.230392404 |
| 58 | 39 | 0.672413793 | 0 | 1 | 1 | 1 | 0.721202447 | 0.256567045 |
| 58 | 40 | 0.689655172 | 1 | 1 | 2 | 1 | 0.760405966 | 0.278494052 |
| 58 | 41 | 0.706896552 | 2 | 1 | 1 | 1 | 0.795292871 | 0.276974514 |
| 58 | 42 | 0.724137931 | 0 | 2 | 2 | 2 | 0.826238774 | 0.268383038 |
| 58 | 43 | 0.74137931 | 1 | 2 | 1 | 2 | 0.853593089 | 0.263011021 |
| 58 | 44 | 0.75862069 | 2 | 2 | 2 | 2 | 0.87767899 | 0.227444715 |
| 58 | 45 | 0.775862069 | 0 | 1 | 1 | 1 | 0.898794046 | 0.172995494 |
| 58 | 46 | 0.793103448 | 1 | 1 | 2 | 1 | 0.917211302 | 0.132464151 |
| 58 | 47 | 0.810344828 | 2 | 1 | 1 | 1 | 0.933180611 | 0.115762474 |
| 58 | 48 | 0.827586207 | 0 | 2 | 2 | 2 | 0.946930129 | 0.119877837 |
| 58 | 49 | 0.844827586 | 1 | 2 | 1 | 2 | 0.958667853 | 0.132037068 |
| 58 | 50 | 0.862068966 | 2 | 2 | 2 | 2 | 0.968583161 | 0.141854648 |
| 58 | 51 | 0.879310345 | 0 | 1 | 1 | 1 | 0.976848318 | 0.152211797 |
| 58 | 52 | 0.896551724 | 1 | 1 | 2 | 1 | 0.983619907 | 0.164065083 |
| 58 | 53 | 0.913793103 | 2 | 1 | 1 | 1 | 0.989040187 | 0.1723338 |
| 58 | 54 | 0.931034483 | 0 | 2 | 2 | 2 | 0.993238358 | 0.179148535 |
| 58 | 55 | 0.948275862 | 1 | 1 | 1 | 2 | 0.996331731 | 0.194219255 |
| 58 | 56 | 0.965517241 | 2 | 2 | 2 | 2 | 0.998426815 | 0.218685636 |
| 58 | 57 | 0.982758621 | 0 | 1 | 1 | 1 | 0.999620307 | 0.240970419 |
| 60 | 36 | 0.6 | 0 | 2 | 12 | 12 | 0.5 | 0.249604232 |
| 60 | 37 | 0.616666667 | 1 | 2 | 1 | 12 | 0.559974786 | 0.202782194 |
| 60 | 38 | 0.633333333 | 2 | 2 | 2 | 12 | 0.614212713 | 0.190971274 |
| 60 | 45 | 0.75 | 0 | 1 | 15 | 15 | 0.866025404 | 0.249604232 |
| 60 | 46 | 0.766666667 | 1 | 2 | 2 | 15 | 0.887885218 | 0.202092476 |
| 60 | 47 | 0.783333333 | 2 | 1 | 1 | 15 | 0.907090914 | 0.152569055 |
| 60 | 54 | 0.9 | 0 | 1 | 6 | 6 | 0.984807753 | 0.166114912 |
| 60 | 55 | 0.916666667 | 1 | 1 | 5 | 6 | 0.989821442 | 0.173334714 |
| 60 | 56 | 0.933333333 | 2 | 1 | 4 | 6 | 0.99371221 | 0.180495453 |
| 62 | 32 | 0.516129032 | 2 | 2 | 1 | 2 | 0.09801714 | 1.70192915 |
| 62 | 33 | 0.532258065 | 0 | 2 | 1 | 1 | 0.189251244 | 1.020531146 |
| 62 | 34 | 0.548387097 | 1 | 2 | 2 | 1 | 0.27366299 | 0.778373751 |
| 62 | 35 | 0.564516129 | 2 | 2 | 1 | 1 | 0.351374824 | 0.640687319 |
| 62 | 36 | 0.580645161 | 0 | 1 | 2 | 2 | 0.422618262 | 0.489112842 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 62 | 37 | 0.596774194 | 1 | 1 | 1 | 2 | 0.487694944 | 0.285294494 |
| 62 | 38 | 0.612903226 | 2 | 1 | 2 | 2 | 0.546948158 | 0.199913517 |
| 62 | 39 | 0.629032258 | 0 | 2 | 1 | 1 | 0.600742264 | 0.195986587 |
| 62 | 40 | 0.64516129 | 1 | 2 | 2 | 1 | 0.649448048 | 0.203438155 |
| 62 | 41 | 0.661290323 | 2 | 2 | 1 | 1 | 0.693432501 | 0.242265206 |
| 62 | 42 | 0.677419355 | 0 | 1 | 2 | 2 | 0.733051872 | 0.263188689 |
| 62 | 43 | 0.693548387 | 1 | 1 | 1 | 2 | 0.76864714 | 0.280927823 |
| 62 | 44 | 0.709677419 | 2 | 1 | 2 | 2 | 0.800541241 | 0.274859491 |
| 62 | 45 | 0.725806452 | 0 | 2 | 1 | 1 | 0.829037573 | 0.26827164 |
| 62 | 46 | 0.741935484 | 1 | 2 | 2 | 1 | 0.854419405 | 0.262433349 |
| 62 | 47 | 0.758064516 | 2 | 2 | 1 | 1 | 0.876949928 | 0.229079496 |
| 62 | 48 | 0.774193548 | 0 | 1 | 2 | 2 | 0.896872742 | 0.178047438 |
| 62 | 49 | 0.790322581 | 1 | 1 | 1 | 2 | 0.914412623 | 0.137384467 |
| 62 | 50 | 0.806451613 | 2 | 1 | 2 | 2 | 0.929776486 | 0.117504135 |
| 62 | 51 | 0.822580645 | 0 | 2 | 1 | 1 | 0.943154434 | 0.117101241 |
| 62 | 52 | 0.838709677 | 1 | 2 | 2 | 1 | 0.954720867 | 0.127782815 |
| 62 | 53 | 0.85483871 | 2 | 2 | 1 | 1 | 0.964635582 | 0.138012941 |
| 62 | 54 | 0.870967742 | 0 | 1 | 2 | 2 | 0.973044871 | 0.146831819 |
| 62 | 55 | 0.887096774 | 1 | 1 | 1 | 2 | 0.980082561 | 0.157686981 |
| 62 | 56 | 0.903225806 | 2 | 1 | 2 | 2 | 0.985871019 | 0.167849362 |
| 62 | 57 | 0.919354839 | 0 | 2 | 1 | 1 | 0.990522085 | 0.174252763 |
| 62 | 58 | 0.935483871 | 1 | 2 | 2 | 1 | 0.994137957 | 0.181922066 |
| 62 | 59 | 0.951612903 | 2 | 2 | 1 | 1 | 0.996812007 | 0.198464747 |
| 62 | 60 | 0.967741935 | 0 | 1 | 2 | 2 | 0.998629535 | 0.221984253 |
| 62 | 61 | 0.983870968 | 1 | 1 | 1 | 2 | 0.999668468 | 0.24202198 |
| 64 | 33 | 0.515625 | 0 | 1 | 1 | 1 | 0.095056043 | 1.735154767 |
| 64 | 34 | 0.53125 | 1 | 1 | 2 | 1 | 0.183749518 | 1.041971056 |
| 64 | 35 | 0.546875 | 2 | 1 | 1 | 1 | 0.266036846 | 0.795326218 |
| 64 | 36 | 0.5625 | 0 | 1 | 4 | 4 | 0.342020143 | 0.657104652 |
| 64 | 37 | 0.578125 | 1 | 1 | 1 | 4 | 0.411901248 | 0.516037777 |
| 64 | 38 | 0.59375 | 2 | 1 | 2 | 4 | 0.475947393 | 0.323691168 |
| 64 | 39 | 0.609375 | 0 | 1 | 1 | 1 | 0.534465826 | 0.200100708 |
| 64 | 40 | 0.625 | 1 | 1 | 8 | 1 | 0.587785252 | 0.201330169 |
| 64 | 41 | 0.640625 | 2 | 1 | 1 | 1 | 0.636242442 | 0.193689845 |
| 64 | 42 | 0.65625 | 0 | 2 | 2 | 2 | 0.680172738 | 0.232832619 |
| 64 | 43 | 0.671875 | 1 | 2 | 1 | 2 | 0.719903474 | 0.255896461 |
| 64 | 44 | 0.6875 | 2 | 2 | 4 | 2 | 0.755749574 | 0.276438918 |
| 64 | 45 | 0.703125 | 0 | 1 | 1 | 1 | 0.788010754 | 0.279549049 |
| 64 | 46 | 0.71875 | 1 | 1 | 2 | 1 | 0.816969893 | 0.269499191 |
| 64 | 47 | 0.734375 | 2 | 1 | 1 | 1 | 0.842892271 | 0.267361096 |
| 64 | 48 | 0.75 | 0 | 1 | 16 | 16 | 0.866025404 | 0.249604232 |
| 64 | 49 | 0.765625 | 1 | 1 | 1 | 16 | 0.886599306 | 0.205477831 |
| 64 | 50 | 0.78125 | 2 | 1 | 2 | 16 | 0.904827052 | 0.157858999 |
| 64 | 51 | 0.796875 | 0 | 1 | 1 | 1 | 0.920905518 | 0.126799497 |
| 64 | 52 | 0.8125 | 1 | 1 | 4 | 1 | 0.935016243 | 0.11528497 |
| 64 | 53 | 0.828125 | 2 | 1 | 1 | 1 | 0.947326354 | 0.120223959 |
| 64 | 54 | 0.84375 | 0 | 2 | 2 | 2 | 0.957989512 | 0.13131874 |
| 64 | 55 | 0.859375 | 1 | 2 | 1 | 2 | 0.967146855 | 0.140432814 |
| 64 | 56 | 0.875 | 2 | 2 | 8 | 2 | 0.974927912 | 0.149341528 |
| 64 | 57 | 0.890625 | 0 | 1 | 1 | 1 | 0.981451493 | 0.160158007 |
| 64 | 58 | 0.90625 | 1 | 1 | 2 | 1 | 0.986826523 | 0.169308324 |
| 64 | 59 | 0.921875 | 2 | 1 | 1 | 1 | 0.991152831 | 0.175136273 |
| 64 | 60 | 0.9375 | 0 | 1 | 4 | 4 | 0.994521895 | 0.183418691 |
| 64 | 61 | 0.953125 | 1 | 1 | 1 | 4 | 0.997017526 | 0.200502722 |
| 64 | 62 | 0.96875 | 2 | 1 | 2 | 4 | 0.998716507 | 0.223457681 |
| 64 | 63 | 0.984375 | 0 | 1 | 1 | 1 | 0.999689182 | 0.242478114 |
| 66 | 36 | 0.545454545 | 0 | 2 | 6 | 6 | 0.258819045 | 0.812389602 |
| 66 | 37 | 0.560606061 | 1 | 2 | 1 | 6 | 0.333139795 | 0.672182806 |
| 66 | 38 | 0.575757576 | 2 | 2 | 2 | 6 | 0.401695425 | 0.539898186 |
| 66 | 45 | 0.681818182 | 0 | 1 | 3 | 3 | 0.743144825 | 0.269343868 |
| 66 | 46 | 0.696969697 | 1 | 2 | 2 | 3 | 0.775711291 | 0.281571223 |
| 66 | 47 | 0.712121212 | 2 | 1 | 1 | 3 | 0.805070053 | 0.273067038 |
| 66 | 54 | 0.818181818 | 0 | 2 | 6 | 6 | 0.939692621 | 0.115564239 |
| 66 | 55 | 0.833333333 | 1 | 2 | 11 | 6 | 0.951056516 | 0.123848433 |
| 66 | 56 | 0.848484848 | 2 | 2 | 2 | 6 | 0.960917322 | 0.134360589 |
| 66 | 63 | 0.954545455 | 0 | 1 | 3 | 3 | 0.997203797 | 0.202472832 |
| 66 | 64 | 0.96969697 | 1 | 1 | 2 | 3 | 0.998795456 | 0.224826063 |
| 66 | 65 | 0.984848485 | 2 | 1 | 1 | 3 | 0.999708014 | 0.242894811 |
| 68 | 35 | 0.514705882 | 2 | 2 | 1 | 1 | 0.089639309 | 1.796362048 |
| 68 | 36 | 0.529411765 | 0 | 2 | 4 | 4 | 0.173648178 | 1.085649275 |
| 68 | 37 | 0.544117647 | 1 | 2 | 1 | 4 | 0.251978061 | 0.829443747 |
| 68 | 38 | 0.558823529 | 2 | 2 | 2 | 4 | 0.324699469 | 0.686198554 |
| 68 | 39 | 0.573529412 | 0 | 2 | 1 | 1 | 0.39196661 | 0.561317781 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 68 | 40 | 0.588235294 | 1 | 2 | 4 | 1 | 0.4539905 | 0.397073845 |
| 68 | 41 | 0.602941176 | 2 | 2 | 1 | 1 | 0.511018679 | 0.224578978 |
| 68 | 42 | 0.617647059 | 0 | 1 | 2 | 2 | 0.563320058 | 0.203411399 |
| 68 | 43 | 0.632352941 | 1 | 1 | 1 | 2 | 0.611173714 | 0.191838153 |
| 68 | 44 | 0.647058824 | 2 | 1 | 4 | 2 | 0.654860734 | 0.208570119 |
| 68 | 45 | 0.661764706 | 0 | 2 | 1 | 1 | 0.69465837 | 0.243000973 |
| 68 | 46 | 0.676470588 | 1 | 2 | 2 | 1 | 0.730835964 | 0.261882278 |
| 68 | 47 | 0.691176471 | 2 | 2 | 1 | 1 | 0.763652197 | 0.279653574 |
| 68 | 48 | 0.705882353 | 0 | 2 | 4 | 4 | 0.79335334 | 0.277721125 |
| 68 | 49 | 0.720588235 | 1 | 2 | 1 | 4 | 0.820172255 | 0.268952968 |
| 68 | 50 | 0.735294118 | 2 | 2 | 2 | 4 | 0.844327926 | 0.267057827 |
| 68 | 51 | 0.75 | 0 | 1 | 17 | 17 | 0.866025404 | 0.249604232 |
| 68 | 52 | 0.764705882 | 1 | 1 | 4 | 17 | 0.885456026 | 0.208454625 |
| 68 | 53 | 0.779411765 | 2 | 1 | 1 | 17 | 0.90279783 | 0.162799321 |
| 68 | 54 | 0.794117647 | 0 | 2 | 2 | 2 | 0.918216107 | 0.13082749 |
| 68 | 55 | 0.808823529 | 1 | 1 | 1 | 2 | 0.931864029 | 0.11630625 |
| 68 | 56 | 0.823529412 | 2 | 1 | 4 | 2 | 0.94388333 | 0.117555714 |
| 68 | 57 | 0.838235294 | 0 | 2 | 1 | 1 | 0.954405002 | 0.127438441 |
| 68 | 58 | 0.852941176 | 1 | 2 | 2 | 1 | 0.963549993 | 0.136965075 |
| 68 | 59 | 0.867647059 | 2 | 2 | 1 | 1 | 0.971429893 | 0.144896962 |
| 68 | 60 | 0.882352941 | 0 | 2 | 4 | 4 | 0.978147601 | 0.154326845 |
| 68 | 61 | 0.897058824 | 1 | 2 | 1 | 4 | 0.983797952 | 0.164378365 |
| 68 | 62 | 0.911764706 | 2 | 2 | 2 | 4 | 0.988468324 | 0.171590662 |
| 68 | 63 | 0.926470588 | 0 | 2 | 1 | 1 | 0.992239207 | 0.176932212 |
| 68 | 64 | 0.941176471 | 1 | 2 | 4 | 1 | 0.995184727 | 0.186570007 |
| 68 | 65 | 0.955882353 | 2 | 2 | 1 | 1 | 0.99737315 | 0.204370043 |
| 68 | 66 | 0.970588235 | 0 | 1 | 2 | 2 | 0.998867339 | 0.226097856 |
| 68 | 67 | 0.985294118 | 1 | 1 | 1 | 2 | 0.999725185 | 0.243276429 |
| 70 | 36 | 0.514285714 | 0 | 2 | 2 | 2 | 0.087155743 | 1.824493511 |
| 70 | 37 | 0.528571429 | 1 | 2 | 1 | 2 | 0.16900082 | 1.108033737 |
| 70 | 38 | 0.542857143 | 2 | 2 | 2 | 2 | 0.245485487 | 0.846366668 |
| 70 | 39 | 0.557142857 | 0 | 1 | 1 | 1 | 0.316667994 | 0.699431555 |
| 70 | 40 | 0.571428571 | 1 | 1 | 10 | 1 | 0.382683432 | 0.580766246 |
| 70 | 41 | 0.585714286 | 2 | 1 | 1 | 1 | 0.443719838 | 0.429400647 |
| 70 | 42 | 0.6 | 0 | 2 | 14 | 14 | 0.5 | 0.249604232 |
| 70 | 43 | 0.614285714 | 1 | 2 | 1 | 14 | 0.551767741 | 0.200897735 |
| 70 | 44 | 0.628571429 | 2 | 2 | 2 | 14 | 0.599277667 | 0.196636785 |
| 70 | 45 | 0.642857143 | 0 | 2 | 5 | 5 | 0.64278761 | 0.197900559 |
| 70 | 46 | 0.657142857 | 1 | 2 | 2 | 5 | 0.682553143 | 0.234738809 |
| 70 | 47 | 0.671428571 | 2 | 2 | 1 | 5 | 0.718823684 | 0.255346265 |
| 70 | 48 | 0.685714286 | 0 | 2 | 2 | 2 | 0.751839807 | 0.274422947 |
| 70 | 49 | 0.7 | 1 | 2 | 7 | 2 | 0.781831482 | 0.281021751 |
| 70 | 50 | 0.714285714 | 2 | 2 | 10 | 2 | 0.809016994 | 0.271648756 |
| 70 | 51 | 0.728571429 | 0 | 1 | 1 | 1 | 0.833602385 | 0.268164586 |
| 70 | 52 | 0.742857143 | 1 | 1 | 2 | 1 | 0.855781272 | 0.261391152 |
| 70 | 53 | 0.757142857 | 2 | 1 | 1 | 1 | 0.875734942 | 0.231737539 |
| 70 | 54 | 0.771428571 | 0 | 2 | 2 | 2 | 0.89363264 | 0.186703081 |
| 70 | 55 | 0.785714286 | 1 | 2 | 5 | 2 | 0.909631995 | 0.146945689 |
| 70 | 56 | 0.8 | 2 | 2 | 14 | 2 | 0.923879533 | 0.122971276 |
| 70 | 57 | 0.814285714 | 0 | 1 | 1 | 1 | 0.936511241 | 0.115140911 |
| 70 | 58 | 0.828571429 | 1 | 1 | 2 | 1 | 0.947653171 | 0.120516078 |
| 70 | 59 | 0.842857143 | 2 | 1 | 1 | 1 | 0.957422038 | 0.130712438 |
| 70 | 60 | 0.857142857 | 0 | 1 | 10 | 10 | 0.965925826 | 0.139252172 |
| 70 | 61 | 0.871428571 | 1 | 1 | 1 | 10 | 0.973264374 | 0.147109526 |
| 70 | 62 | 0.885714286 | 2 | 1 | 2 | 10 | 0.979529941 | 0.156706624 |
| 70 | 63 | 0.9 | 0 | 1 | 7 | 7 | 0.984807753 | 0.166114912 |
| 70 | 64 | 0.914285714 | 1 | 1 | 2 | 7 | 0.98917651 | 0.17250882 |
| 70 | 65 | 0.928571429 | 2 | 1 | 5 | 7 | 0.992708874 | 0.177885384 |
| 70 | 66 | 0.942857143 | 0 | 2 | 2 | 2 | 0.995471923 | 0.188196976 |
| 70 | 67 | 0.957142857 | 1 | 2 | 1 | 2 | 0.997527572 | 0.206191446 |
| 70 | 68 | 0.971428571 | 2 | 2 | 2 | 2 | 0.998932975 | 0.227280904 |
| 70 | 69 | 0.985714286 | 0 | 1 | 1 | 1 | 0.999740885 | 0.243626749 |
| 72 | 54 | 0.75 | 0 | 1 | 18 | 18 | 0.866025404 | 0.249604232 |
| 72 | 55 | 0.763888889 | 1 | 1 | 1 | 18 | 0.884432931 | 0.211087162 |
| 72 | 56 | 0.777777778 | 2 | 1 | 8 | 18 | 0.900968868 | 0.167391628 |
| 74 | 38 | 0.513513514 | 2 | 1 | 2 | 2 | 0.082579345 | 1.876216111 |
| 74 | 39 | 0.527027027 | 0 | 2 | 1 | 1 | 0.160411281 | 1.153984996 |
| 74 | 40 | 0.540540541 | 1 | 2 | 2 | 1 | 0.233445364 | 0.879430943 |
| 74 | 41 | 0.554054054 | 2 | 2 | 1 | 1 | 0.301720599 | 0.724565987 |
| 74 | 42 | 0.567567568 | 0 | 1 | 2 | 2 | 0.365341024 | 0.614956469 |
| 74 | 43 | 0.581081081 | 1 | 1 | 1 | 2 | 0.424456699 | 0.484276727 |
| 74 | 44 | 0.594594595 | 2 | 1 | 2 | 2 | 0.479248987 | 0.312660906 |
| 74 | 45 | 0.608108108 | 0 | 2 | 1 | 1 | 0.529919264 | 0.20190773 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 74 | 46 | 0.621621622 | 1 | 2 | 2 | 1 | 0.576680322 | 0.203899878 |
| 74 | 47 | 0.635135135 | 2 | 2 | 1 | 1 | 0.619749889 | 0.190036726 |
| 74 | 48 | 0.648648649 | 0 | 1 | 2 | 2 | 0.659345815 | 0.213053378 |
| 74 | 49 | 0.662162162 | 1 | 1 | 1 | 2 | 0.695682551 | 0.243600704 |
| 74 | 50 | 0.675675676 | 2 | 1 | 2 | 2 | 0.728968627 | 0.260803898 |
| 74 | 51 | 0.689189189 | 0 | 2 | 1 | 1 | 0.759404917 | 0.278088789 |
| 74 | 52 | 0.702702703 | 1 | 1 | 2 | 1 | 0.787183481 | 0.279791884 |
| 74 | 53 | 0.716216216 | 2 | 2 | 1 | 1 | 0.812486878 | 0.27057824 |
| 74 | 54 | 0.72972973 | 0 | 1 | 2 | 2 | 0.835487811 | 0.268104949 |
| 74 | 55 | 0.743243243 | 1 | 1 | 1 | 2 | 0.85634903 | 0.260922609 |
| 74 | 56 | 0.756756757 | 2 | 1 | 2 | 2 | 0.875223422 | 0.232830934 |
| 74 | 57 | 0.77027027 | 0 | 2 | 1 | 1 | 0.892254239 | 0.190408994 |
| 74 | 58 | 0.783783784 | 1 | 2 | 2 | 1 | 0.90757542 | 0.151470116 |
| 74 | 59 | 0.797297297 | 2 | 2 | 1 | 1 | 0.921311978 | 0.126236648 |
| 74 | 60 | 0.810810811 | 0 | 1 | 2 | 2 | 0.933580426 | 0.115630436 |
| 74 | 61 | 0.824324324 | 1 | 1 | 1 | 2 | 0.944489229 | 0.117965125 |
| 74 | 62 | 0.837837838 | 2 | 1 | 2 | 2 | 0.954139256 | 0.127148922 |
| 74 | 63 | 0.851351351 | 0 | 2 | 1 | 1 | 0.962624247 | 0.136061597 |
| 74 | 64 | 0.864864865 | 1 | 2 | 2 | 1 | 0.970031253 | 0.143354243 |
| 74 | 65 | 0.878378378 | 2 | 2 | 1 | 1 | 0.976441079 | 0.151576784 |
| 74 | 66 | 0.891891892 | 0 | 1 | 2 | 2 | 0.981928697 | 0.161025252 |
| 74 | 67 | 0.905405405 | 1 | 1 | 1 | 2 | 0.986563651 | 0.168916895 |
| 74 | 68 | 0.918918919 | 2 | 1 | 2 | 2 | 0.990410431 | 0.174103298 |
| 74 | 69 | 0.932432432 | 0 | 2 | 1 | 1 | 0.993528833 | 0.179946736 |
| 74 | 70 | 0.945945946 | 1 | 2 | 2 | 1 | 0.995974294 | 0.191488821 |
| 74 | 71 | 0.959459459 | 2 | 2 | 1 | 1 | 0.997798209 | 0.209603158 |
| 74 | 72 | 0.972972973 | 0 | 1 | 2 | 2 | 0.999048222 | 0.229409133 |
| 74 | 73 | 0.986486486 | 1 | 1 | 1 | 2 | 0.999768502 | 0.244246249 |
| 76 | 39 | 0.513157895 | 0 | 1 | 1 | 1 | 0.080466569 | 1.899970828 |
| 76 | 40 | 0.526315789 | 1 | 1 | 4 | 1 | 0.156434465 | 1.177502837 |
| 76 | 41 | 0.539473684 | 2 | 1 | 1 | 1 | 0.227853509 | 0.895453064 |
| 76 | 42 | 0.552631579 | 0 | 2 | 2 | 2 | 0.294755174 | 0.736875711 |
| 76 | 43 | 0.565789474 | 1 | 2 | 1 | 2 | 0.35723089 | 0.630084593 |
| 76 | 44 | 0.578947368 | 2 | 2 | 4 | 2 | 0.415415013 | 0.507438062 |
| 76 | 45 | 0.592105263 | 0 | 1 | 1 | 1 | 0.469471563 | 0.345544324 |
| 76 | 46 | 0.605263158 | 1 | 1 | 2 | 1 | 0.51958395 | 0.21104203 |
| 76 | 47 | 0.618421053 | 2 | 1 | 1 | 1 | 0.565947094 | 0.20379013 |
| 76 | 48 | 0.631578947 | 0 | 1 | 4 | 4 | 0.608761429 | 0.192667 |
| 76 | 49 | 0.644736842 | 1 | 1 | 1 | 4 | 0.648228395 | 0.202348275 |
| 76 | 50 | 0.657894737 | 2 | 1 | 2 | 4 | 0.684547106 | 0.236262364 |
| 76 | 51 | 0.671052632 | 0 | 1 | 1 | 1 | 0.717911923 | 0.254886386 |
| 76 | 52 | 0.684210526 | 1 | 1 | 4 | 1 | 0.748510748 | 0.272550678 |
| 76 | 53 | 0.697368421 | 2 | 1 | 1 | 1 | 0.776523863 | 0.281556705 |
| 76 | 54 | 0.710526316 | 0 | 2 | 2 | 2 | 0.802123193 | 0.274221271 |
| 76 | 55 | 0.723684211 | 1 | 2 | 1 | 2 | 0.825471897 | 0.268426814 |
| 76 | 56 | 0.736842105 | 2 | 2 | 4 | 2 | 0.846724199 | 0.26638671 |
| 76 | 57 | 0.75 | 0 | 1 | 19 | 19 | 0.866025404 | 0.249604232 |
| 76 | 58 | 0.763157895 | 1 | 1 | 2 | 19 | 0.883512044 | 0.213427941 |
| 76 | 59 | 0.776315789 | 2 | 1 | 1 | 19 | 0.89931213 | 0.171648196 |
| 76 | 60 | 0.789473684 | 0 | 1 | 4 | 4 | 0.913545458 | 0.139013604 |
| 76 | 61 | 0.802631579 | 1 | 1 | 1 | 4 | 0.926323968 | 0.12034753 |
| 76 | 62 | 0.815789474 | 2 | 1 | 2 | 4 | 0.937752132 | 0.115188724 |
| 76 | 63 | 0.828947368 | 0 | 1 | 1 | 1 | 0.947927346 | 0.120765564 |
| 76 | 64 | 0.842105263 | 1 | 1 | 4 | 1 | 0.956940336 | 0.130194434 |
| 76 | 65 | 0.855263158 | 2 | 1 | 1 | 1 | 0.964875553 | 0.138243551 |
| 76 | 66 | 0.868421053 | 0 | 2 | 2 | 2 | 0.971811568 | 0.145338011 |
| 76 | 67 | 0.881578947 | 1 | 2 | 1 | 2 | 0.977821444 | 0.153783751 |
| 76 | 68 | 0.894736842 | 2 | 2 | 4 | 2 | 0.9829731 | 0.162913532 |
| 76 | 69 | 0.907894737 | 0 | 1 | 1 | 1 | 0.987329656 | 0.170036452 |
| 76 | 70 | 0.921052632 | 1 | 1 | 2 | 1 | 0.990949762 | 0.174843151 |
| 76 | 71 | 0.934210526 | 2 | 1 | 1 | 1 | 0.993887904 | 0.181056983 |
| 76 | 72 | 0.947368421 | 0 | 1 | 4 | 4 | 0.996194698 | 0.193131583 |
| 76 | 73 | 0.960526316 | 1 | 1 | 1 | 4 | 0.997917161 | 0.211194518 |
| 76 | 74 | 0.973684211 | 2 | 1 | 2 | 4 | 0.999098966 | 0.230367049 |
| 76 | 75 | 0.986842105 | 0 | 1 | 1 | 1 | 0.999780683 | 0.244520823 |
| 78 | 45 | 0.576923077 | 0 | 2 | 3 | 3 | 0.406736643 | 0.528308632 |
| 78 | 46 | 0.58974359 | 1 | 2 | 2 | 3 | 0.460065038 | 0.377140206 |
| 78 | 47 | 0.602564103 | 2 | 2 | 1 | 3 | 0.509616643 | 0.227311728 |
| 78 | 54 | 0.692307692 | 0 | 1 | 6 | 6 | 0.766044443 | 0.28034481 |
| 78 | 55 | 0.705128205 | 1 | 1 | 1 | 6 | 0.791902246 | 0.278255713 |
| 78 | 56 | 0.717948718 | 2 | 1 | 2 | 6 | 0.815560869 | 0.269799052 |
| 78 | 63 | 0.807692308 | 0 | 2 | 3 | 3 | 0.930873749 | 0.116823889 |
| 78 | 64 | 0.820512821 | 1 | 2 | 2 | 3 | 0.941544065 | 0.116253721 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 78 | 65 | 0.833333333 | 2 | 2 | 13 | 3 | 0.951056516 | 0.123848433 |
| 78 | 72 | 0.923076923 | 0 | 1 | 6 | 6 | 0.991444861 | 0.175576734 |
| 78 | 73 | 0.935897436 | 1 | 1 | 1 | 6 | 0.994217907 | 0.182216166 |
| 78 | 74 | 0.948717949 | 2 | 1 | 2 | 6 | 0.996397489 | 0.194759969 |
| 80 | 41 | 0.5125 | 2 | 2 | 1 | 1 | 0.076549253 | 1.943663687 |
| 80 | 42 | 0.525 | 0 | 1 | 2 | 2 | 0.149042266 | 1.225362448 |
| 80 | 43 | 0.5375 | 1 | 1 | 1 | 2 | 0.217430176 | 0.926408098 |
| 80 | 44 | 0.55 | 2 | 1 | 4 | 2 | 0.281732557 | 0.761620727 |
| 80 | 45 | 0.5625 | 0 | 1 | 5 | 5 | 0.342020143 | 0.657104652 |
| 80 | 46 | 0.575 | 1 | 1 | 2 | 5 | 0.39840109 | 0.547282825 |
| 80 | 47 | 0.5875 | 2 | 1 | 1 | 5 | 0.451010119 | 0.406650882 |
| 80 | 48 | 0.6 | 0 | 2 | 16 | 16 | 0.5 | 0.249604232 |
| 80 | 49 | 0.6125 | 1 | 2 | 1 | 16 | 0.545534901 | 0.199692718 |
| 80 | 50 | 0.625 | 2 | 2 | 10 | 16 | 0.587785252 | 0.201330169 |
| 80 | 51 | 0.6375 | 0 | 2 | 1 | 1 | 0.626923806 | 0.190358716 |
| 80 | 52 | 0.65 | 1 | 2 | 4 | 1 | 0.663122658 | 0.216878644 |
| 80 | 53 | 0.6625 | 2 | 2 | 1 | 1 | 0.696551029 | 0.244099132 |
| 80 | 54 | 0.675 | 0 | 1 | 2 | 2 | 0.727373642 | 0.259900638 |
| 80 | 55 | 0.6875 | 1 | 1 | 5 | 2 | 0.755749574 | 0.276438918 |
| 80 | 56 | 0.7 | 2 | 1 | 8 | 2 | 0.781831482 | 0.281021751 |
| 80 | 57 | 0.7125 | 0 | 2 | 1 | 1 | 0.805765106 | 0.272804756 |
| 80 | 58 | 0.725 | 1 | 2 | 2 | 1 | 0.827688998 | 0.268317086 |
| 80 | 59 | 0.7375 | 2 | 2 | 1 | 1 | 0.847734428 | 0.26603413 |
| 80 | 60 | 0.75 | 0 | 1 | 20 | 20 | 0.866025404 | 0.249604232 |
| 80 | 61 | 0.7625 | 1 | 1 | 1 | 20 | 0.882678798 | 0.21552 |
| 80 | 62 | 0.775 | 2 | 1 | 2 | 20 | 0.89780454 | 0.175587301 |
| 80 | 63 | 0.7875 | 0 | 2 | 1 | 1 | 0.911505852 | 0.143032176 |
| 80 | 64 | 0.8 | 1 | 2 | 16 | 1 | 0.923879533 | 0.122971276 |
| 80 | 65 | 0.8125 | 2 | 2 | 5 | 1 | 0.935016243 | 0.11528497 |
| 80 | 66 | 0.825 | 0 | 1 | 2 | 2 | 0.945000819 | 0.118332187 |
| 80 | 67 | 0.8375 | 1 | 1 | 1 | 2 | 0.953912581 | 0.12690222 |
| 80 | 68 | 0.85 | 2 | 1 | 4 | 2 | 0.961825643 | 0.135272043 |
| 80 | 69 | 0.8625 | 0 | 2 | 1 | 1 | 0.968809218 | 0.142083537 |
| 80 | 70 | 0.875 | 1 | 2 | 10 | 1 | 0.974927912 | 0.149341528 |
| 80 | 71 | 0.8875 | 2 | 2 | 1 | 1 | 0.980242011 | 0.157972191 |
| 80 | 72 | 0.9 | 0 | 1 | 8 | 8 | 0.984807753 | 0.166114912 |
| 80 | 73 | 0.9125 | 1 | 1 | 1 | 8 | 0.98867759 | 0.171864695 |
| 80 | 74 | 0.925 | 2 | 1 | 2 | 8 | 0.991900435 | 0.176320946 |
| 80 | 75 | 0.9375 | 0 | 1 | 5 | 5 | 0.994521895 | 0.183418691 |
| 80 | 76 | 0.95 | 1 | 1 | 4 | 5 | 0.996584493 | 0.196366609 |
| 80 | 77 | 0.9625 | 2 | 1 | 1 | 5 | 0.998127873 | 0.214156632 |
| 80 | 78 | 0.975 | 0 | 1 | 2 | 2 | 0.999188998 | 0.232098334 |
| 80 | 79 | 0.9875 | 1 | 1 | 1 | 2 | 0.99980233 | 0.245010739 |
| 82 | 43 | 0.524390244 | 1 | 2 | 1 | 2 | 0.145601168 | 1.249568627 |
| 82 | 44 | 0.536585366 | 2 | 2 | 2 | 2 | 0.21256529 | 0.941388503 |
| 82 | 45 | 0.548780488 | 0 | 1 | 1 | 1 | 0.275637356 | 0.774164557 |
| 82 | 46 | 0.56097561 | 1 | 1 | 2 | 1 | 0.334879612 | 0.66926118 |
| 82 | 47 | 0.573170732 | 2 | 1 | 1 | 1 | 0.390389275 | 0.564685642 |
| 82 | 48 | 0.585365854 | 0 | 2 | 2 | 2 | 0.44228869 | 0.433744453 |
| 82 | 49 | 0.597560976 | 1 | 2 | 1 | 2 | 0.490717552 | 0.275959129 |
| 82 | 50 | 0.609756098 | 2 | 2 | 2 | 2 | 0.535826795 | 0.199779163 |
| 82 | 51 | 0.62195122 | 0 | 1 | 1 | 1 | 0.577773831 | 0.203765742 |
| 82 | 52 | 0.634146341 | 1 | 1 | 2 | 1 | 0.616718873 | 0.190434964 |
| 82 | 53 | 0.646341463 | 2 | 1 | 1 | 1 | 0.652822118 | 0.206589293 |
| 82 | 54 | 0.658536585 | 0 | 2 | 2 | 2 | 0.686241638 | 0.23750469 |
| 82 | 55 | 0.670731707 | 1 | 2 | 1 | 2 | 0.717131805 | 0.254496033 |
| 82 | 56 | 0.682926829 | 2 | 2 | 2 | 2 | 0.745642165 | 0.270857005 |
| 82 | 57 | 0.695121951 | 0 | 1 | 1 | 1 | 0.771916651 | 0.281398704 |
| 82 | 58 | 0.707317073 | 1 | 1 | 2 | 1 | 0.796093066 | 0.276658271 |
| 82 | 59 | 0.719512195 | 2 | 1 | 1 | 1 | 0.818302776 | 0.269249204 |
| 82 | 60 | 0.731707317 | 0 | 2 | 2 | 2 | 0.838670568 | 0.267916796 |
| 82 | 61 | 0.743902439 | 1 | 2 | 1 | 2 | 0.857314628 | 0.260078518 |
| 82 | 62 | 0.756097561 | 2 | 2 | 2 | 2 | 0.874346616 | 0.23466859 |
| 82 | 63 | 0.768292683 | 0 | 1 | 1 | 1 | 0.889271809 | 0.196804182 |
| 82 | 64 | 0.780487805 | 1 | 1 | 2 | 1 | 0.903989293 | 0.159877301 |
| 82 | 65 | 0.792682927 | 2 | 1 | 1 | 1 | 0.916792195 | 0.133167411 |
| 82 | 66 | 0.804878049 | 0 | 2 | 2 | 2 | 0.928367933 | 0.118537791 |
| 82 | 67 | 0.817073171 | 1 | 2 | 1 | 2 | 0.938798482 | 0.115346116 |
| 82 | 68 | 0.829268293 | 2 | 2 | 2 | 2 | 0.948160648 | 0.120980911 |
| 82 | 69 | 0.841463415 | 0 | 1 | 1 | 1 | 0.956526344 | 0.129747158 |
| 82 | 70 | 0.853658537 | 1 | 1 | 2 | 1 | 0.963962861 | 0.137364748 |
| 82 | 71 | 0.865853659 | 2 | 1 | 1 | 1 | 0.970533135 | 0.143895554 |
| 82 | 72 | 0.87804878 | 0 | 2 | 2 | 2 | 0.976296007 | 0.151353947 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 82 | 73 | 0.890243902 | 1 | 2 | 1 | 2 | 0.98130647 | 0.159894583 |
| 82 | 74 | 0.902439024 | 2 | 2 | 2 | 2 | 0.98561591 | 0.16744332 |
| 82 | 75 | 0.914634146 | 0 | 1 | 1 | 1 | 0.989272333 | 0.17263157 |
| 82 | 76 | 0.926829268 | 1 | 1 | 2 | 1 | 0.99232058 | 0.17708784 |
| 82 | 77 | 0.93902439 | 2 | 1 | 1 | 1 | 0.994802533 | 0.18465792 |
| 82 | 78 | 0.951219512 | 0 | 2 | 2 | 2 | 0.996757308 | 0.197945486 |
| 82 | 79 | 0.963414634 | 1 | 2 | 1 | 2 | 0.998221437 | 0.215532176 |
| 82 | 80 | 0.975609756 | 2 | 2 | 2 | 2 | 0.999229036 | 0.232881404 |
| 82 | 81 | 0.987804878 | 0 | 1 | 1 | 1 | 0.99981197 | 0.245229761 |
| 84 | 45 | 0.535714286 | 0 | 1 | 3 | 3 | 0.207911691 | 0.956097664 |
| 84 | 46 | 0.547619048 | 1 | 1 | 2 | 3 | 0.269796771 | 0.786829429 |
| 84 | 47 | 0.55952381 | 2 | 1 | 1 | 3 | 0.328024858 | 0.680701691 |
| 84 | 54 | 0.642857143 | 0 | 2 | 6 | 6 | 0.64278761 | 0.197900559 |
| 84 | 55 | 0.654761905 | 1 | 2 | 1 | 6 | 0.6761749 | 0.229423477 |
| 84 | 56 | 0.666666667 | 2 | 2 | 28 | 6 | 0.707106781 | 0.249604232 |
| 84 | 63 | 0.75 | 0 | 1 | 21 | 21 | 0.866025404 | 0.249604232 |
| 84 | 64 | 0.761904762 | 1 | 1 | 4 | 21 | 0.881921264 | 0.21739879 |
| 84 | 65 | 0.773809524 | 2 | 1 | 1 | 21 | 0.896426937 | 0.179230193 |
| 84 | 72 | 0.857142857 | 0 | 1 | 12 | 12 | 0.965925826 | 0.139252172 |
| 84 | 73 | 0.869047619 | 1 | 1 | 1 | 12 | 0.972118197 | 0.145699314 |
| 84 | 74 | 0.880952381 | 2 | 1 | 2 | 12 | 0.977555239 | 0.15334635 |
| 84 | 81 | 0.964285714 | 0 | 1 | 3 | 3 | 0.998308158 | 0.216841025 |
| 84 | 82 | 0.976190476 | 1 | 1 | 2 | 3 | 0.999266181 | 0.233615185 |
| 84 | 83 | 0.988095238 | 2 | 1 | 1 | 3 | 0.999820923 | 0.245433599 |
| 86 | 44 | 0.511627907 | 2 | 1 | 2 | 2 | 0.071339183 | 2.000762199 |
| 86 | 45 | 0.523255814 | 0 | 2 | 1 | 1 | 0.139173101 | 1.298169393 |
| 86 | 46 | 0.534883721 | 1 | 2 | 2 | 1 | 0.203456013 | 0.970593383 |
| 86 | 47 | 0.546511628 | 2 | 2 | 1 | 1 | 0.264195402 | 0.799586083 |
| 86 | 48 | 0.558139535 | 0 | 1 | 2 | 2 | 0.321439465 | 0.691570367 |
| 86 | 49 | 0.569767442 | 1 | 1 | 1 | 2 | 0.375267005 | 0.595707344 |
| 86 | 50 | 0.581395349 | 2 | 1 | 2 | 2 | 0.425779292 | 0.480755868 |
| 86 | 51 | 0.593023256 | 0 | 2 | 1 | 1 | 0.473093557 | 0.333302298 |
| 86 | 52 | 0.604651163 | 1 | 2 | 2 | 1 | 0.517337814 | 0.214058075 |
| 86 | 53 | 0.61627907 | 2 | 2 | 1 | 1 | 0.558646766 | 0.202497505 |
| 86 | 54 | 0.627906977 | 0 | 1 | 2 | 2 | 0.597158592 | 0.197575515 |
| 86 | 55 | 0.639534884 | 1 | 1 | 1 | 2 | 0.633012454 | 0.192160848 |
| 86 | 56 | 0.651162791 | 2 | 1 | 2 | 2 | 0.666346578 | 0.220117697 |
| 86 | 57 | 0.662790698 | 0 | 2 | 1 | 1 | 0.697296801 | 0.244520085 |
| 86 | 58 | 0.674418605 | 1 | 2 | 2 | 1 | 0.725995492 | 0.259133964 |
| 86 | 59 | 0.686046512 | 2 | 2 | 1 | 1 | 0.75257077 | 0.274816669 |
| 86 | 60 | 0.697674419 | 0 | 1 | 2 | 2 | 0.777145961 | 0.281532149 |
| 86 | 61 | 0.709302326 | 1 | 1 | 1 | 2 | 0.799839245 | 0.275144622 |
| 86 | 62 | 0.720930233 | 2 | 1 | 2 | 2 | 0.820763441 | 0.268872526 |
| 86 | 63 | 0.73255814 | 0 | 2 | 1 | 1 | 0.840025923 | 0.267784926 |
| 86 | 64 | 0.744186047 | 1 | 2 | 2 | 1 | 0.85772861 | 0.259698122 |
| 86 | 65 | 0.755813953 | 2 | 2 | 1 | 1 | 0.873968033 | 0.235447483 |
| 86 | 66 | 0.76744186 | 0 | 1 | 2 | 2 | 0.888835449 | 0.199570312 |
| 86 | 67 | 0.779069767 | 1 | 1 | 1 | 2 | 0.902416995 | 0.163745349 |
| 86 | 68 | 0.790697674 | 2 | 1 | 2 | 2 | 0.914793868 | 0.136683612 |
| 86 | 69 | 0.802325581 | 0 | 2 | 1 | 1 | 0.926042521 | 0.120624611 |
| 86 | 70 | 0.813953488 | 1 | 2 | 2 | 1 | 0.936234871 | 0.115150918 |
| 86 | 71 | 0.825581395 | 2 | 2 | 1 | 1 | 0.945438516 | 0.11866113 |
| 86 | 72 | 0.837209302 | 0 | 1 | 2 | 2 | 0.953716951 | 0.126689556 |
| 86 | 73 | 0.848837209 | 1 | 1 | 1 | 2 | 0.961129784 | 0.134575136 |
| 86 | 74 | 0.860465116 | 2 | 1 | 2 | 2 | 0.967732947 | 0.141007177 |
| 86 | 75 | 0.872093023 | 0 | 2 | 1 | 1 | 0.973578903 | 0.147514068 |
| 86 | 76 | 0.88372093 | 1 | 2 | 2 | 1 | 0.978716845 | 0.155292516 |
| 86 | 77 | 0.895348837 | 2 | 2 | 1 | 1 | 0.983192891 | 0.163306938 |
| 86 | 78 | 0.906976744 | 0 | 1 | 2 | 2 | 0.987050263 | 0.169635505 |
| 86 | 79 | 0.918604651 | 1 | 1 | 1 | 2 | 0.990329466 | 0.173995857 |
| 86 | 80 | 0.930232558 | 2 | 1 | 2 | 2 | 0.993068457 | 0.1787182 |
| 86 | 81 | 0.941860465 | 0 | 2 | 1 | 1 | 0.995302796 | 0.187217997 |
| 86 | 82 | 0.953488372 | 1 | 2 | 2 | 1 | 0.997065801 | 0.201001849 |
| 86 | 83 | 0.965116279 | 2 | 2 | 1 | 1 | 0.998388689 | 0.218086093 |
| 86 | 84 | 0.976744186 | 0 | 1 | 2 | 2 | 0.999300705 | 0.234303517 |
| 86 | 85 | 0.988372093 | 1 | 1 | 1 | 2 | 0.99982925 | 0.245623614 |
| 88 | 45 | 0.511363636 | 0 | 1 | 1 | 1 | 0.069756474 | 2.01781261 |
| 88 | 46 | 0.522727273 | 1 | 1 | 2 | 1 | 0.136166649 | 1.322421127 |
| 88 | 47 | 0.534090909 | 2 | 1 | 1 | 1 | 0.199185985 | 0.984937493 |
| 88 | 48 | 0.545454545 | 0 | 2 | 8 | 8 | 0.258819045 | 0.812389602 |
| 88 | 49 | 0.556818182 | 1 | 2 | 1 | 8 | 0.315108218 | 0.702007881 |
| 88 | 50 | 0.568181818 | 2 | 2 | 2 | 8 | 0.368124553 | 0.609641573 |
| 88 | 51 | 0.579545455 | 0 | 1 | 1 | 1 | 0.417960345 | 0.501072882 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 88 | 52 | 0.590909091 | 1 | 1 | 4 | 1 | 0.464723172 | 0.361566081 |
| 88 | 53 | 0.602272727 | 2 | 1 | 1 | 1 | 0.508531119 | 0.229523402 |
| 88 | 54 | 0.613636364 | 0 | 2 | 2 | 2 | 0.549508978 | 0.200401777 |
| 88 | 55 | 0.625 | 1 | 2 | 11 | 2 | 0.587785252 | 0.201330169 |
| 88 | 56 | 0.636363636 | 2 | 2 | 8 | 2 | 0.623489802 | 0.189969977 |
| 88 | 57 | 0.647727273 | 0 | 1 | 1 | 1 | 0.656752024 | 0.210444788 |
| 88 | 58 | 0.659090909 | 1 | 1 | 2 | 1 | 0.687699459 | 0.238535408 |
| 88 | 59 | 0.670454545 | 2 | 1 | 1 | 1 | 0.71645674 | 0.254160372 |
| 88 | 60 | 0.681818182 | 0 | 1 | 4 | 4 | 0.743144825 | 0.269343888 |
| 88 | 61 | 0.693181818 | 1 | 1 | 1 | 4 | 0.767880446 | 0.280774906 |
| 88 | 62 | 0.704545455 | 2 | 1 | 2 | 4 | 0.790775737 | 0.278653118 |
| 88 | 63 | 0.715909091 | 0 | 1 | 1 | 1 | 0.811938006 | 0.270734747 |
| 88 | 64 | 0.727272727 | 1 | 1 | 8 | 1 | 0.831469612 | 0.268212778 |
| 88 | 65 | 0.738636364 | 2 | 1 | 1 | 1 | 0.849467935 | 0.265321755 |
| 88 | 66 | 0.75 | 0 | 1 | 22 | 22 | 0.866025404 | 0.249604232 |
| 88 | 67 | 0.761363636 | 1 | 1 | 1 | 22 | 0.881229582 | 0.219093677 |
| 88 | 68 | 0.772727273 | 2 | 1 | 4 | 22 | 0.895163291 | 0.182599153 |
| 88 | 69 | 0.784090909 | 0 | 1 | 1 | 1 | 0.907904755 | 0.150730148 |
| 88 | 70 | 0.795454545 | 1 | 1 | 2 | 1 | 0.919527773 | 0.12879784 |
| 88 | 71 | 0.806818182 | 2 | 1 | 1 | 1 | 0.930101896 | 0.117290838 |
| 88 | 72 | 0.818181818 | 0 | 2 | 8 | 8 | 0.939692621 | 0.115564239 |
| 88 | 73 | 0.829545455 | 1 | 2 | 1 | 8 | 0.94836158 | 0.121168554 |
| 88 | 74 | 0.840909091 | 2 | 2 | 2 | 8 | 0.956166735 | 0.129357338 |
| 88 | 75 | 0.852272727 | 0 | 1 | 1 | 1 | 0.963162567 | 0.13658833 |
| 88 | 76 | 0.863636364 | 1 | 1 | 4 | 1 | 0.969400266 | 0.142690529 |
| 88 | 77 | 0.875 | 2 | 1 | 11 | 1 | 0.974927912 | 0.149341528 |
| 88 | 78 | 0.886363636 | 0 | 2 | 2 | 2 | 0.979790652 | 0.157167442 |
| 88 | 79 | 0.897727273 | 1 | 2 | 1 | 2 | 0.984030868 | 0.164785314 |
| 88 | 80 | 0.909090909 | 2 | 2 | 8 | 2 | 0.987688341 | 0.170539182 |
| 88 | 81 | 0.920454545 | 0 | 1 | 1 | 1 | 0.990800403 | 0.174633277 |
| 88 | 82 | 0.931818182 | 1 | 1 | 2 | 1 | 0.99340209 | 0.179588252 |
| 88 | 83 | 0.943181818 | 2 | 1 | 1 | 1 | 0.995526273 | 0.188524754 |
| 88 | 84 | 0.954545455 | 0 | 1 | 4 | 4 | 0.997203797 | 0.202472832 |
| 88 | 85 | 0.965909091 | 1 | 1 | 1 | 4 | 0.998463604 | 0.219270346 |
| 88 | 86 | 0.977272727 | 2 | 1 | 2 | 4 | 0.999332848 | 0.234949902 |
| 88 | 87 | 0.988636364 | 0 | 1 | 1 | 1 | 0.999837011 | 0.24580102 |
| 90 | 54 | 0.6 | 0 | 2 | 18 | 18 | 0.5 | 0.249604232 |
| 90 | 55 | 0.611111111 | 1 | 2 | 5 | 18 | 0.540640817 | 0.199318288 |
| 90 | 56 | 0.622222222 | 2 | 2 | 2 | 18 | 0.578671296 | 0.203635138 |
| 90 | 81 | 0.9 | 0 | 1 | 9 | 9 | 0.984807753 | 0.166114912 |
| 90 | 82 | 0.911111111 | 1 | 1 | 2 | 9 | 0.988280424 | 0.171342017 |
| 90 | 83 | 0.922222222 | 2 | 1 | 1 | 9 | 0.991237775 | 0.175261906 |
| 92 | 47 | 0.510869565 | 2 | 2 | 1 | 1 | 0.066792634 | 2.049297821 |
| 92 | 48 | 0.52173913 | 0 | 2 | 4 | 4 | 0.130526192 | 1.37050075 |
| 92 | 49 | 0.532608696 | 1 | 2 | 1 | 4 | 0.191158629 | 1.013414647 |
| 92 | 50 | 0.543478261 | 2 | 2 | 2 | 4 | 0.248689887 | 0.8379287 |
| 92 | 51 | 0.554347826 | 0 | 2 | 1 | 1 | 0.303152674 | 0.722095687 |
| 92 | 52 | 0.565217391 | 1 | 2 | 4 | 1 | 0.354604887 | 0.634871592 |
| 92 | 53 | 0.576086957 | 2 | 2 | 1 | 1 | 0.403123429 | 0.536651926 |
| 92 | 54 | 0.586956522 | 0 | 1 | 2 | 2 | 0.44879918 | 0.413656044 |
| 92 | 55 | 0.597826087 | 1 | 1 | 1 | 2 | 0.491732925 | 0.272894467 |
| 92 | 56 | 0.608695652 | 2 | 1 | 4 | 2 | 0.532032077 | 0.200919998 |
| 92 | 57 | 0.619565217 | 0 | 2 | 1 | 1 | 0.569808058 | 0.204115875 |
| 92 | 58 | 0.630434783 | 1 | 2 | 2 | 1 | 0.605174215 | 0.194073445 |
| 92 | 59 | 0.641304348 | 2 | 2 | 1 | 1 | 0.638244184 | 0.1948268 |
| 92 | 60 | 0.652173913 | 0 | 2 | 4 | 4 | 0.669130606 | 0.222860679 |
| 92 | 61 | 0.663043478 | 1 | 2 | 1 | 4 | 0.697944155 | 0.244880448 |
| 92 | 62 | 0.673913043 | 2 | 2 | 2 | 4 | 0.724792787 | 0.258475468 |
| 92 | 63 | 0.684782609 | 0 | 2 | 1 | 1 | 0.749781203 | 0.273279086 |
| 92 | 64 | 0.695652174 | 1 | 2 | 4 | 1 | 0.773010453 | 0.281489772 |
| 92 | 65 | 0.706521739 | 2 | 2 | 1 | 1 | 0.79457768 | 0.277253465 |
| 92 | 66 | 0.717391304 | 0 | 1 | 2 | 2 | 0.814575952 | 0.270030285 |
| 92 | 67 | 0.72826087 | 1 | 1 | 1 | 2 | 0.833094188 | 0.268177093 |
| 92 | 68 | 0.739130435 | 2 | 1 | 4 | 2 | 0.850217136 | 0.264969061 |
| 92 | 69 | 0.75 | 0 | 1 | 23 | 23 | 0.866025404 | 0.249604232 |
| 92 | 70 | 0.760869565 | 1 | 1 | 2 | 23 | 0.880595532 | 0.220629124 |
| 92 | 71 | 0.77173913 | 2 | 1 | 1 | 23 | 0.894000088 | 0.185716292 |
| 92 | 72 | 0.782608696 | 0 | 2 | 4 | 4 | 0.906307787 | 0.154370684 |
| 92 | 73 | 0.793478261 | 1 | 2 | 1 | 4 | 0.917583626 | 0.131849522 |
| 92 | 74 | 0.804347826 | 2 | 2 | 2 | 4 | 0.927889027 | 0.118929404 |
| 92 | 75 | 0.815217391 | 0 | 2 | 1 | 1 | 0.937281989 | 0.115152795 |
| 92 | 76 | 0.826086957 | 1 | 2 | 4 | 1 | 0.945817242 | 0.118956414 |
| 92 | 77 | 0.836956522 | 2 | 2 | 1 | 1 | 0.953546398 | 0.126504385 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 92 | 78 | 0.847826087 | 0 | 1 | 2 | 2 | 0.960518112 | 0.133955165 |
| 92 | 79 | 0.858695652 | 1 | 1 | 1 | 2 | 0.966778225 | 0.140074588 |
| 92 | 80 | 0.869565217 | 2 | 1 | 4 | 2 | 0.97236992 | 0.146000776 |
| 92 | 81 | 0.880434783 | 0 | 2 | 1 | 1 | 0.977333858 | 0.152986761 |
| 92 | 82 | 0.891304348 | 1 | 2 | 2 | 1 | 0.98170832 | 0.160624769 |
| 92 | 83 | 0.902173913 | 2 | 2 | 1 | 1 | 0.985529339 | 0.167304018 |
| 92 | 84 | 0.913043478 | 0 | 2 | 4 | 4 | 0.988830826 | 0.172063705 |
| 92 | 85 | 0.923913043 | 1 | 2 | 1 | 4 | 0.991644696 | 0.175893575 |
| 92 | 86 | 0.934782609 | 2 | 2 | 2 | 4 | 0.994000975 | 0.181438187 |
| 92 | 87 | 0.945652174 | 0 | 2 | 1 | 1 | 0.99592792 | 0.191159293 |
| 92 | 88 | 0.956521739 | 1 | 2 | 4 | 1 | 0.997452115 | 0.205290332 |
| 92 | 89 | 0.967391304 | 2 | 2 | 1 | 1 | 0.998598572 | 0.221468222 |
| 92 | 90 | 0.97826087 | 0 | 1 | 2 | 2 | 0.999390827 | 0.236129319 |
| 92 | 91 | 0.989130435 | 1 | 1 | 1 | 2 | 0.999851024 | 0.246122226 |
| 94 | 48 | 0.510638298 | 0 | 2 | 2 | 2 | 0.065403129 | 2.063839299 |
| 94 | 49 | 0.521276596 | 1 | 2 | 1 | 2 | 0.127877162 | 1.394214631 |
| 94 | 50 | 0.531914894 | 2 | 2 | 2 | 2 | 0.187381315 | 1.027659132 |
| 94 | 51 | 0.542553191 | 0 | 1 | 1 | 1 | 0.24391372 | 0.850564119 |
| 94 | 52 | 0.553191489 | 1 | 1 | 2 | 1 | 0.297503054 | 0.731955836 |
| 94 | 53 | 0.563829787 | 2 | 1 | 1 | 1 | 0.348201635 | 0.646325059 |
| 94 | 54 | 0.574468085 | 0 | 2 | 2 | 2 | 0.396079766 | 0.552403123 |
| 94 | 55 | 0.585106383 | 1 | 2 | 1 | 2 | 0.441221101 | 0.43695748 |
| 94 | 56 | 0.595744681 | 2 | 2 | 2 | 2 | 0.483718887 | 0.297983109 |
| 94 | 57 | 0.606382979 | 0 | 1 | 1 | 1 | 0.523672914 | 0.206520775 |
| 94 | 58 | 0.617021277 | 1 | 1 | 2 | 1 | 0.561187065 | 0.20302644 |
| 94 | 59 | 0.627659574 | 2 | 1 | 1 | 1 | 0.596367359 | 0.197922577 |
| 94 | 60 | 0.638297872 | 0 | 2 | 2 | 2 | 0.629320391 | 0.190897078 |
| 94 | 61 | 0.64893617 | 1 | 2 | 1 | 2 | 0.660152121 | 0.21386937 |
| 94 | 62 | 0.659574468 | 2 | 2 | 2 | 2 | 0.688966919 | 0.239403502 |
| 94 | 63 | 0.670212766 | 0 | 1 | 1 | 1 | 0.715866849 | 0.253868533 |
| 94 | 64 | 0.680851064 | 1 | 1 | 2 | 1 | 0.740951125 | 0.267998974 |
| 94 | 65 | 0.691489362 | 2 | 1 | 1 | 1 | 0.764315721 | 0.279859724 |
| 94 | 66 | 0.70212766 | 0 | 2 | 2 | 2 | 0.786053095 | 0.280102639 |
| 94 | 67 | 0.712765957 | 1 | 2 | 1 | 2 | 0.806252019 | 0.272623855 |
| 94 | 68 | 0.723404255 | 2 | 2 | 2 | 2 | 0.824997475 | 0.268457393 |
| 94 | 69 | 0.734042553 | 0 | 1 | 1 | 1 | 0.842370619 | 0.267455084 |
| 94 | 70 | 0.744680851 | 1 | 1 | 2 | 1 | 0.858448794 | 0.259009488 |
| 94 | 71 | 0.755319149 | 2 | 1 | 1 | 1 | 0.873305571 | 0.236788864 |
| 94 | 72 | 0.765957447 | 0 | 2 | 2 | 2 | 0.887010833 | 0.204398342 |
| 94 | 73 | 0.776595745 | 1 | 2 | 1 | 2 | 0.89963087 | 0.170822923 |
| 94 | 74 | 0.787234043 | 2 | 2 | 2 | 2 | 0.91122849 | 0.14359836 |
| 94 | 75 | 0.79787234 | 0 | 1 | 1 | 1 | 0.921863152 | 0.125493162 |
| 94 | 76 | 0.808510638 | 1 | 1 | 2 | 1 | 0.931591088 | 0.116439696 |
| 94 | 77 | 0.819148936 | 2 | 1 | 1 | 1 | 0.94046545 | 0.115813672 |
| 94 | 78 | 0.829787234 | 0 | 2 | 2 | 2 | 0.948536442 | 0.121333438 |
| 94 | 79 | 0.840425532 | 1 | 2 | 1 | 2 | 0.955851461 | 0.129014774 |
| 94 | 80 | 0.85106383 | 2 | 2 | 2 | 2 | 0.962455236 | 0.135895355 |
| 94 | 81 | 0.861702128 | 0 | 1 | 1 | 1 | 0.968389961 | 0.141660903 |
| 94 | 82 | 0.872340426 | 1 | 2 | 2 | 1 | 0.973695424 | 0.147665949 |
| 94 | 83 | 0.882978723 | 2 | 1 | 1 | 1 | 0.978409141 | 0.154767813 |
| 94 | 84 | 0.893617021 | 0 | 2 | 2 | 2 | 0.982566473 | 0.162181292 |
| 94 | 85 | 0.904255319 | 1 | 2 | 1 | 2 | 0.986200747 | 0.168364038 |
| 94 | 86 | 0.914893617 | 2 | 2 | 2 | 2 | 0.989343368 | 0.172722469 |
| 94 | 87 | 0.925531915 | 0 | 1 | 1 | 1 | 0.992023926 | 0.176537326 |
| 94 | 88 | 0.936170213 | 1 | 1 | 2 | 1 | 0.994270302 | 0.182413747 |
| 94 | 89 | 0.946108511 | 2 | 1 | 1 | 1 | 0.996108761 | 0.192475743 |
| 94 | 90 | 0.957446809 | 0 | 2 | 2 | 2 | 0.99756405 | 0.206634776 |
| 94 | 91 | 0.968085106 | 1 | 2 | 1 | 2 | 0.998659483 | 0.222487614 |
| 94 | 92 | 0.978723404 | 2 | 2 | 2 | 2 | 0.999417022 | 0.236667922 |
| 94 | 93 | 0.989361702 | 0 | 1 | 1 | 1 | 0.999857363 | 0.246267868 |
| 96 | 54 | 0.5625 | 0 | 1 | 6 | 6 | 0.342020143 | 0.657104652 |
| 96 | 55 | 0.572916667 | 1 | 1 | 1 | 6 | 0.389270106 | 0.567058909 |
| 96 | 56 | 0.583333333 | 2 | 1 | 8 | 6 | 0.433883739 | 0.458394586 |
| 96 | 63 | 0.65625 | 0 | 2 | 3 | 3 | 0.680172738 | 0.232832619 |
| 96 | 64 | 0.666666667 | 1 | 2 | 32 | 3 | 0.707106781 | 0.249604232 |
| 96 | 65 | 0.677083333 | 2 | 2 | 1 | 3 | 0.732268667 | 0.262723859 |
| 96 | 72 | 0.75 | 0 | 1 | 24 | 24 | 0.866025404 | 0.249604232 |
| 96 | 73 | 0.760416667 | 1 | 1 | 1 | 24 | 0.880012204 | 0.222025618 |
| 96 | 74 | 0.770833333 | 2 | 1 | 2 | 24 | 0.892925858 | 0.188602834 |
| 96 | 81 | 0.84375 | 0 | 2 | 3 | 3 | 0.957989512 | 0.13131874 |
| 96 | 82 | 0.854166667 | 1 | 2 | 2 | 3 | 0.964253495 | 0.13764517 |
| 96 | 83 | 0.864583333 | 2 | 2 | 1 | 3 | 0.969887382 | 0.143201342 |
| 96 | 90 | 0.9375 | 0 | 1 | 6 | 6 | 0.994521895 | 0.183418691 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 96 | 91 | 0.947916667 | 1 | 1 | 1 | 6 | 0.99627782 | 0.193785107 |
| 96 | 92 | 0.958333333 | 2 | 1 | 4 | 6 | 0.997668769 | 0.207935803 |
| 98 | 50 | 0.510204082 | 2 | 1 | 2 | 2 | 0.06279052 | 2.090761402 |
| 98 | 51 | 0.520408163 | 0 | 2 | 1 | 1 | 0.122888291 | 1.440751943 |
| 98 | 52 | 0.530612245 | 1 | 2 | 2 | 1 | 0.180255038 | 1.056388324 |
| 98 | 53 | 0.540816327 | 2 | 2 | 1 | 1 | 0.234886046 | 0.875368857 |
| 98 | 54 | 0.551020408 | 0 | 1 | 2 | 2 | 0.286803233 | 0.75167648 |
| 98 | 55 | 0.56122449 | 1 | 1 | 1 | 2 | 0.336049393 | 0.667288698 |
| 98 | 56 | 0.571428571 | 2 | 1 | 14 | 2 | 0.382683432 | 0.580766246 |
| 98 | 57 | 0.581632653 | 0 | 2 | 1 | 1 | 0.426776435 | 0.478077991 |
| 98 | 58 | 0.591836735 | 1 | 2 | 2 | 1 | 0.468408441 | 0.349138075 |
| 98 | 59 | 0.602040816 | 2 | 2 | 1 | 1 | 0.5076658 | 0.231345199 |
| 98 | 60 | 0.612244898 | 0 | 1 | 2 | 2 | 0.544639035 | 0.199575136 |
| 98 | 61 | 0.62244898 | 1 | 1 | 1 | 2 | 0.579421098 | 0.203511963 |
| 98 | 62 | 0.632653061 | 2 | 1 | 2 | 2 | 0.612105983 | 0.191549364 |
| 98 | 63 | 0.642857143 | 0 | 2 | 7 | 7 | 0.64278761 | 0.197900559 |
| 98 | 64 | 0.653061224 | 1 | 2 | 2 | 7 | 0.671558955 | 0.225192784 |
| 98 | 65 | 0.663265306 | 2 | 2 | 1 | 7 | 0.698511365 | 0.245192515 |
| 98 | 66 | 0.673469388 | 0 | 1 | 2 | 2 | 0.723734038 | 0.257903904 |
| 98 | 67 | 0.683673469 | 1 | 1 | 1 | 2 | 0.74731363 | 0.27185119 |
| 98 | 68 | 0.693877551 | 2 | 1 | 2 | 2 | 0.769333971 | 0.281051233 |
| 98 | 69 | 0.704081633 | 0 | 2 | 1 | 1 | 0.789875872 | 0.278957915 |
| 98 | 70 | 0.714285714 | 1 | 2 | 14 | 1 | 0.809016994 | 0.271648756 |
| 98 | 71 | 0.724489796 | 2 | 2 | 1 | 1 | 0.826831784 | 0.268353598 |
| 98 | 72 | 0.734693878 | 0 | 1 | 2 | 2 | 0.843391446 | 0.267263301 |
| 98 | 73 | 0.744897959 | 1 | 1 | 1 | 2 | 0.858763958 | 0.258697285 |
| 98 | 74 | 0.755102041 | 2 | 1 | 2 | 2 | 0.873014113 | 0.237370214 |
| 98 | 75 | 0.765306122 | 0 | 2 | 1 | 1 | 0.886203579 | 0.206512044 |
| 98 | 76 | 0.775510204 | 1 | 2 | 2 | 1 | 0.898390982 | 0.174048435 |
| 98 | 77 | 0.785714286 | 2 | 2 | 7 | 1 | 0.909631995 | 0.146945689 |
| 98 | 78 | 0.795918367 | 0 | 1 | 2 | 2 | 0.919979444 | 0.128127458 |
| 98 | 79 | 0.806122449 | 1 | 1 | 1 | 2 | 0.929483408 | 0.117704501 |
| 98 | 80 | 0.816326531 | 2 | 1 | 2 | 2 | 0.938191336 | 0.115241827 |
| 98 | 81 | 0.826530612 | 0 | 2 | 1 | 1 | 0.946148157 | 0.119222227 |
| 98 | 82 | 0.836734694 | 1 | 2 | 2 | 1 | 0.953396392 | 0.126341729 |
| 98 | 83 | 0.846938776 | 2 | 2 | 1 | 1 | 0.959976268 | 0.133400054 |
| 98 | 84 | 0.857142857 | 0 | 1 | 14 | 14 | 0.965925826 | 0.139252172 |
| 98 | 85 | 0.867346939 | 1 | 1 | 1 | 14 | 0.971281032 | 0.144727446 |
| 98 | 86 | 0.87755102 | 2 | 1 | 2 | 14 | 0.976075878 | 0.151019244 |
| 98 | 87 | 0.887755102 | 0 | 2 | 1 | 1 | 0.980342485 | 0.158152376 |
| 98 | 88 | 0.897959184 | 1 | 2 | 2 | 1 | 0.984111204 | 0.164924862 |
| 98 | 89 | 0.908163265 | 2 | 2 | 1 | 1 | 0.987410705 | 0.170151208 |
| 98 | 90 | 0.918367347 | 0 | 1 | 2 | 2 | 0.990268069 | 0.173914854 |
| 98 | 91 | 0.928571429 | 1 | 1 | 7 | 2 | 0.992708874 | 0.177885384 |
| 98 | 92 | 0.93877551 | 2 | 1 | 2 | 2 | 0.994757279 | 0.184449132 |
| 98 | 93 | 0.948979592 | 0 | 2 | 1 | 1 | 0.996436098 | 0.195083248 |
| 98 | 94 | 0.959183673 | 1 | 2 | 2 | 1 | 0.997766879 | 0.209193497 |
| 98 | 95 | 0.969387755 | 2 | 2 | 1 | 1 | 0.998769769 | 0.224381073 |
| 98 | 96 | 0.979591837 | 0 | 1 | 2 | 2 | 0.999464587 | 0.237655078 |
| 98 | 97 | 0.989795918 | 1 | 1 | 1 | 2 | 0.999868884 | 0.246533159 |
| 100 | 51 | 0.51 | 0 | 1 | 1 | 1 | 0.061560906 | 2.103229178 |
| 100 | 52 | 0.52 | 1 | 1 | 4 | 1 | 0.12053668 | 1.463498436 |
| 100 | 53 | 0.53 | 2 | 1 | 1 | 1 | 0.176890275 | 1.070940573 |
| 100 | 54 | 0.54 | 0 | 2 | 2 | 2 | 0.230615871 | 0.887487812 |
| 100 | 55 | 0.55 | 1 | 2 | 5 | 2 | 0.281732557 | 0.761620727 |
| 100 | 56 | 0.56 | 2 | 2 | 4 | 2 | 0.330279062 | 0.676958838 |
| 100 | 57 | 0.57 | 0 | 1 | 1 | 1 | 0.376309372 | 0.593637209 |
| 100 | 58 | 0.58 | 1 | 1 | 2 | 1 | 0.419889102 | 0.496170422 |
| 100 | 59 | 0.59 | 2 | 1 | 1 | 1 | 0.461092501 | 0.373722607 |
| 100 | 60 | 0.6 | 0 | 2 | 20 | 20 | 0.5 | 0.249604232 |
| 100 | 61 | 0.61 | 1 | 2 | 1 | 20 | 0.536696194 | 0.19962126 |
| 100 | 62 | 0.62 | 2 | 2 | 2 | 20 | 0.571268215 | 0.204158758 |
| 100 | 63 | 0.63 | 0 | 1 | 1 | 1 | 0.60380441 | 0.194650337 |
| 100 | 64 | 0.64 | 1 | 1 | 4 | 1 | 0.634393284 | 0.192767156 |
| 100 | 65 | 0.65 | 2 | 1 | 5 | 1 | 0.663122658 | 0.216878644 |
| 100 | 66 | 0.66 | 0 | 2 | 2 | 2 | 0.690079011 | 0.24014423 |
| 100 | 67 | 0.67 | 1 | 2 | 1 | 2 | 0.71534697 | 0.253612369 |
| 100 | 68 | 0.68 | 2 | 2 | 4 | 2 | 0.739008917 | 0.266804756 |
| 100 | 69 | 0.69 | 0 | 1 | 1 | 1 | 0.761144712 | 0.278779173 |
| 100 | 70 | 0.7 | 1 | 1 | 10 | 1 | 0.781831482 | 0.281021751 |
| 100 | 71 | 0.71 | 2 | 1 | 1 | 1 | 0.801143489 | 0.274615605 |
| 100 | 72 | 0.72 | 0 | 1 | 4 | 4 | 0.819152044 | 0.269106858 |
| 100 | 73 | 0.73 | 1 | 1 | 1 | 4 | 0.835925479 | 0.268086863 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 100 | 74 | 0.74 | 2 | 1 | 2 | 4 | 0.851529138 | 0.26428199 |
| 100 | 75 | 0.75 | 0 | 1 | 25 | 25 | 0.866025404 | 0.249604232 |
| 100 | 76 | 0.76 | 1 | 1 | 4 | 25 | 0.879473751 | 0.223300423 |
| 100 | 77 | 0.77 | 2 | 1 | 1 | 25 | 0.891930808 | 0.191278722 |
| 100 | 78 | 0.78 | 0 | 2 | 2 | 2 | 0.903450435 | 0.16119157 |
| 100 | 79 | 0.79 | 1 | 2 | 1 | 2 | 0.914083811 | 0.137996511 |
| 100 | 80 | 0.8 | 2 | 2 | 20 | 2 | 0.923879533 | 0.122971276 |
| 100 | 81 | 0.81 | 0 | 1 | 1 | 1 | 0.932883705 | 0.11587055 |
| 100 | 82 | 0.82 | 1 | 1 | 2 | 1 | 0.941140048 | 0.116076553 |
| 100 | 83 | 0.83 | 2 | 1 | 1 | 1 | 0.948689998 | 0.121479415 |
| 100 | 84 | 0.84 | 0 | 1 | 4 | 4 | 0.955572806 | 0.128711511 |
| 100 | 85 | 0.85 | 1 | 1 | 5 | 4 | 0.961825643 | 0.135272043 |
| 100 | 86 | 0.86 | 2 | 1 | 2 | 4 | 0.967483697 | 0.140762094 |
| 100 | 87 | 0.87 | 0 | 1 | 1 | 1 | 0.972580268 | 0.146256155 |
| 100 | 88 | 0.88 | 1 | 1 | 4 | 1 | 0.977146866 | 0.152686048 |
| 100 | 89 | 0.89 | 2 | 1 | 1 | 1 | 0.981213297 | 0.159725441 |
| 100 | 90 | 0.9 | 0 | 1 | 10 | 10 | 0.984807753 | 0.166114912 |
| 100 | 91 | 0.91 | 1 | 1 | 1 | 10 | 0.987956898 | 0.170907248 |
| 100 | 92 | 0.92 | 2 | 1 | 4 | 10 | 0.990685946 | 0.174475274 |
| 100 | 93 | 0.93 | 0 | 1 | 1 | 1 | 0.993018737 | 0.178596967 |
| 100 | 94 | 0.94 | 1 | 1 | 2 | 1 | 0.994977815 | 0.185500958 |
| 100 | 95 | 0.95 | 2 | 1 | 5 | 1 | 0.996584493 | 0.196366609 |
| 100 | 96 | 0.96 | 0 | 1 | 4 | 4 | 0.997858923 | 0.210408244 |
| 100 | 97 | 0.97 | 1 | 1 | 1 | 4 | 0.998820159 | 0.225260326 |
| 100 | 98 | 0.98 | 2 | 1 | 2 | 4 | 0.999486216 | 0.238107884 |
| 100 | 99 | 0.99 | 0 | 1 | 1 | 1 | 0.999874128 | 0.246654154 |
| 102 | 54 | 0.529411765 | 0 | 2 | 6 | 6 | 0.173648178 | 1.085649725 |
| 102 | 55 | 0.539215686 | 1 | 2 | 1 | 6 | 0.226496767 | 0.899401054 |
| 102 | 56 | 0.549019608 | 2 | 2 | 2 | 6 | 0.276835511 | 0.771645554 |
| 102 | 63 | 0.617647059 | 0 | 1 | 3 | 3 | 0.563320058 | 0.203411399 |
| 102 | 64 | 0.62745098 | 1 | 1 | 2 | 3 | 0.595699304 | 0.198213196 |
| 102 | 65 | 0.637254902 | 2 | 1 | 1 | 3 | 0.626185198 | 0.190237409 |
| 102 | 72 | 0.705882353 | 0 | 2 | 6 | 6 | 0.79335334 | 0.277721125 |
| 102 | 73 | 0.715686275 | 1 | 2 | 1 | 6 | 0.811539059 | 0.270851659 |
| 102 | 74 | 0.725490196 | 2 | 2 | 2 | 6 | 0.828509649 | 0.268287909 |
| 102 | 81 | 0.794117647 | 0 | 1 | 3 | 3 | 0.918216107 | 0.13082749 |
| 102 | 82 | 0.803921569 | 1 | 1 | 2 | 3 | 0.927502451 | 0.119260123 |
| 102 | 83 | 0.81372549 | 2 | 1 | 1 | 3 | 0.936044738 | 0.11516218 |
| 102 | 90 | 0.882352941 | 0 | 2 | 6 | 6 | 0.978147601 | 0.154326845 |
| 102 | 91 | 0.892156863 | 1 | 2 | 1 | 6 | 0.982027556 | 0.161204811 |
| 102 | 92 | 0.901960784 | 2 | 2 | 2 | 6 | 0.985459518 | 0.167191123 |
| 102 | 99 | 0.970588235 | 0 | 1 | 3 | 3 | 0.998867339 | 0.226097856 |
| 102 | 100 | 0.980392157 | 1 | 1 | 2 | 3 | 0.99950656 | 0.238536048 |
| 102 | 101 | 0.990196078 | 2 | 1 | 1 | 3 | 0.999879063 | 0.246768171 |
| 104 | 53 | 0.509615385 | 2 | 2 | 1 | 1 | 0.059240628 | 2.126374657 |
| 104 | 54 | 0.519230769 | 0 | 1 | 2 | 2 | 0.116092914 | 1.507797807 |
| 104 | 55 | 0.528846154 | 1 | 1 | 1 | 2 | 0.170522193 | 1.100528156 |
| 104 | 56 | 0.538461538 | 2 | 1 | 8 | 2 | 0.222520934 | 0.911107652 |
| 104 | 57 | 0.548076923 | 0 | 2 | 1 | 1 | 0.272103465 | 0.781750376 |
| 104 | 58 | 0.557692308 | 1 | 2 | 2 | 1 | 0.31930153 | 0.695090731 |
| 104 | 59 | 0.567307692 | 2 | 2 | 1 | 1 | 0.364160575 | 0.617191281 |
| 104 | 60 | 0.576923077 | 0 | 2 | 4 | 4 | 0.406736643 | 0.528308632 |
| 104 | 61 | 0.586538462 | 1 | 2 | 1 | 4 | 0.447093793 | 0.418997924 |
| 104 | 62 | 0.596153846 | 2 | 2 | 2 | 4 | 0.485301963 | 0.29288233 |
| 104 | 63 | 0.605769231 | 0 | 2 | 1 | 1 | 0.521435203 | 0.208841575 |
| 104 | 64 | 0.615384615 | 1 | 2 | 8 | 1 | 0.555570233 | 0.201791183 |
| 104 | 65 | 0.625 | 2 | 2 | 13 | 1 | 0.587785252 | 0.201330169 |
| 104 | 66 | 0.634615385 | 0 | 1 | 2 | 2 | 0.618158986 | 0.190209586 |
| 104 | 67 | 0.644230769 | 1 | 1 | 1 | 2 | 0.646769912 | 0.201085622 |
| 104 | 68 | 0.653846154 | 2 | 1 | 4 | 2 | 0.673695644 | 0.227187156 |
| 104 | 69 | 0.663461538 | 0 | 2 | 1 | 1 | 0.699012447 | 0.245465455 |
| 104 | 70 | 0.673076923 | 1 | 2 | 2 | 1 | 0.722794864 | 0.257403142 |
| 104 | 71 | 0.682692308 | 2 | 2 | 1 | 1 | 0.745115426 | 0.270540204 |
| 104 | 72 | 0.692307692 | 0 | 1 | 8 | 8 | 0.766044443 | 0.28034481 |
| 104 | 73 | 0.701923077 | 1 | 1 | 1 | 8 | 0.785649855 | 0.280207315 |
| 104 | 74 | 0.711538462 | 2 | 1 | 2 | 8 | 0.80399713 | 0.273480257 |
| 104 | 75 | 0.721153846 | 0 | 2 | 1 | 1 | 0.821149209 | 0.268822649 |
| 104 | 76 | 0.730769231 | 1 | 2 | 4 | 1 | 0.837166478 | 0.268023535 |
| 104 | 77 | 0.740384615 | 2 | 2 | 1 | 1 | 0.852106774 | 0.263950324 |
| 104 | 78 | 0.75 | 0 | 1 | 26 | 26 | 0.866025404 | 0.249604232 |
| 104 | 79 | 0.759615385 | 1 | 1 | 1 | 26 | 0.878975191 | 0.224468155 |
| 104 | 80 | 0.769230769 | 2 | 1 | 8 | 26 | 0.891006524 | 0.193762432 |
| 104 | 81 | 0.778846154 | 0 | 2 | 1 | 1 | 0.902167425 | 0.164368318 |

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 104 | 82 | 0.788461538 | 1 | 2 | 2 | 1 | 0.912503616 | 0.141034076 |
| 104 | 83 | 0.798076923 | 2 | 2 | 1 | 1 | 0.922058603 | 0.125235021 |
| 104 | 84 | 0.807692308 | 0 | 2 | 4 | 4 | 0.930873749 | 0.116823889 |
| 104 | 85 | 0.817307692 | 1 | 2 | 1 | 4 | 0.938988361 | 0.11538604 |
| 104 | 86 | 0.826923077 | 2 | 2 | 2 | 4 | 0.946439773 | 0.119462306 |
| 104 | 87 | 0.836538462 | 0 | 2 | 1 | 1 | 0.953263431 | 0.126197738 |
| 104 | 88 | 0.846153846 | 1 | 2 | 8 | 1 | 0.959492974 | 0.132900247 |
| 104 | 89 | 0.855769231 | 2 | 2 | 1 | 1 | 0.965160315 | 0.138516987 |
| 104 | 90 | 0.865384615 | 0 | 1 | 2 | 2 | 0.970295726 | 0.143637911 |
| 104 | 91 | 0.875 | 1 | 1 | 13 | 1 | 0.974927912 | 0.149341528 |
| 104 | 92 | 0.884615385 | 2 | 1 | 4 | 2 | 0.979084088 | 0.155926545 |
| 104 | 93 | 0.894230769 | 0 | 2 | 1 | 1 | 0.982790051 | 0.162584535 |
| 104 | 94 | 0.903846154 | 1 | 2 | 2 | 1 | 0.986070254 | 0.168161739 |
| 104 | 95 | 0.913461538 | 2 | 2 | 1 | 1 | 0.988947871 | 0.172214927 |
| 104 | 96 | 0.923076923 | 0 | 1 | 8 | 8 | 0.991444861 | 0.175576734 |
| 104 | 97 | 0.932692308 | 1 | 1 | 1 | 8 | 0.993582036 | 0.180102178 |
| 104 | 98 | 0.942307692 | 2 | 1 | 2 | 8 | 0.995379113 | 0.187652192 |
| 104 | 99 | 0.951923077 | 0 | 2 | 1 | 1 | 0.996854776 | 0.198877445 |
| 104 | 100 | 0.961538462 | 1 | 2 | 4 | 1 | 0.998026728 | 0.212711602 |
| 104 | 101 | 0.971153846 | 2 | 2 | 1 | 1 | 0.998911745 | 0.226895956 |
| 104 | 102 | 0.980769231 | 0 | 1 | 2 | 2 | 0.99952572 | 0.238941275 |
| 104 | 103 | 0.990384615 | 1 | 1 | 1 | 2 | 0.999883714 | 0.246875734 |
| 106 | 54 | 0.509433962 | 0 | 2 | 2 | 2 | 0.058144829 | 2.137123136 |
| 106 | 55 | 0.518867925 | 1 | 2 | 1 | 2 | 0.11399141 | 1.529306505 |
| 106 | 56 | 0.528301887 | 2 | 2 | 2 | 2 | 0.167506223 | 1.115583828 |
| 106 | 57 | 0.537735849 | 0 | 1 | 1 | 1 | 0.218681091 | 0.922614619 |
| 106 | 58 | 0.547169811 | 1 | 1 | 2 | 1 | 0.267528339 | 0.79192334 |
| 106 | 59 | 0.556603774 | 2 | 1 | 1 | 1 | 0.314076712 | 0.703714917 |
| 106 | 60 | 0.566037736 | 0 | 2 | 2 | 2 | 0.35836795 | 0.627995147 |
| 106 | 61 | 0.575471698 | 1 | 2 | 1 | 2 | 0.400453906 | 0.542697969 |
| 106 | 62 | 0.58490566 | 2 | 2 | 2 | 2 | 0.440394152 | 0.439430076 |
| 106 | 63 | 0.594339623 | 0 | 1 | 1 | 1 | 0.478253979 | 0.315971869 |
| 106 | 64 | 0.603773585 | 1 | 1 | 2 | 1 | 0.514102744 | 0.219071793 |
| 106 | 65 | 0.613207547 | 2 | 1 | 1 | 1 | 0.548012507 | 0.200104374 |
| 106 | 66 | 0.622641509 | 0 | 2 | 2 | 2 | 0.58005691 | 0.203397584 |
| 106 | 67 | 0.632075472 | 1 | 2 | 1 | 2 | 0.610310262 | 0.192121994 |
| 106 | 68 | 0.641509434 | 2 | 2 | 2 | 2 | 0.638846806 | 0.195196197 |
| 106 | 69 | 0.650943396 | 0 | 1 | 1 | 1 | 0.66574012 | 0.219512465 |
| 106 | 70 | 0.660377358 | 1 | 1 | 2 | 1 | 0.691062649 | 0.240783515 |
| 106 | 71 | 0.669811321 | 2 | 1 | 1 | 1 | 0.714885336 | 0.253385646 |
| 106 | 72 | 0.679245283 | 0 | 2 | 2 | 2 | 0.737277337 | 0.265742909 |
| 106 | 73 | 0.688679245 | 1 | 2 | 1 | 2 | 0.758305808 | 0.27761979 |
| 106 | 74 | 0.698113208 | 2 | 2 | 2 | 2 | 0.778035754 | 0.281479684 |
| 106 | 75 | 0.70754717 | 0 | 1 | 1 | 1 | 0.796529918 | 0.276484073 |
| 106 | 76 | 0.716981132 | 1 | 1 | 2 | 1 | 0.813848717 | 0.270212285 |
| 106 | 77 | 0.726415094 | 2 | 1 | 1 | 1 | 0.83005021 | 0.268244697 |
| 106 | 78 | 0.735849057 | 0 | 2 | 2 | 2 | 0.845190086 | 0.266841566 |
| 106 | 79 | 0.745283019 | 1 | 2 | 1 | 2 | 0.859321681 | 0.258128464 |
| 106 | 80 | 0.754716981 | 2 | 2 | 2 | 2 | 0.872496007 | 0.238390179 |
| 106 | 81 | 0.764150943 | 0 | 1 | 1 | 1 | 0.884761797 | 0.210244445 |
| 106 | 82 | 0.773584906 | 1 | 1 | 2 | 1 | 0.896165557 | 0.179925184 |
| 106 | 83 | 0.783018868 | 2 | 1 | 1 | 1 | 0.906751628 | 0.153345803 |
| 106 | 84 | 0.79245283 | 0 | 2 | 2 | 2 | 0.916562256 | 0.133558345 |
| 106 | 85 | 0.801886792 | 1 | 2 | 1 | 2 | 0.92563766 | 0.121034768 |
| 106 | 86 | 0.811320755 | 2 | 2 | 2 | 2 | 0.934016109 | 0.115504271 |
| 106 | 87 | 0.820754717 | 0 | 1 | 1 | 1 | 0.941733996 | 0.116342032 |
| 106 | 88 | 0.830188679 | 1 | 1 | 2 | 1 | 0.948825917 | 0.121609527 |
| 106 | 89 | 0.839622642 | 2 | 1 | 1 | 1 | 0.955324742 | 0.128441258 |
| 106 | 90 | 0.849056604 | 0 | 2 | 2 | 2 | 0.961261696 | 0.134707921 |
| 106 | 91 | 0.858490566 | 1 | 2 | 1 | 2 | 0.966666429 | 0.139966314 |
| 106 | 92 | 0.867924528 | 2 | 2 | 2 | 2 | 0.971567089 | 0.145054422 |
| 106 | 93 | 0.877358491 | 0 | 1 | 1 | 1 | 0.975990396 | 0.150890392 |
| 106 | 94 | 0.886792453 | 1 | 1 | 2 | 1 | 0.979961705 | 0.157471453 |
| 106 | 95 | 0.896226415 | 2 | 1 | 1 | 1 | 0.983505075 | 0.163862096 |
| 106 | 96 | 0.905660377 | 0 | 2 | 2 | 2 | 0.986643332 | 0.169036348 |
| 106 | 97 | 0.91509434 | 1 | 2 | 1 | 2 | 0.989398131 | 0.172792512 |
| 106 | 98 | 0.924528302 | 2 | 2 | 2 | 2 | 0.991790014 | 0.176133162 |
| 106 | 99 | 0.933962264 | 0 | 1 | 1 | 1 | 0.993838464 | 0.180895268 |
| 106 | 100 | 0.943396226 | 1 | 1 | 2 | 1 | 0.995561965 | 0.18874359 |
| 106 | 101 | 0.952830189 | 2 | 1 | 1 | 1 | 0.996978044 | 0.200100351 |
| 106 | 102 | 0.962264151 | 0 | 2 | 2 | 2 | 0.998103329 | 0.213801993 |
| 106 | 103 | 0.971698113 | 1 | 2 | 1 | 2 | 0.99895359 | 0.227656801 |
| 106 | 104 | 0.981132075 | 2 | 2 | 2 | 2 | 0.999543784 | 0.239325132 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 106 | 105 | 0.990566038 | 0 | 1 | 1 | 1 | 0.999888102 | 0.24697732 |
| 108 | 81 | 0.75 | 0 | 1 | 27 | 27 | 0.866025404 | 0.249604232 |
| 108 | 82 | 0.759259259 | 1 | 1 | 2 | 27 | 0.878512251 | 0.225541264 |
| 108 | 83 | 0.768518519 | 2 | 1 | 1 | 27 | 0.89014574 | 0.196070915 |
| 110 | 56 | 0.509090909 | 2 | 1 | 2 | 2 | 0.056070447 | 2.157130997 |
| 110 | 57 | 0.518181818 | 0 | 2 | 1 | 1 | 0.110008221 | 1.570964892 |
| 110 | 58 | 0.527272727 | 1 | 2 | 2 | 1 | 0.161781997 | 1.146221167 |
| 110 | 59 | 0.536363636 | 2 | 2 | 1 | 1 | 0.211382624 | 0.945089077 |
| 110 | 60 | 0.545454545 | 0 | 2 | 10 | 10 | 0.258819045 | 0.812389602 |
| 110 | 61 | 0.554545455 | 1 | 2 | 1 | 10 | 0.304114832 | 0.720445808 |
| 110 | 62 | 0.563636364 | 2 | 2 | 2 | 10 | 0.347305253 | 0.647904471 |
| 110 | 63 | 0.572727273 | 0 | 2 | 1 | 1 | 0.388434796 | 0.568821591 |
| 110 | 64 | 0.581818182 | 1 | 2 | 2 | 1 | 0.427555093 | 0.475972755 |
| 110 | 65 | 0.590909091 | 2 | 2 | 5 | 1 | 0.464723172 | 0.361566081 |
| 110 | 66 | 0.6 | 0 | 2 | 22 | 22 | 0.5 | 0.249604232 |
| 110 | 67 | 0.609090909 | 1 | 2 | 1 | 22 | 0.533449274 | 0.200403412 |
| 110 | 68 | 0.618181818 | 2 | 2 | 2 | 22 | 0.565136414 | 0.203685678 |
| 110 | 69 | 0.627272727 | 0 | 2 | 1 | 1 | 0.595127743 | 0.198459706 |
| 110 | 70 | 0.636363636 | 1 | 2 | 10 | 1 | 0.623489802 | 0.189969977 |
| 110 | 71 | 0.645454545 | 2 | 2 | 1 | 1 | 0.650288808 | 0.204205856 |
| 110 | 72 | 0.654545455 | 0 | 1 | 2 | 2 | 0.675590208 | 0.228904087 |
| 110 | 73 | 0.663636364 | 1 | 1 | 1 | 2 | 0.699458327 | 0.245706245 |
| 110 | 74 | 0.672727273 | 2 | 1 | 2 | 2 | 0.721956094 | 0.256960757 |
| 110 | 75 | 0.681818182 | 0 | 1 | 5 | 5 | 0.743144825 | 0.269343888 |
| 110 | 76 | 0.690909091 | 1 | 1 | 2 | 5 | 0.763084068 | 0.279468499 |
| 110 | 77 | 0.7 | 2 | 1 | 11 | 5 | 0.781831482 | 0.281021751 |
| 110 | 78 | 0.709090909 | 0 | 1 | 2 | 2 | 0.799442763 | 0.275305862 |
| 110 | 79 | 0.718181818 | 1 | 1 | 1 | 2 | 0.815971592 | 0.269707868 |
| 110 | 80 | 0.727272727 | 2 | 1 | 10 | 2 | 0.831469612 | 0.268212778 |
| 110 | 81 | 0.736363636 | 0 | 2 | 1 | 1 | 0.845986426 | 0.266617108 |
| 110 | 82 | 0.745454545 | 1 | 2 | 2 | 1 | 0.859569607 | 0.257868856 |
| 110 | 83 | 0.754545455 | 2 | 2 | 1 | 1 | 0.872264727 | 0.238839873 |
| 110 | 84 | 0.763636364 | 0 | 1 | 2 | 2 | 0.884115394 | 0.211897539 |
| 110 | 85 | 0.772727273 | 1 | 1 | 5 | 2 | 0.895163291 | 0.182599153 |
| 110 | 86 | 0.781818182 | 2 | 1 | 2 | 2 | 0.905448237 | 0.156382964 |
| 110 | 87 | 0.790909091 | 0 | 2 | 1 | 1 | 0.915008235 | 0.136293708 |
| 110 | 88 | 0.8 | 1 | 2 | 22 | 1 | 0.923879533 | 0.122971276 |
| 110 | 89 | 0.809090909 | 2 | 2 | 1 | 1 | 0.932096686 | 0.116198084 |
| 110 | 90 | 0.818181818 | 0 | 2 | 10 | 10 | 0.939692621 | 0.115564239 |
| 110 | 91 | 0.827272727 | 1 | 2 | 1 | 10 | 0.946698696 | 0.119679907 |
| 110 | 92 | 0.836363636 | 2 | 2 | 2 | 10 | 0.953144767 | 0.126069388 |
| 110 | 93 | 0.845454545 | 0 | 2 | 1 | 1 | 0.959059248 | 0.132448029 |
| 110 | 94 | 0.854545455 | 1 | 2 | 2 | 1 | 0.964469175 | 0.137852874 |
| 110 | 95 | 0.863636364 | 2 | 2 | 5 | 1 | 0.969400266 | 0.142690529 |
| 110 | 96 | 0.872727273 | 0 | 1 | 2 | 2 | 0.973876979 | 0.147904802 |
| 110 | 97 | 0.881818182 | 1 | 1 | 1 | 2 | 0.977922572 | 0.153951312 |
| 110 | 98 | 0.890909091 | 2 | 1 | 2 | 2 | 0.981559157 | 0.160353656 |
| 110 | 99 | 0.9 | 0 | 1 | 11 | 11 | 0.984807753 | 0.166114912 |
| 110 | 100 | 0.909090909 | 1 | 1 | 10 | 11 | 0.987688341 | 0.170539182 |
| 110 | 101 | 0.918181818 | 2 | 1 | 1 | 11 | 0.99021991 | 0.173851576 |
| 110 | 102 | 0.927272727 | 0 | 1 | 2 | 2 | 0.99242051 | 0.177284121 |
| 110 | 103 | 0.936363636 | 1 | 1 | 1 | 2 | 0.994307292 | 0.182555598 |
| 110 | 104 | 0.945454545 | 2 | 1 | 2 | 2 | 0.995896558 | 0.19093952 |
| 110 | 105 | 0.954545455 | 0 | 1 | 5 | 5 | 0.997203797 | 0.202472832 |
| 110 | 106 | 0.963636364 | 1 | 1 | 2 | 5 | 0.998243732 | 0.215865529 |
| 110 | 107 | 0.972727273 | 2 | 1 | 1 | 5 | 0.999030351 | 0.229074835 |
| 110 | 108 | 0.981818182 | 0 | 1 | 2 | 2 | 0.99957695 | 0.24003438 |
| 110 | 109 | 0.990909091 | 1 | 1 | 1 | 2 | 0.999896164 | 0.247164251 |
| 112 | 57 | 0.508928571 | 0 | 1 | 1 | 1 | 0.05508776 | 2.166447799 |
| 112 | 58 | 0.517857143 | 1 | 1 | 2 | 1 | 0.108119018 | 1.591095215 |
| 112 | 59 | 0.526785714 | 2 | 1 | 1 | 1 | 0.159063496 | 1.16178779 |
| 112 | 60 | 0.535714286 | 0 | 1 | 4 | 4 | 0.207911691 | 0.956097664 |
| 112 | 61 | 0.544642857 | 1 | 1 | 1 | 4 | 0.25467112 | 0.82263124 |
| 112 | 62 | 0.553571429 | 2 | 1 | 2 | 4 | 0.299363123 | 0.728674215 |
| 112 | 63 | 0.5625 | 0 | 1 | 7 | 7 | 0.342020143 | 0.657104652 |
| 112 | 64 | 0.571428571 | 1 | 1 | 16 | 7 | 0.382683432 | 0.580766246 |
| 112 | 65 | 0.580357143 | 2 | 1 | 1 | 7 | 0.421401108 | 0.492278126 |
| 112 | 66 | 0.589285714 | 0 | 2 | 2 | 2 | 0.458226522 | 0.38322537 |
| 112 | 67 | 0.598214286 | 1 | 2 | 1 | 2 | 0.493216893 | 0.268487062 |
| 112 | 68 | 0.607142857 | 2 | 2 | 4 | 2 | 0.526432163 | 0.204155251 |
| 112 | 69 | 0.616071429 | 0 | 1 | 1 | 1 | 0.557934048 | 0.202338657 |
| 112 | 70 | 0.625 | 1 | 1 | 14 | 1 | 0.587785252 | 0.201330169 |
| 112 | 71 | 0.633928571 | 2 | 1 | 1 | 1 | 0.61604882 | 0.19056103 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 112 | 72 | 0.642857143 | 0 | 2 | 8 | 8 | 0.64278761 | 0.197900559 |
| 112 | 73 | 0.651785714 | 1 | 2 | 1 | 8 | 0.668063864 | 0.221817325 |
| 112 | 74 | 0.660714286 | 2 | 2 | 2 | 8 | 0.691938869 | 0.241340786 |
| 112 | 75 | 0.669642857 | 0 | 1 | 1 | 1 | 0.71447268 | 0.253183514 |
| 112 | 76 | 0.678571429 | 1 | 1 | 4 | 1 | 0.735723911 | 0.26479621 |
| 112 | 77 | 0.6875 | 2 | 1 | 7 | 1 | 0.755749574 | 0.276438718 |
| 112 | 78 | 0.696428571 | 0 | 2 | 2 | 2 | 0.774604962 | 0.281562485 |
| 112 | 79 | 0.705357143 | 1 | 2 | 1 | 2 | 0.792343559 | 0.278095654 |
| 112 | 80 | 0.714285714 | 2 | 2 | 16 | 2 | 0.809016994 | 0.271648756 |
| 112 | 81 | 0.723214286 | 0 | 1 | 1 | 1 | 0.824675004 | 0.268479801 |
| 112 | 82 | 0.732142857 | 1 | 1 | 2 | 1 | 0.839365426 | 0.2678539 |
| 112 | 83 | 0.741071429 | 2 | 1 | 1 | 1 | 0.853134204 | 0.263314496 |
| 112 | 84 | 0.75 | 0 | 1 | 28 | 28 | 0.866025404 | 0.249604232 |
| 112 | 85 | 0.758928571 | 1 | 1 | 1 | 28 | 0.878081248 | 0.226530397 |
| 112 | 86 | 0.767857143 | 2 | 1 | 2 | 28 | 0.889342149 | 0.198219622 |
| 112 | 87 | 0.776785714 | 0 | 1 | 1 | 1 | 0.899846754 | 0.170265601 |
| 112 | 88 | 0.785714286 | 1 | 1 | 8 | 1 | 0.909631995 | 0.146945689 |
| 112 | 89 | 0.794642857 | 2 | 1 | 1 | 1 | 0.918733142 | 0.130012845 |
| 112 | 90 | 0.803571429 | 0 | 2 | 2 | 2 | 0.927183855 | 0.1195424 |
| 112 | 91 | 0.8125 | 1 | 2 | 7 | 2 | 0.935016243 | 0.11528497 |
| 112 | 92 | 0.821428571 | 2 | 2 | 4 | 2 | 0.942260922 | 0.116603578 |
| 112 | 93 | 0.830357143 | 0 | 1 | 1 | 1 | 0.948947073 | 0.121726202 |
| 112 | 94 | 0.839285714 | 1 | 1 | 2 | 1 | 0.955102497 | 0.128198982 |
| 112 | 95 | 0.848214286 | 2 | 1 | 1 | 1 | 0.960753676 | 0.13419476 |
| 112 | 96 | 0.857142857 | 0 | 1 | 16 | 16 | 0.965925826 | 0.139252172 |
| 112 | 97 | 0.866071429 | 1 | 1 | 1 | 16 | 0.970642955 | 0.144015738 |
| 112 | 98 | 0.875 | 2 | 1 | 14 | 16 | 0.974927912 | 0.149341528 |
| 112 | 99 | 0.883928571 | 0 | 1 | 1 | 1 | 0.978802446 | 0.155439568 |
| 112 | 100 | 0.892857143 | 1 | 1 | 4 | 1 | 0.982287251 | 0.161675982 |
| 112 | 101 | 0.901785714 | 2 | 1 | 1 | 1 | 0.985402015 | 0.167097784 |
| 112 | 102 | 0.910714286 | 0 | 2 | 2 | 2 | 0.988165472 | 0.171188554 |
| 112 | 103 | 0.919642857 | 1 | 2 | 1 | 2 | 0.990595441 | 0.174351877 |
| 112 | 104 | 0.928571429 | 2 | 2 | 8 | 2 | 0.992708874 | 0.177885384 |
| 112 | 105 | 0.9375 | 0 | 1 | 7 | 7 | 0.994521895 | 0.183418691 |
| 112 | 106 | 0.946428571 | 1 | 1 | 2 | 7 | 0.996049843 | 0.192037924 |
| 112 | 107 | 0.955357143 | 2 | 1 | 1 | 7 | 0.997307305 | 0.203620134 |
| 112 | 108 | 0.964285714 | 0 | 1 | 4 | 4 | 0.998308158 | 0.216841025 |
| 112 | 109 | 0.973214286 | 1 | 1 | 1 | 4 | 0.999065603 | 0.229735794 |
| 112 | 110 | 0.982142857 | 2 | 1 | 2 | 4 | 0.999592193 | 0.240362313 |
| 112 | 111 | 0.991071429 | 0 | 1 | 1 | 1 | 0.999899872 | 0.247250351 |
| 114 | 63 | 0.552631579 | 0 | 2 | 3 | 3 | 0.294755174 | 0.736875711 |
| 114 | 64 | 0.561403509 | 1 | 2 | 2 | 3 | 0.336889853 | 0.665867232 |
| 114 | 65 | 0.570175439 | 2 | 2 | 1 | 3 | 0.377094842 | 0.592070958 |
| 114 | 72 | 0.631578947 | 0 | 1 | 6 | 6 | 0.608761429 | 0.192667 |
| 114 | 73 | 0.640350877 | 1 | 1 | 1 | 6 | 0.635432301 | 0.193270212 |
| 114 | 74 | 0.649122807 | 2 | 1 | 2 | 6 | 0.660674723 | 0.214398852 |
| 114 | 81 | 0.710526316 | 0 | 2 | 3 | 3 | 0.802123193 | 0.274221271 |
| 114 | 82 | 0.719298246 | 1 | 2 | 2 | 3 | 0.817299361 | 0.269315949 |
| 114 | 83 | 0.728070175 | 2 | 2 | 1 | 3 | 0.832781573 | 0.268184331 |
| 114 | 90 | 0.789473684 | 0 | 1 | 6 | 6 | 0.913545458 | 0.139013604 |
| 114 | 91 | 0.798245614 | 1 | 1 | 1 | 6 | 0.922219513 | 0.12502468 |
| 114 | 92 | 0.807017544 | 2 | 1 | 2 | 6 | 0.930278443 | 0.117179177 |
| 114 | 99 | 0.868421053 | 0 | 2 | 3 | 3 | 0.971811568 | 0.145338011 |
| 114 | 100 | 0.877192982 | 1 | 2 | 2 | 3 | 0.975916762 | 0.150779901 |
| 114 | 101 | 0.885964912 | 2 | 2 | 1 | 3 | 0.979630808 | 0.156884528 |
| 114 | 108 | 0.947368421 | 0 | 1 | 6 | 6 | 0.996194698 | 0.193131583 |
| 114 | 109 | 0.956140351 | 1 | 1 | 1 | 6 | 0.99740517 | 0.204740449 |
| 114 | 110 | 0.964912281 | 2 | 1 | 2 | 6 | 0.998369104 | 0.217780644 |
| 116 | 59 | 0.50862069 | 2 | 2 | 1 | 1 | 0.053222175 | 2.183836574 |
| 116 | 60 | 0.517241379 | 0 | 2 | 4 | 4 | 0.104528463 | 1.629933346 |
| 116 | 61 | 0.525862069 | 1 | 2 | 1 | 4 | 0.153890577 | 1.193349746 |
| 116 | 62 | 0.534482759 | 2 | 2 | 2 | 4 | 0.20129852 | 0.977780486 |
| 116 | 63 | 0.543103448 | 0 | 2 | 1 | 1 | 0.246757398 | 0.842997946 |
| 116 | 64 | 0.551724138 | 1 | 2 | 4 | 1 | 0.290284677 | 0.745085515 |
| 116 | 65 | 0.560344828 | 2 | 2 | 1 | 1 | 0.331907853 | 0.674243524 |
| 116 | 66 | 0.568965517 | 0 | 1 | 2 | 2 | 0.371662456 | 0.602793496 |
| 116 | 67 | 0.577586207 | 1 | 1 | 1 | 2 | 0.40959036 | 0.521580713 |
| 116 | 68 | 0.586206897 | 2 | 1 | 4 | 2 | 0.445738356 | 0.423203988 |
| 116 | 69 | 0.594827586 | 0 | 2 | 1 | 1 | 0.480156935 | 0.309651684 |
| 116 | 70 | 0.603448276 | 1 | 2 | 2 | 1 | 0.512899277 | 0.221137291 |
| 116 | 71 | 0.612068966 | 2 | 2 | 1 | 1 | 0.544020398 | 0.199505318 |
| 116 | 72 | 0.620689655 | 0 | 2 | 4 | 4 | 0.573576436 | 0.204130216 |
| 116 | 73 | 0.629310345 | 1 | 2 | 1 | 4 | 0.601624063 | 0.195597239 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 116 | 74 | 0.637931034 | 2 | 2 | 2 | 4 | 0.628219997 | 0.190622316 |
| 116 | 75 | 0.646551724 | 0 | 2 | 1 | 1 | 0.653420604 | 0.207165744 |
| 116 | 76 | 0.655172414 | 1 | 2 | 4 | 1 | 0.677281572 | 0.230392404 |
| 116 | 77 | 0.663793103 | 2 | 2 | 1 | 1 | 0.699857651 | 0.245920289 |
| 116 | 78 | 0.672413793 | 0 | 1 | 2 | 2 | 0.721202447 | 0.256567045 |
| 116 | 79 | 0.681034483 | 1 | 1 | 1 | 2 | 0.741368262 | 0.268255311 |
| 116 | 80 | 0.689655172 | 2 | 1 | 4 | 2 | 0.760405966 | 0.278494052 |
| 116 | 81 | 0.698275862 | 0 | 2 | 1 | 1 | 0.778364912 | 0.28145487 |
| 116 | 82 | 0.706896552 | 1 | 2 | 2 | 1 | 0.795292871 | 0.276974514 |
| 116 | 83 | 0.715517241 | 2 | 2 | 1 | 1 | 0.811235991 | 0.270942216 |
| 116 | 84 | 0.724137931 | 0 | 2 | 4 | 4 | 0.826238774 | 0.268383038 |
| 116 | 85 | 0.732758621 | 1 | 2 | 1 | 4 | 0.840344072 | 0.267748254 |
| 116 | 86 | 0.74137931 | 2 | 2 | 2 | 4 | 0.853593089 | 0.263011021 |
| 116 | 87 | 0.75 | 0 | 1 | 29 | 29 | 0.866025404 | 0.249604232 |
| 116 | 88 | 0.75862069 | 1 | 1 | 4 | 29 | 0.87767899 | 0.227444715 |
| 116 | 89 | 0.767241379 | 2 | 1 | 1 | 29 | 0.888590248 | 0.200222579 |
| 116 | 90 | 0.775862069 | 0 | 1 | 2 | 2 | 0.898794046 | 0.172995494 |
| 116 | 91 | 0.784482759 | 1 | 1 | 1 | 2 | 0.908323757 | 0.149797074 |
| 116 | 92 | 0.793103448 | 2 | 1 | 4 | 2 | 0.917211302 | 0.132464151 |
| 116 | 93 | 0.801724138 | 0 | 2 | 1 | 1 | 0.925487199 | 0.121190655 |
| 116 | 94 | 0.810344828 | 1 | 2 | 2 | 1 | 0.933180611 | 0.115762474 |
| 116 | 95 | 0.818965517 | 2 | 2 | 1 | 1 | 0.94031939 | 0.115762261 |
| 116 | 96 | 0.827586207 | 0 | 2 | 4 | 4 | 0.946930129 | 0.119877837 |
| 116 | 97 | 0.836206897 | 1 | 2 | 1 | 4 | 0.953038211 | 0.125954273 |
| 116 | 98 | 0.844827586 | 2 | 2 | 2 | 4 | 0.958667853 | 0.132037068 |
| 116 | 99 | 0.853448276 | 0 | 2 | 1 | 1 | 0.963842159 | 0.137248077 |
| 116 | 100 | 0.862068966 | 1 | 2 | 4 | 1 | 0.968583161 | 0.141854648 |
| 116 | 101 | 0.870689655 | 2 | 2 | 1 | 1 | 0.972911871 | 0.146665362 |
| 116 | 102 | 0.879310345 | 0 | 1 | 2 | 2 | 0.976848318 | 0.152211797 |
| 116 | 103 | 0.887931034 | 1 | 1 | 1 | 2 | 0.980411597 | 0.15827651 |
| 116 | 104 | 0.896551724 | 2 | 1 | 4 | 2 | 0.983619907 | 0.164065083 |
| 116 | 105 | 0.905172414 | 0 | 2 | 1 | 1 | 0.986490594 | 0.168806758 |
| 116 | 106 | 0.913793103 | 1 | 2 | 2 | 1 | 0.989040187 | 0.1723338 |
| 116 | 107 | 0.922413793 | 2 | 2 | 1 | 1 | 0.991284439 | 0.175331753 |
| 116 | 108 | 0.931034483 | 0 | 2 | 4 | 4 | 0.993238358 | 0.179148535 |
| 116 | 109 | 0.939655172 | 1 | 2 | 1 | 4 | 0.994916246 | 0.185198497 |
| 116 | 110 | 0.948275862 | 2 | 2 | 2 | 4 | 0.996331731 | 0.194219255 |
| 116 | 111 | 0.956896552 | 0 | 2 | 1 | 1 | 0.997497797 | 0.20583331 |
| 116 | 112 | 0.965517241 | 1 | 2 | 4 | 1 | 0.998426815 | 0.218685636 |
| 116 | 113 | 0.974137931 | 2 | 2 | 1 | 1 | 0.999130574 | 0.230970222 |
| 116 | 114 | 0.982758621 | 0 | 1 | 2 | 2 | 0.999620307 | 0.240970419 |
| 116 | 115 | 0.99137931 | 1 | 1 | 1 | 2 | 0.999906716 | 0.247409472 |
| 118 | 60 | 0.508474576 | 0 | 2 | 2 | 2 | 0.052335956 | 2.19195522 |
| 118 | 61 | 0.516949153 | 1 | 2 | 1 | 2 | 0.102820997 | 1.648638621 |
| 118 | 62 | 0.525423729 | 2 | 2 | 2 | 2 | 0.151427778 | 1.209309731 |
| 118 | 63 | 0.533898305 | 0 | 1 | 1 | 1 | 0.198146143 | 0.988507119 |
| 118 | 64 | 0.542372881 | 1 | 1 | 2 | 1 | 0.24298018 | 0.853074885 |
| 118 | 65 | 0.550847458 | 2 | 1 | 1 | 1 | 0.285945678 | 0.75332865 |
| 118 | 66 | 0.559322034 | 0 | 2 | 2 | 2 | 0.327067963 | 0.682286018 |
| 118 | 67 | 0.56779661 | 1 | 2 | 1 | 2 | 0.366380038 | 0.612980012 |
| 118 | 68 | 0.576271186 | 2 | 2 | 2 | 2 | 0.403921005 | 0.534826441 |
| 118 | 69 | 0.584745763 | 0 | 1 | 1 | 1 | 0.439734721 | 0.441391584 |
| 118 | 70 | 0.593220339 | 1 | 1 | 2 | 1 | 0.473868662 | 0.330687147 |
| 118 | 71 | 0.601694915 | 2 | 1 | 1 | 1 | 0.506372963 | 0.234162186 |
| 118 | 72 | 0.610169492 | 0 | 2 | 2 | 2 | 0.537299608 | 0.199532344 |
| 118 | 73 | 0.618644068 | 1 | 2 | 1 | 2 | 0.566701756 | 0.203876678 |
| 118 | 74 | 0.627118644 | 2 | 2 | 2 | 2 | 0.594633176 | 0.198671183 |
| 118 | 75 | 0.63559322 | 0 | 1 | 1 | 1 | 0.62114778 | 0.189954378 |
| 118 | 76 | 0.644067797 | 1 | 1 | 2 | 1 | 0.646299238 | 0.200688343 |
| 118 | 77 | 0.652542373 | 2 | 1 | 1 | 1 | 0.670140662 | 0.223838436 |
| 118 | 78 | 0.661016949 | 0 | 2 | 2 | 2 | 0.692724354 | 0.241830857 |
| 118 | 79 | 0.669491525 | 1 | 2 | 1 | 2 | 0.714101599 | 0.253002141 |
| 118 | 80 | 0.677966102 | 2 | 2 | 2 | 2 | 0.734322509 | 0.263949269 |
| 118 | 81 | 0.686440678 | 0 | 1 | 1 | 1 | 0.753435896 | 0.275273265 |
| 118 | 82 | 0.694915254 | 1 | 1 | 2 | 1 | 0.77148918 | 0.281354012 |
| 118 | 83 | 0.703389831 | 2 | 1 | 1 | 1 | 0.788528322 | 0.279390865 |
| 118 | 84 | 0.711864407 | 0 | 2 | 2 | 2 | 0.80459778 | 0.273247759 |
| 118 | 85 | 0.720338983 | 1 | 2 | 1 | 2 | 0.819740483 | 0.269015844 |
| 118 | 86 | 0.728813559 | 2 | 2 | 2 | 2 | 0.833997818 | 0.268154036 |
| 118 | 87 | 0.737288136 | 0 | 1 | 1 | 1 | 0.847409631 | 0.266152309 |
| 118 | 88 | 0.745762712 | 1 | 1 | 2 | 1 | 0.86001424 | 0.257392798 |
| 118 | 89 | 0.754237288 | 2 | 1 | 1 | 1 | 0.871848453 | 0.239640452 |
| 118 | 90 | 0.762711864 | 0 | 2 | 2 | 2 | 0.882947593 | 0.214847956 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 118 | 91 | 0.771186441 | 1 | 2 | 1 | 2 | 0.893345534 | 0.187474581 |
| 118 | 92 | 0.779661017 | 2 | 2 | 2 | 2 | 0.903074732 | 0.162115047 |
| 118 | 93 | 0.788135593 | 0 | 1 | 1 | 1 | 0.912166268 | 0.141702815 |
| 118 | 94 | 0.796610169 | 1 | 1 | 2 | 1 | 0.920649887 | 0.127159764 |
| 118 | 95 | 0.805084746 | 2 | 1 | 1 | 1 | 0.928554038 | 0.118391056 |
| 118 | 96 | 0.813559322 | 0 | 2 | 2 | 2 | 0.935905927 | 0.115172657 |
| 118 | 97 | 0.822033898 | 1 | 2 | 1 | 2 | 0.94273155 | 0.11685736 |
| 118 | 98 | 0.830508475 | 2 | 2 | 2 | 2 | 0.949055747 | 0.121831404 |
| 118 | 99 | 0.838983051 | 0 | 1 | 1 | 1 | 0.954902241 | 0.12798061 |
| 118 | 100 | 0.847457627 | 1 | 1 | 2 | 1 | 0.960293686 | 0.13372592 |
| 118 | 101 | 0.855932203 | 2 | 1 | 1 | 1 | 0.965251704 | 0.138604716 |
| 118 | 102 | 0.86440678 | 0 | 2 | 2 | 2 | 0.969796936 | 0.14310571 |
| 118 | 103 | 0.872881356 | 1 | 2 | 1 | 2 | 0.973949076 | 0.148000403 |
| 118 | 104 | 0.881355932 | 2 | 2 | 2 | 2 | 0.977726916 | 0.153627818 |
| 118 | 105 | 0.889830508 | 0 | 1 | 1 | 1 | 0.981148383 | 0.159607662 |
| 118 | 106 | 0.898305085 | 1 | 1 | 2 | 1 | 0.984230578 | 0.165131403 |
| 118 | 107 | 0.906779661 | 2 | 1 | 1 | 1 | 0.986989811 | 0.169547644 |
| 118 | 108 | 0.915254237 | 0 | 2 | 2 | 2 | 0.989441639 | 0.172848149 |
| 118 | 109 | 0.923728814 | 1 | 2 | 1 | 2 | 0.991600897 | 0.175822936 |
| 118 | 110 | 0.93220339 | 2 | 2 | 2 | 2 | 0.993481735 | 0.17981161 |
| 118 | 111 | 0.940677966 | 0 | 1 | 1 | 1 | 0.995097645 | 0.18611 |
| 118 | 112 | 0.949152542 | 1 | 1 | 2 | 1 | 0.996461494 | 0.195298256 |
| 118 | 113 | 0.957627119 | 2 | 1 | 1 | 1 | 0.997585551 | 0.206898457 |
| 118 | 114 | 0.966101695 | 0 | 2 | 2 | 2 | 0.998481516 | 0.219557255 |
| 118 | 115 | 0.974576271 | 1 | 2 | 1 | 2 | 0.999160548 | 0.231546839 |
| 118 | 116 | 0.983050847 | 2 | 2 | 2 | 2 | 0.999633286 | 0.241252587 |
| 118 | 117 | 0.991525424 | 0 | 1 | 1 | 1 | 0.999909878 | 0.24748307 |
| 120 | 63 | 0.525 | 0 | 1 | 3 | 3 | 0.149042266 | 1.225362448 |
| 120 | 64 | 0.533333333 | 1 | 1 | 8 | 3 | 0.195090322 | 0.999191747 |
| 120 | 65 | 0.541666667 | 2 | 1 | 5 | 3 | 0.239315664 | 0.863054271 |
| 120 | 72 | 0.6 | 0 | 2 | 24 | 24 | 0.5 | 0.249604232 |
| 120 | 73 | 0.608333333 | 1 | 2 | 1 | 24 | 0.530730048 | 0.201496834 |
| 120 | 74 | 0.616666667 | 2 | 2 | 2 | 24 | 0.559974786 | 0.202782194 |
| 120 | 81 | 0.675 | 0 | 1 | 3 | 3 | 0.727373642 | 0.259900638 |
| 120 | 82 | 0.683333333 | 1 | 1 | 2 | 3 | 0.746553222 | 0.271401178 |
| 120 | 83 | 0.691666667 | 2 | 1 | 1 | 3 | 0.764691093 | 0.279971502 |
| 120 | 90 | 0.75 | 0 | 1 | 30 | 30 | 0.866025404 | 0.249604232 |
| 120 | 91 | 0.758333333 | 1 | 1 | 1 | 30 | 0.877302694 | 0.228292127 |
| 120 | 92 | 0.766666667 | 2 | 1 | 4 | 30 | 0.887885218 | 0.202092476 |
| 120 | 99 | 0.825 | 0 | 1 | 3 | 3 | 0.945000819 | 0.118332187 |
| 120 | 100 | 0.833333333 | 1 | 1 | 20 | 3 | 0.951056516 | 0.123848433 |
| 120 | 101 | 0.841666667 | 2 | 1 | 1 | 3 | 0.956657719 | 0.129889283 |
| 120 | 108 | 0.9 | 0 | 1 | 12 | 12 | 0.984807753 | 0.166114912 |
| 120 | 109 | 0.908333333 | 1 | 1 | 1 | 12 | 0.987461878 | 0.17022331 |
| 120 | 110 | 0.916666667 | 2 | 1 | 10 | 12 | 0.989821442 | 0.173334714 |
| 120 | 117 | 0.975 | 0 | 1 | 3 | 3 | 0.999188998 | 0.232098334 |
| 120 | 118 | 0.983333333 | 1 | 1 | 2 | 3 | 0.999645611 | 0.241521367 |
| 120 | 119 | 0.991666667 | 2 | 1 | 1 | 3 | 0.999912882 | 0.24755304 |
| 122 | 62 | 0.508196721 | 2 | 1 | 2 | 2 | 0.050649169 | 2.207146396 |
| 122 | 63 | 0.516393443 | 0 | 2 | 1 | 1 | 0.099567847 | 1.684632192 |
| 122 | 64 | 0.524590164 | 1 | 2 | 2 | 1 | 0.146730474 | 1.241486582 |
| 122 | 65 | 0.532786885 | 2 | 2 | 1 | 1 | 0.192126717 | 1.009858854 |
| 122 | 66 | 0.540983607 | 0 | 1 | 2 | 2 | 0.235758936 | 0.872921096 |
| 122 | 67 | 0.549180328 | 1 | 1 | 1 | 2 | 0.277640001 | 0.769969021 |
| 122 | 68 | 0.557377049 | 2 | 1 | 2 | 2 | 0.31779142 | 0.697578779 |
| 122 | 69 | 0.56557377 | 0 | 2 | 1 | 1 | 0.356241712 | 0.631894067 |
| 122 | 70 | 0.573770492 | 1 | 2 | 2 | 1 | 0.393025032 | 0.559042417 |
| 122 | 71 | 0.581967213 | 2 | 2 | 1 | 1 | 0.428179984 | 0.474274247 |
| 122 | 72 | 0.590163934 | 0 | 1 | 2 | 2 | 0.461748613 | 0.371534464 |
| 122 | 73 | 0.598360656 | 1 | 1 | 1 | 2 | 0.49377555 | 0.266851085 |
| 122 | 74 | 0.606557377 | 2 | 1 | 2 | 2 | 0.524307284 | 0.205929147 |
| 122 | 75 | 0.614754098 | 0 | 2 | 1 | 1 | 0.553391549 | 0.201275528 |
| 122 | 76 | 0.62295082 | 1 | 2 | 2 | 1 | 0.581076815 | 0.203195327 |
| 122 | 77 | 0.631147541 | 2 | 2 | 1 | 1 | 0.607411852 | 0.193175118 |
| 122 | 78 | 0.639344262 | 0 | 1 | 2 | 2 | 0.632445376 | 0.19193272 |
| 122 | 79 | 0.647540984 | 1 | 1 | 1 | 2 | 0.656225749 | 0.209920223 |
| 122 | 80 | 0.655737705 | 2 | 1 | 2 | 2 | 0.678800746 | 0.231691388 |
| 122 | 81 | 0.663934426 | 0 | 2 | 1 | 1 | 0.700217348 | 0.246111837 |
| 122 | 82 | 0.672131148 | 1 | 2 | 2 | 1 | 0.720521594 | 0.256214329 |
| 122 | 83 | 0.680327869 | 2 | 2 | 1 | 1 | 0.739758451 | 0.267265544 |
| 122 | 84 | 0.68852459 | 0 | 1 | 2 | 2 | 0.757971723 | 0.277472435 |
| 122 | 85 | 0.696721311 | 1 | 1 | 1 | 2 | 0.775203976 | 0.281571441 |
| 122 | 86 | 0.704918033 | 2 | 1 | 2 | 2 | 0.791496488 | 0.278400767 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 122 | 87 | 0.713114754 | 0 | 2 | 1 | 1 | 0.806889217 | 0.272390949 |
| 122 | 88 | 0.721311475 | 1 | 2 | 2 | 1 | 0.821420775 | 0.268789305 |
| 122 | 89 | 0.729508197 | 2 | 2 | 1 | 1 | 0.835128429 | 0.26811841 |
| 122 | 90 | 0.737704918 | 0 | 1 | 2 | 2 | 0.848048096 | 0.265915544 |
| 122 | 91 | 0.745901639 | 1 | 1 | 1 | 2 | 0.860214356 | 0.257174131 |
| 122 | 92 | 0.754098361 | 2 | 1 | 2 | 2 | 0.87166047 | 0.239998243 |
| 122 | 93 | 0.762295082 | 0 | 2 | 1 | 1 | 0.882418399 | 0.216168397 |
| 122 | 94 | 0.770491803 | 1 | 2 | 2 | 1 | 0.892518836 | 0.189697399 |
| 122 | 95 | 0.778688525 | 2 | 2 | 1 | 1 | 0.90199123 | 0.164809534 |
| 122 | 96 | 0.786885246 | 0 | 1 | 2 | 2 | 0.910863825 | 0.144349761 |
| 122 | 97 | 0.795081967 | 1 | 1 | 1 | 2 | 0.91916369 | 0.129348927 |
| 122 | 98 | 0.803278689 | 2 | 1 | 2 | 2 | 0.926916757 | 0.11978576 |
| 122 | 99 | 0.81147541 | 0 | 2 | 1 | 1 | 0.93414786 | 0.11546977 |
| 122 | 100 | 0.819672131 | 1 | 2 | 2 | 1 | 0.940880769 | 0.115970601 |
| 122 | 101 | 0.827868852 | 2 | 2 | 1 | 1 | 0.947138229 | 0.120058501 |
| 122 | 102 | 0.836065574 | 0 | 1 | 2 | 2 | 0.952942 | 0.125850454 |
| 122 | 103 | 0.844262295 | 1 | 1 | 1 | 2 | 0.958312892 | 0.131662108 |
| 122 | 104 | 0.852459016 | 2 | 1 | 2 | 2 | 0.963270801 | 0.136693763 |
| 122 | 105 | 0.860655738 | 0 | 2 | 1 | 1 | 0.967834748 | 0.141107668 |
| 122 | 106 | 0.868852459 | 1 | 2 | 2 | 1 | 0.972022914 | 0.145586357 |
| 122 | 107 | 0.87704918 | 2 | 2 | 1 | 1 | 0.975852672 | 0.150684112 |
| 122 | 108 | 0.885245902 | 0 | 1 | 2 | 2 | 0.979340622 | 0.156374087 |
| 122 | 109 | 0.893442623 | 1 | 1 | 1 | 2 | 0.982502626 | 0.162065895 |
| 122 | 110 | 0.901639344 | 2 | 1 | 2 | 2 | 0.985353836 | 0.16701933 |
| 122 | 111 | 0.909836066 | 0 | 2 | 1 | 1 | 0.987908727 | 0.170841728 |
| 122 | 112 | 0.918032787 | 1 | 2 | 2 | 1 | 0.990181125 | 0.17380077 |
| 122 | 113 | 0.926229508 | 2 | 2 | 1 | 1 | 0.992184237 | 0.176829121 |
| 122 | 114 | 0.93442623 | 0 | 1 | 2 | 2 | 0.993930677 | 0.181199306 |
| 122 | 115 | 0.942622951 | 1 | 1 | 1 | 2 | 0.995432492 | 0.187963246 |
| 122 | 116 | 0.950819672 | 2 | 1 | 2 | 2 | 0.99670119 | 0.197422597 |
| 122 | 117 | 0.959016393 | 0 | 2 | 1 | 1 | 0.997747759 | 0.20894541 |
| 122 | 118 | 0.967213115 | 1 | 2 | 2 | 1 | 0.998582696 | 0.221205346 |
| 122 | 119 | 0.975409836 | 2 | 2 | 1 | 1 | 0.999216026 | 0.232626058 |
| 122 | 120 | 0.983606557 | 0 | 1 | 2 | 2 | 0.999657325 | 0.241777579 |
| 122 | 121 | 0.991803279 | 1 | 1 | 1 | 2 | 0.999915738 | 0.247619616 |
| 124 | 63 | 0.508064516 | 0 | 1 | 1 | 1 | 0.049845886 | 2.214256994 |
| 124 | 64 | 0.516129032 | 1 | 1 | 4 | 1 | 0.09801714 | 1.70192915 |
| 124 | 65 | 0.524193548 | 2 | 1 | 1 | 1 | 0.14448905 | 1.257660343 |
| 124 | 66 | 0.532258065 | 0 | 2 | 2 | 2 | 0.189251244 | 1.020531146 |
| 124 | 67 | 0.540322581 | 1 | 2 | 1 | 2 | 0.232305357 | 0.882664567 |
| 124 | 68 | 0.548387097 | 2 | 2 | 4 | 2 | 0.27366299 | 0.778373751 |
| 124 | 69 | 0.556451613 | 0 | 1 | 1 | 1 | 0.313343968 | 0.704929451 |
| 124 | 70 | 0.564516129 | 1 | 1 | 2 | 1 | 0.351374824 | 0.640687319 |
| 124 | 71 | 0.572580645 | 2 | 1 | 1 | 1 | 0.387787506 | 0.570182508 |
| 124 | 72 | 0.580645161 | 0 | 1 | 4 | 4 | 0.422618262 | 0.489112842 |
| 124 | 73 | 0.588709677 | 1 | 1 | 1 | 4 | 0.455906694 | 0.390841419 |
| 124 | 74 | 0.596774194 | 2 | 1 | 2 | 4 | 0.487694944 | 0.285294494 |
| 124 | 75 | 0.60483871 | 0 | 1 | 1 | 1 | 0.518027009 | 0.213092099 |
| 124 | 76 | 0.612903226 | 1 | 1 | 4 | 1 | 0.546948158 | 0.199913517 |
| 124 | 77 | 0.620967742 | 2 | 1 | 1 | 1 | 0.574504438 | 0.204084629 |
| 124 | 78 | 0.629032258 | 0 | 2 | 2 | 2 | 0.600742264 | 0.195986587 |
| 124 | 79 | 0.637096774 | 1 | 2 | 1 | 2 | 0.625708076 | 0.190170126 |
| 124 | 80 | 0.64516129 | 2 | 2 | 4 | 2 | 0.649448048 | 0.203438155 |
| 124 | 81 | 0.653225806 | 0 | 1 | 1 | 1 | 0.672007861 | 0.225616568 |
| 124 | 82 | 0.661290323 | 1 | 1 | 2 | 1 | 0.693432501 | 0.242265206 |
| 124 | 83 | 0.669354839 | 2 | 1 | 1 | 1 | 0.713766113 | 0.252838456 |
| 124 | 84 | 0.677419355 | 0 | 1 | 4 | 4 | 0.733051872 | 0.263188689 |
| 124 | 85 | 0.685483871 | 1 | 1 | 1 | 4 | 0.75133189 | 0.274145339 |
| 124 | 86 | 0.693548387 | 2 | 1 | 2 | 4 | 0.76864714 | 0.280927823 |
| 124 | 87 | 0.701612903 | 0 | 1 | 1 | 1 | 0.785037405 | 0.280359827 |
| 124 | 88 | 0.709677419 | 1 | 1 | 4 | 1 | 0.800541241 | 0.274859491 |
| 124 | 89 | 0.717741935 | 2 | 1 | 1 | 1 | 0.81519595 | 0.269882663 |
| 124 | 90 | 0.725806452 | 0 | 2 | 2 | 2 | 0.829037573 | 0.26827164 |
| 124 | 91 | 0.733870968 | 1 | 2 | 1 | 2 | 0.842100885 | 0.267500526 |
| 124 | 92 | 0.741935484 | 2 | 2 | 4 | 2 | 0.854419405 | 0.262433349 |
| 124 | 93 | 0.75 | 0 | 1 | 31 | 31 | 0.866025404 | 0.249604232 |
| 124 | 94 | 0.758064516 | 1 | 1 | 2 | 31 | 0.876949928 | 0.229079496 |
| 124 | 95 | 0.766129032 | 2 | 1 | 1 | 31 | 0.887222819 | 0.203840777 |
| 124 | 96 | 0.774193548 | 0 | 1 | 4 | 4 | 0.896872742 | 0.178047438 |
| 124 | 97 | 0.782258065 | 1 | 1 | 1 | 4 | 0.90592721 | 0.155257241 |
| 124 | 98 | 0.790322581 | 2 | 1 | 2 | 4 | 0.914412623 | 0.137384467 |
| 124 | 99 | 0.798387097 | 0 | 1 | 1 | 1 | 0.922354294 | 0.124850013 |
| 124 | 100 | 0.806451613 | 1 | 1 | 4 | 1 | 0.929776486 | 0.117504135 |

-continued

Appendix 1: Slot-Pol Combination Comparison Chart for Coil Span of 1 Tooth

| Poles | Slots | Slot/Pole Ratio | Balanced Winding All Slots Filled | Balanced Winding | Ct | Maximum Parallel Paths | Kp | THD-Total Harmonic Distortion |
|---|---|---|---|---|---|---|---|---|
| 124 | 101 | 0.814516129 | 2 | 1 | 1 | 1 | 0.936702445 | 0.115138399 |
| 124 | 102 | 0.822580645 | 0 | 2 | 2 | 2 | 0.943154434 | 0.117101241 |
| 124 | 103 | 0.830645161 | 1 | 2 | 1 | 2 | 0.949153773 | 0.121926734 |
| 124 | 104 | 0.838709677 | 2 | 2 | 4 | 2 | 0.954720867 | 0.127782815 |
| 124 | 105 | 0.846774194 | 0 | 1 | 1 | 1 | 0.959875242 | 0.133295938 |
| 124 | 106 | 0.85483871 | 1 | 1 | 2 | 1 | 0.964635582 | 0.138012941 |
| 124 | 107 | 0.862903226 | 2 | 1 | 1 | 1 | 0.96901976 | 0.142298278 |
| 124 | 108 | 0.870967742 | 0 | 1 | 4 | 4 | 0.973044871 | 0.146831819 |
| 124 | 109 | 0.879032258 | 1 | 1 | 1 | 4 | 0.97672726 | 0.152021583 |
| 124 | 110 | 0.887096774 | 2 | 1 | 2 | 4 | 0.980082561 | 0.157686981 |
| 124 | 111 | 0.89516129 | 0 | 1 | 1 | 1 | 0.983125718 | 0.16318691 |
| 124 | 112 | 0.903225806 | 1 | 1 | 4 | 1 | 0.985871019 | 0.167849362 |
| 124 | 113 | 0.911290323 | 2 | 1 | 1 | 1 | 0.988332122 | 0.171410693 |
| 124 | 114 | 0.919354839 | 0 | 2 | 2 | 2 | 0.990522085 | 0.174252763 |
| 124 | 115 | 0.927419355 | 1 | 2 | 1 | 2 | 0.992453387 | 0.177349992 |
| 124 | 116 | 0.935483871 | 2 | 2 | 4 | 2 | 0.994137957 | 0.181922066 |
| 124 | 117 | 0.943548387 | 0 | 1 | 1 | 1 | 0.995587198 | 0.188900037 |
| 124 | 118 | 0.951612903 | 1 | 1 | 2 | 1 | 0.996812007 | 0.198464747 |
| 124 | 119 | 0.959677419 | 2 | 1 | 1 | 1 | 0.997822801 | 0.209927463 |
| 124 | 120 | 0.967741935 | 0 | 1 | 4 | 4 | 0.998629535 | 0.221984253 |
| 124 | 121 | 0.975806452 | 1 | 1 | 1 | 4 | 0.999241725 | 0.233131277 |
| 124 | 122 | 0.983870968 | 2 | 1 | 2 | 4 | 0.999668468 | 0.24202198 |
| 124 | 123 | 0.991935484 | 0 | 1 | 1 | 1 | 0.999918456 | 0.247683013 |

The invention claimed is:

1. A permanent magnet brushless motor comprising:
a wound assembly comprising permeable laminations with slots;
an insulated copper wire wound with within the slots to provide electrical phases;
a field assembly comprising a permeable structure and at least 20 magnet poles arranged thereon;
wherein the wound assembly and the field assembly are arranged to produce a motive force when the electrical phases of the wound assembly are excited; and
wherein the wound assembly has a slot to pole ratio less than one to increase torque efficiency, the slot to pole ratio being selected so that a $C_T$ value is less than 6 and a Kp value is greater than 0.9 where (1) Kp=sin(1−|(pitch pu−1)|*90.0) where pitch pu=(tooth span pitch/pole pitch) and (2) $C_T = p\, Q_s/N_c$, where p=the number of motor poles, $Q_s$=the number of slots, and $N_c$=the least common multiple between the slot number and the pole number.

2. The permanent magnet brushless motor of claim 1 wherein the motor has 36 slots and 46 poles.

3. The permanent magnet brushless motor of claim 1 wherein the motor has 30 slots and 38 poles.

4. The permanent magnet brushless motor of claim 1 wherein the wound assembly rotates and the field assembly remains still.

5. A permanent magnet brushless motor according to claim 1, wherein the ratio of slots to poles is less than 0.90.

6. The motor according to claim 1, wherein the slot to pole ratio is further chosen to create a balanced winding.

7. The motor according to claim 1, wherein the slot to pole ratio is further chosen for optimum cogging performance.

8. The motor according to claim 1, wherein the slot to pole ratio is chosen to enable efficient machine winding of the wound assembly.

9. The motor according to claim 1, wherein the slot to pole ratio is chosen to have a low total harmonic distortion.

10. The motor according to claim 1, wherein the slot to pole ratio is chosen to create a balanced winding, with optimum cogging performance, and efficient machine winding of the wound assembly.

11. The motor according to claim 1, wherein not all of the slots are wound with insulated copper wire.

12. The motor according to claim 1, wherein torque efficiency is increased by increasing torque density based on a volume of magnetic materials.

13. The motor according to claim 1, wherein the slot to pole ratio is further selected to provide a total harmonic distortion (THD) less than 0.18 where THD=$\sqrt{((V_2/V_1)^2+(V_3/V_1)^2+(V_4/V_1)^2+(V_5/V_1)^2+(V_6/V_1)^2+(V_7/V_1)^2 \ldots)}/V_1$% and V1, V2, V3 are the fundamental and higher order harmonics of the generated waveform assuming a 180 electrical degree magnet span (full pitch).

14. A permanent magnet brushless motor comprising:
a wound assembly comprising permeable laminations with slots;
an insulated copper wire wound with within the slots to provide electrical phases;
a field assembly comprising a permeable structure and at least 20 magnet poles arranged thereon;
wherein the wound assembly and the field assembly are arranged to produce a motive force when the electrical phases of the wound assembly are excited; and
wherein the wound assembly has a slot to pole ratio less than one to increase torque efficiency and the slot to pole ratio is further selected to provide a total harmonic distortion (THD) less than 0.18 where THD=$\sqrt{((V_2/V_1)^2+(V_3/V_1)^2+(V_4/V_1)^2+(V_5/V_1)^2+(V_6/V_1)^2+(V_7/V_1)^2 \ldots)}/V_1$% and V1, V2, V3 are the fundamental and higher order harmonics of the generated waveform assuming a 180 electrical degree magnet span (full pitch).

* * * * *